United States Patent
Tiku et al.

(10) Patent No.: US 10,157,398 B2
(45) Date of Patent: Dec. 18, 2018

(54) LOCATION-BASED DISCOUNTS IN DIFFERENT CURRENCIES

(71) Applicant: American Express Travel Related Services Company, Inc., New York, NY (US)

(72) Inventors: Sripriya Tiku, Scottsdale, AZ (US); Peter Tully, New York, NY (US); David Wolf, Brooklyn, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 84 days.

(21) Appl. No.: 15/166,086

(22) Filed: May 26, 2016

(65) Prior Publication Data

US 2016/0275558 A1    Sep. 22, 2016

Related U.S. Application Data

(63) Continuation of application No. 13/439,768, filed on Apr. 4, 2012, now Pat. No. 9,542,690, which is a
(Continued)

(51) Int. Cl.
G06Q 30/00     (2012.01)
G06Q 30/02     (2012.01)
G06Q 20/38     (2012.01)

(52) U.S. Cl.
CPC ....... *G06Q 30/0207* (2013.01); *G06Q 20/387* (2013.01); *G06Q 30/0261* (2013.01)

(58) Field of Classification Search
CPC ........... G06Q 30/0207; G06Q 30/0261; G06Q 20/387
(Continued)

(56) References Cited

U.S. PATENT DOCUMENTS 4,833,308 A    5/1989  Humble
4,882,675 A   11/1989  Nichtberger et al.
(Continued)

FOREIGN PATENT DOCUMENTS

WO    2001086378    11/2001
WO    2012024109     2/2012
(Continued)

OTHER PUBLICATIONS

USPTO; Final Office Action dated Apr. 11, 2011 in U.S. Appl. No. 12/857,389.
(Continued)

*Primary Examiner* — Luis A Brown
(74) *Attorney, Agent, or Firm* — Snell & Wilmer, L.L.P.

(57) ABSTRACT

The systems and methods of the disclosure allow user from various countries to take advantage of offers when they are traveling internationally. Once the purchase associated with the offer is made, the transaction information may be processed by the system, such that, the credit and debit associated with the purchase are transmitted to the transaction account and the merchant. The transaction information may be further processed to determine whether the particular transaction is eligible for a reward. Where the transaction is eligible for a reward, the credit and debit associated with reward are transmitted to the transaction account and the sponsoring entity. The reward may be provided in any suitable currency or in various currencies based on the parameters governing the reward offer.

20 Claims, 36 Drawing Sheets

Related U.S. Application Data continuation-in-part of application No. 13/411,281, filed on Mar. 2, 2012, now Pat. No. 9,767,467, which is a continuation-in-part of application No. 13/153,890, filed on Jun. 6, 2011, now abandoned, which is a continuation-in-part of application No. 12/857,389, filed on Aug. 16, 2010, now Pat. No. 9,613,361, which is a continuation-in-part of application No. 11/779,734, filed on Jul. 18, 2007, now Pat. No. 9,430,773, said application No. 13/439,768 is a continuation-in-part of application No. 13/021,237, filed on Feb. 4, 2011, now Pat. No. 9,489,680, and a continuation-in-part of application No. 13/188,693, filed on Jul. 22, 2011, now abandoned.

(60) Provisional application No. 60/831,457, filed on Jul. 18, 2006.

(58) Field of Classification Search
USPC .... 705/14.17, 14.34, 14.58, 39, 26.1, 14.27, 705/14.28, 14.49
See application file for complete search history.

(56) References Cited

U.S. PATENT DOCUMENTS

| | | |
|---|---|---|
| 5,025,372 A | 6/1991 | Burton et al. |
| 5,467,269 A | 11/1995 | Flaten |
| 5,471,669 A | 11/1995 | Lidman |
| 5,729,693 A | 3/1998 | Holda-Fleck |
| 5,918,211 A | 6/1999 | Sloane |
| 5,923,016 A | 7/1999 | Fredregill et al. |
| 5,948,040 A | 9/1999 | DeLorme et al. |
| 5,953,706 A | 9/1999 | Patel |
| 6,009,411 A | 12/1999 | Kepecs |
| 6,018,718 A | 1/2000 | Walker et al. |
| 6,035,280 A | 3/2000 | Christensen |
| 6,039,244 A | 3/2000 | Finsterwald |
| 6,154,729 A | 11/2000 | Cannon |
| 6,222,914 B1 | 4/2001 | McMullin |
| 6,266,649 B1 | 7/2001 | Linden et al. |
| 6,298,330 B1 | 10/2001 | Gardensqwartz |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,343,317 B1 | 1/2002 | Glorikian |
| 6,360,167 B1 | 3/2002 | Millington et al. |
| 6,370,514 B1 | 4/2002 | Messner |
| 6,381,603 B1 | 4/2002 | Chan et al. |
| 6,414,635 B1 | 7/2002 | Stewart et al. |
| 6,430,539 B1 | 8/2002 | Lazarus et al. |
| 6,434,534 B1 | 8/2002 | Walker et al. |
| 6,542,814 B2 | 4/2003 | Polidi et al. |
| 6,584,448 B1 | 6/2003 | Laor |
| 6,587,835 B1 | 7/2003 | Treyz et al. |
| 6,598,028 B1 * | 7/2003 | Sullivan ............. G06Q 30/0601 705/26.1 |
| 6,606,619 B2 | 8/2003 | Ortega et al. |
| 6,691,915 B1 | 2/2004 | Thaxton et al. |
| 6,738,711 B2 | 5/2004 | Ohmura et al. |
| 6,748,365 B1 | 6/2004 | Quinlan et al. |
| 6,847,935 B1 * | 1/2005 | Solomon ............... G06Q 30/02 705/14.23 |
| 6,865,544 B1 * | 3/2005 | Austin .................. G06Q 20/20 705/1.1 |
| 6,882,290 B2 | 4/2005 | French et al. |
| 6,883,708 B1 | 4/2005 | Fiedler et al. |
| 6,904,408 B1 | 6/2005 | McCarthy et al. |
| 6,915,265 B1 | 7/2005 | Johnson |
| 6,937,995 B1 | 8/2005 | Kepecs |
| 7,003,476 B1 | 2/2006 | Samra et al. |
| 7,010,497 B1 | 3/2006 | Nyhan et al. |
| 7,016,856 B1 | 3/2006 | Wiggins |
| 7,016,860 B2 | 3/2006 | Modani et al. |
| 7,054,830 B1 | 5/2006 | Eggleston et al. |
| 7,072,851 B1 | 7/2006 | Wilcox et al. |
| 7,107,238 B2 | 9/2006 | Hatakama et al. |
| 7,120,591 B1 * | 10/2006 | Solomon ................ G06Q 30/00 705/14.34 |
| 7,139,793 B2 | 11/2006 | Lala et al. |
| 7,146,328 B1 * | 12/2006 | Solomon ................ G06Q 20/10 705/14.34 |
| 7,165,037 B2 | 1/2007 | Lazarus et al. |
| 7,302,429 B1 | 11/2007 | Wanker |
| 7,367,500 B2 * | 5/2008 | Fajkowski ........... G06Q 20/387 235/375 |
| 7,392,224 B1 | 6/2008 | Bauer et al. |
| 7,406,436 B1 | 7/2008 | Reisman |
| 7,428,505 B1 | 9/2008 | Levy et al. |
| 7,430,521 B2 | 9/2008 | Walker et al. |
| 7,455,226 B1 | 11/2008 | Hammond et al. |
| 7,472,073 B1 | 12/2008 | Masi |
| 7,493,268 B2 | 2/2009 | Kepros et al. |
| 7,496,520 B1 | 2/2009 | Handel et al. |
| 7,499,889 B2 | 3/2009 | Golan et al. |
| 7,506,805 B1 | 3/2009 | Chakravarthy |
| 7,512,551 B2 | 3/2009 | Postrel |
| 7,596,566 B1 | 9/2009 | Patwardhan |
| 7,599,858 B1 | 10/2009 | Grady et al. |
| 7,618,318 B2 | 11/2009 | Ciancio et al. |
| 7,620,592 B2 | 11/2009 | O'Mara |
| 7,630,935 B2 | 12/2009 | Loeger et al. |
| 7,636,689 B2 * | 12/2009 | Dent ..................... G06Q 20/04 705/39 |
| 7,647,278 B1 | 1/2010 | Foth et al. |
| 7,653,572 B1 | 1/2010 | Thompson |
| 7,660,743 B1 | 2/2010 | Messa et al. |
| 7,665,660 B2 | 2/2010 | Degliantoni et al. |
| 7,668,749 B2 | 2/2010 | Kepros et al. |
| 7,676,467 B1 | 3/2010 | Kozyrczak et al. |
| 7,681,786 B1 | 3/2010 | Chakravarthy |
| 7,698,185 B2 * | 4/2010 | Hofer ................... G06Q 20/102 705/35 |
| 7,702,540 B1 | 4/2010 | Woolston |
| 7,706,808 B1 | 4/2010 | Aggarwal et al. |
| 7,711,586 B2 | 5/2010 | Aggarwal et al. |
| 7,734,486 B2 | 6/2010 | Mortimore, Jr. |
| 7,739,134 B2 | 6/2010 | Mortimore, Jr. |
| 7,742,954 B1 | 6/2010 | Handel et al. |
| 7,743,002 B2 | 6/2010 | Hernandez |
| 7,747,524 B2 | 6/2010 | Brown |
| 7,765,119 B2 | 6/2010 | Messa et al. |
| 7,751,805 B2 * | 7/2010 | Neven .................... G06K 9/228 455/3.01 |
| 7,752,328 B2 | 7/2010 | Mortimore, Jr. et al. |
| 7,788,141 B1 | 8/2010 | Sim |
| 7,797,199 B2 | 9/2010 | Forshaw et al. |
| 7,801,760 B2 | 9/2010 | Handel et al. |
| 7,806,328 B2 | 10/2010 | Chakravarthy |
| 7,814,029 B1 | 10/2010 | Siegel |
| 7,844,488 B2 | 11/2010 | Merriman et al. |
| 7,844,490 B2 | 11/2010 | Patterson |
| 7,865,513 B2 | 1/2011 | Welch et al. |
| 7,870,022 B2 | 1/2011 | Bous et al. |
| 7,899,704 B1 | 3/2011 | Thompson |
| 7,925,540 B1 | 4/2011 | Orttung et al. |
| 7,933,810 B2 | 4/2011 | Morgentstern |
| 7,937,330 B2 | 5/2011 | Handel et al. |
| 7,941,374 B2 | 5/2011 | Orttung et al. |
| 7,958,017 B1 | 6/2011 | Rempe et al. |
| 7,962,381 B2 | 6/2011 | Handel et al. |
| 7,966,213 B2 | 6/2011 | Messa et al. |
| 7,970,666 B1 | 6/2011 | Handel |
| 7,991,664 B1 | 8/2011 | Stone |
| 8,070,056 B2 | 12/2011 | Feldman et al. |
| 8,073,719 B2 | 12/2011 | Orttung et al. |
| 8,078,496 B2 | 12/2011 | Postrel |
| 8,082,270 B2 | 12/2011 | Goyal |
| 8,090,707 B1 | 1/2012 | Orttung et al. |
| 8,095,402 B2 | 1/2012 | Orttung et al. |
| 8,108,304 B2 | 1/2012 | Loeger et al. |
| 8,117,073 B1 | 2/2012 | Orttung et al. |

(56) References Cited

U.S. PATENT DOCUMENTS

| | | |
|---|---|---|
| 8,121,953 B1 | 2/2012 | Orttung et al. |
| 8,126,771 B2 | 2/2012 | Walker et al. |
| 8,126,776 B2 | 2/2012 | Messa et al. |
| 8,131,588 B2 | 3/2012 | Walker et al. |
| 8,140,387 B2 | 3/2012 | Heywood |
| 8,145,522 B2 | 3/2012 | Warren et al. |
| 8,160,922 B2 | 4/2012 | Postrel |
| 8,170,916 B2 | 5/2012 | Dicker et al. |
| 8,175,926 B1 | 5/2012 | Handel et al. |
| 8,180,682 B2 | 5/2012 | Narayanaswami et al. |
| 8,180,796 B1 | 5/2012 | Mah et al. |
| 8,213,423 B1 | 7/2012 | Breau |
| 8,249,934 B2 | 8/2012 | Agarwal et al. |
| 8,438,061 B2 | 5/2013 | Grimes |
| 8,459,551 B2 | 6/2013 | Lee et al. |
| 8,463,643 B2 | 6/2013 | Bennett |
| 8,463,706 B2 | 6/2013 | Cervenka et al. |
| 8,463,851 B2 | 6/2013 | Bennett et al. |
| 8,468,053 B2 | 6/2013 | Bennett |
| 8,473,334 B2 | 6/2013 | Gibbs |
| 8,484,088 B1 | 7/2013 | Orttung et al. |
| 8,484,093 B2 | 7/2013 | Bennett et al. |
| 8,489,452 B1 | 7/2013 | Warner et al. |
| 8,489,456 B2 | 7/2013 | Burgess et al. |
| 8,494,901 B2 | 7/2013 | Magadi et al. |
| 8,494,914 B2 | 7/2013 | Mesaros |
| 8,504,411 B1 | 8/2013 | Subasic |
| 8,504,423 B2 | 8/2013 | Rotbard et al. |
| 8,515,810 B2 | 8/2013 | Grimes |
| 8,517,258 B2 | 8/2013 | Taylor et al. |
| 8,543,470 B2 | 9/2013 | Grady et al. |
| 8,554,670 B1 | 10/2013 | Blank |
| 8,560,389 B2 | 10/2013 | Burgess et al. |
| 8,573,477 B2 | 11/2013 | Bennett et al. |
| 8,573,491 B2 | 11/2013 | Bennett et al. |
| 8,606,630 B2 | 12/2013 | Fordyce, III et al. |
| 8,615,426 B2 | 12/2013 | Carlson |
| 8,621,068 B2 | 12/2013 | Zohar et al. |
| 8,621,215 B1 | 12/2013 | Iyer |
| 8,626,579 B2 | 1/2014 | Fordyce, III et al. |
| 8,639,567 B2 | 1/2014 | Winters |
| 8,650,071 B2 | 2/2014 | Pointer et al. |
| 8,655,695 B1 | 2/2014 | Qu |
| 8,725,635 B2 | 5/2014 | Klein et al. |
| 8,874,674 B2 | 10/2014 | Allison et al. |
| 9,009,082 B1 | 4/2015 | Marshall et al. |
| 9,031,866 B1 | 5/2015 | Ng et al. |
| 9,430,773 B2 | 8/2016 | Aloni et al. |
| 2001/0014868 A1 | 8/2001 | Herz et al. |
| 2001/0020242 A1 | 9/2001 | Gupta et al. |
| 2001/0034682 A1* | 10/2001 | Knight ............... G06Q 20/04 705/35 |
| 2001/0037254 A1 | 11/2001 | Glikman |
| 2001/0054003 A1 | 12/2001 | Chien et al. |
| 2002/0052841 A1 | 5/2002 | Guthrie |
| 2002/0069079 A1 | 6/2002 | Vega |
| 2002/0069312 A1 | 6/2002 | Jones |
| 2002/0082920 A1 | 6/2002 | Austin et al. |
| 2002/0095357 A1 | 7/2002 | Hunter et al. |
| 2002/0099824 A1 | 7/2002 | Bender |
| 2002/0116335 A1* | 8/2002 | Star ............... G06Q 20/00 705/42 |
| 2002/0138343 A1 | 9/2002 | Weatherford et al. |
| 2002/0178056 A1 | 11/2002 | Lim |
| 2002/0194069 A1* | 12/2002 | Thakur ............... G06Q 30/02 705/14.18 |
| 2003/0004802 A1 | 1/2003 | Callegari |
| 2003/0027630 A1 | 2/2003 | Kelly et al. |
| 2003/0028426 A1 | 2/2003 | Banerjee |
| 2003/0028518 A1 | 2/2003 | Mankoff |
| 2003/0033211 A1 | 2/2003 | Haines et al. |
| 2003/0061093 A1 | 3/2003 | Todd |
| 2003/0078832 A1 | 4/2003 | Alvarez et al. |
| 2003/0154163 A1* | 8/2003 | Phillips ............... G06Q 20/10 705/39 |
| 2003/0208442 A1* | 11/2003 | Cockrill ............... G06Q 20/04 705/40 |
| 2003/0233278 A1 | 12/2003 | Marshall |
| 2004/0006509 A1 | 1/2004 | Mannik et al. |
| 2004/0015414 A1* | 1/2004 | Sidlo ............... G06F 21/10 705/26.61 |
| 2004/0039686 A1 | 2/2004 | Klebenoff |
| 2004/0098326 A1* | 5/2004 | James ............... G06Q 20/04 705/36 R |
| 2004/0098332 A1 | 5/2004 | Dvir |
| 2004/0122736 A1* | 6/2004 | Strock ............... G06Q 30/02 705/14.31 |
| 2004/0153389 A1 | 8/2004 | Lortscher |
| 2004/0215514 A1* | 10/2004 | Quinlan ............... G06Q 30/02 705/14.23 |
| 2004/0215517 A1 | 10/2004 | Chen |
| 2004/0225509 A1 | 11/2004 | Andre et al. |
| 2004/0225573 A1 | 11/2004 | Ling |
| 2004/0243468 A1* | 12/2004 | Cohagan ............... G06Q 30/02 705/14.23 |
| 2005/0010394 A1 | 1/2005 | Bergeron |
| 2005/0010428 A1 | 1/2005 | Bergeron |
| 2005/0010472 A1 | 1/2005 | Quatse et al. |
| 2005/0021401 A1 | 1/2005 | Postrel |
| 2005/0033583 A1 | 2/2005 | Bergeron |
| 2005/0033605 A1 | 2/2005 | Bergeron |
| 2005/0065848 A1 | 3/2005 | Mitchell et al. |
| 2005/0071225 A1 | 3/2005 | Bortolin et al. |
| 2005/0071227 A1 | 3/2005 | Hammad et al. |
| 2005/0071228 A1 | 3/2005 | Bortolin et al. |
| 2005/0071230 A1 | 3/2005 | Mankoff |
| 2005/0075932 A1* | 4/2005 | Mankoff ............ G06F 17/30011 705/14.35 |
| 2005/0096976 A1 | 5/2005 | Nelms |
| 2005/0149394 A1 | 7/2005 | Postrel |
| 2005/0159996 A1 | 7/2005 | Lazarus |
| 2005/0165684 A1 | 7/2005 | Jensen |
| 2005/0192863 A1 | 9/2005 | Mohan |
| 2005/0234753 A1 | 10/2005 | Pinto |
| 2005/0240477 A1 | 10/2005 | Friday et al. |
| 2005/0246272 A1 | 11/2005 | Kitada et al. |
| 2005/0273388 A1 | 12/2005 | Roetter |
| 2006/0004633 A1 | 1/2006 | Ashbaugh |
| 2006/0026067 A1 | 2/2006 | Nicholas et al. |
| 2006/0041480 A1 | 2/2006 | Briggs |
| 2006/0053056 A1 | 3/2006 | Alspach-Goss et al. |
| 2006/0064372 A1 | 3/2006 | Gupta |
| 2006/0074749 A1 | 4/2006 | Kline |
| 2006/0076400 A1 | 4/2006 | Fletcher |
| 2006/0085240 A1 | 4/2006 | Salehi-sedeh et al. |
| 2006/0095434 A1 | 5/2006 | McCullough et al. |
| 2006/0111930 A1 | 5/2006 | Ayer et al. |
| 2006/0116800 A1 | 6/2006 | Obradovich et al. |
| 2006/0122874 A1 | 6/2006 | Postrel |
| 2006/0129426 A1 | 6/2006 | Pearson |
| 2006/0136299 A1 | 6/2006 | Ruhmkorf |
| 2006/0155603 A1 | 7/2006 | Abendroth et al. |
| 2006/0155641 A1 | 7/2006 | Postrel |
| 2006/0167753 A1 | 7/2006 | Teague et al. |
| 2006/0173672 A1 | 8/2006 | Bergeron |
| 2006/0178932 A1 | 8/2006 | Lang |
| 2006/0195359 A1 | 8/2006 | Robinson et al. |
| 2006/0212355 A1 | 9/2006 | Teague et al. |
| 2006/0224449 A1 | 10/2006 | Byerley et al. |
| 2006/0241859 A1 | 10/2006 | Kimchi et al. |
| 2006/0242011 A1 | 10/2006 | Bell et al. |
| 2006/0248007 A1* | 11/2006 | Hofer ............... G06Q 20/102 705/40 |
| 2006/0253321 A1 | 11/2006 | Heywood |
| 2006/0258397 A1 | 11/2006 | Kaplan et al. |
| 2006/0259364 A1* | 11/2006 | Strock ............... G06Q 30/02 705/14.15 |
| 2006/0271552 A1 | 11/2006 | McChesney et al. |
| 2006/0293957 A1 | 12/2006 | Petersen |
| 2007/0000997 A1 | 1/2007 | Lambert et al. |
| 2007/0010942 A1* | 1/2007 | Bill ............... G01C 21/3617 701/424 |
| 2007/0022019 A1 | 1/2007 | Sherwin et al. |

(56) References Cited

U.S. PATENT DOCUMENTS

| | | | |
|---|---|---|---|
| 2007/0033104 A1 | 2/2007 | Collins et al. | |
| 2007/0038515 A1 | 2/2007 | Postrel | |
| 2007/0038516 A1 | 2/2007 | Apple et al. | |
| 2007/0050258 A1 | 3/2007 | Dohse | |
| 2007/0055625 A1* | 3/2007 | Sheehan | G06Q 20/04 705/39 |
| 2007/0061216 A1 | 3/2007 | Jain et al. | |
| 2007/0061223 A1* | 3/2007 | Rodriguez | G06Q 20/202 705/4 |
| 2007/0073599 A1 | 3/2007 | Perry et al. | |
| 2007/0083428 A1 | 4/2007 | Goldstein | |
| 2007/0094114 A1 | 4/2007 | Bufford et al. | |
| 2007/0129995 A1 | 6/2007 | Brandow | |
| 2007/0130000 A1 | 6/2007 | Assanassios | |
| 2007/0130054 A1* | 6/2007 | Jenniges | G06Q 10/087 705/37 |
| 2007/0136135 A1 | 6/2007 | Loeger et al. | |
| 2007/0146812 A1 | 6/2007 | Lawton | |
| 2007/0150349 A1 | 6/2007 | Handel et al. | |
| 2007/0157237 A1 | 7/2007 | Cordray | |
| 2007/0192178 A1* | 8/2007 | Fung | G06Q 20/06 705/14.27 |
| 2007/0192192 A1 | 8/2007 | Haberman et al. | |
| 2007/0198354 A1 | 8/2007 | Senghore et al. | |
| 2007/0198432 A1 | 8/2007 | Pitroda et al. | |
| 2007/0198937 A1 | 8/2007 | Paris | |
| 2007/0208879 A1 | 9/2007 | Liu | |
| 2007/0210152 A1 | 9/2007 | Read | |
| 2007/0214040 A1 | 9/2007 | Patel et al. | |
| 2007/0233517 A1 | 10/2007 | Dayal | |
| 2007/0244741 A1 | 10/2007 | Blume et al. | |
| 2007/0244811 A1 | 10/2007 | Tumminaro | |
| 2007/0260513 A1 | 11/2007 | Pavlov | |
| 2007/0260523 A1 | 11/2007 | Schadt et al. | |
| 2007/0288312 A1 | 12/2007 | Wang | |
| 2007/0288372 A1 | 12/2007 | Behar et al. | |
| 2008/0004917 A1 | 1/2008 | Mortimore, Jr. | |
| 2008/0004919 A1 | 1/2008 | Stubbs | |
| 2008/0004980 A1 | 1/2008 | Hernandez | |
| 2008/0005148 A1 | 1/2008 | Welch et al. | |
| 2008/0021772 A1 | 1/2008 | Aloni et al. | |
| 2008/0023540 A1* | 1/2008 | Rao | G06Q 20/04 235/380 |
| 2008/0032720 A1 | 2/2008 | Mamdani et al. | |
| 2008/0033857 A1 | 2/2008 | Moses | |
| 2008/0040211 A1 | 2/2008 | Walker et al. | |
| 2008/0040288 A1 | 2/2008 | Mortimore, Jr. et al. | |
| 2008/0052140 A1 | 2/2008 | Neal et al. | |
| 2008/0052151 A1 | 2/2008 | Xie et al. | |
| 2008/0059220 A1 | 3/2008 | Roth et al. | |
| 2008/0059303 A1* | 3/2008 | Fordyce | G06Q 30/02 705/14.27 |
| 2008/0065491 A1 | 3/2008 | Bakman | |
| 2008/0082418 A1 | 4/2008 | Fordyce et al. | |
| 2008/0091445 A1 | 4/2008 | Mihic | |
| 2008/0091528 A1 | 4/2008 | Rampell et al. | |
| 2008/0091537 A1* | 4/2008 | Miller | G06Q 30/0255 705/14.53 |
| 2008/0091549 A1 | 4/2008 | Chang et al. | |
| 2008/0091828 A1 | 4/2008 | Mortimore, Jr. | |
| 2008/0092162 A1 | 4/2008 | Lundy et al. | |
| 2008/0109317 A1 | 5/2008 | Singh et al. | |
| 2008/0109489 A1 | 5/2008 | Sherwood | |
| 2008/0120129 A1* | 5/2008 | Seubert | G06Q 10/06 705/35 |
| 2008/0120155 A1 | 5/2008 | Pliha | |
| 2008/0126249 A1* | 5/2008 | Garcia | G06Q 20/108 705/42 |
| 2008/0126515 A1 | 5/2008 | Chambers et al. | |
| 2008/0133488 A1 | 6/2008 | Bandaru | |
| 2008/0147450 A1 | 6/2008 | Mortimore, Jr. | |
| 2008/0147514 A1 | 6/2008 | Shuster et al. | |
| 2008/0147773 A1 | 6/2008 | Aaron | |
| 2008/0154664 A1 | 6/2008 | Kuo et al. | |
| 2008/0162206 A1 | 7/2008 | Mak et al. | |
| 2008/0167972 A1* | 7/2008 | Rodriguez | G06Q 20/202 705/26.2 |
| 2008/0167989 A1* | 7/2008 | Conlin | G06Q 20/0655 705/44 |
| 2008/0167991 A1 | 7/2008 | Carlson et al. | |
| 2008/0189169 A1* | 8/2008 | Turpin | G06Q 30/02 705/7.33 |
| 2008/0195475 A1 | 8/2008 | Lambert et al. | |
| 2008/0195609 A1 | 8/2008 | Paris | |
| 2008/0196060 A1 | 8/2008 | Varghese | |
| 2008/0201197 A1 | 8/2008 | Orttung et al. | |
| 2008/0201224 A1 | 8/2008 | Owens et al. | |
| 2008/0201432 A1 | 8/2008 | Orttung et al. | |
| 2008/0210753 A1 | 9/2008 | Plozay et al. | |
| 2008/0255940 A1 | 10/2008 | Perreault et al. | |
| 2008/0262925 A1 | 10/2008 | Kim | |
| 2008/0263135 A1 | 10/2008 | Olliphant | |
| 2008/0270223 A1 | 10/2008 | Collins et al. | |
| 2008/0270251 A1 | 10/2008 | Coelho et al. | |
| 2008/0275819 A1* | 11/2008 | Rifai | G06Q 20/32 705/44 |
| 2008/0276270 A1 | 11/2008 | Kotaru et al. | |
| 2008/0281699 A1 | 11/2008 | Whitehead | |
| 2008/0281710 A1 | 11/2008 | Hoal | |
| 2008/0294624 A1 | 11/2008 | Kanigsberg et al. | |
| 2008/0300894 A1 | 12/2008 | John | |
| 2008/0300979 A1 | 12/2008 | Abhyanker | |
| 2008/0306769 A1* | 12/2008 | Roberts | G06Q 30/06 705/3 |
| 2008/0313078 A1* | 12/2008 | Payne | G06Q 20/40 705/44 |
| 2009/0006142 A1 | 1/2009 | Orttung et al. | |
| 2009/0006143 A1 | 1/2009 | Orttung et al. | |
| 2009/0006188 A1 | 1/2009 | Guo et al. | |
| 2009/0006194 A1 | 1/2009 | Sridharan et al. | |
| 2009/0012839 A1 | 1/2009 | Fusillo et al. | |
| 2009/0018916 A1 | 1/2009 | Seven et al. | |
| 2009/0030609 A1 | 1/2009 | Orttung et al. | |
| 2009/0030742 A1 | 1/2009 | Orttung et al. | |
| 2009/0030769 A1 | 1/2009 | Orttung et al. | |
| 2009/0030779 A1 | 1/2009 | Tollinger et al. | |
| 2009/0037264 A1 | 2/2009 | Del Favero et al. | |
| 2009/0055292 A1 | 2/2009 | Chong et al. | |
| 2009/0063268 A1 | 3/2009 | Burgess et al. | |
| 2009/0063351 A1 | 3/2009 | Schmeyer et al. | |
| 2009/0076912 A1 | 3/2009 | Rajan et al. | |
| 2009/0089172 A1* | 4/2009 | Quinlan | G06Q 10/10 705/17 |
| 2009/0094048 A1 | 4/2009 | Wallace et al. | |
| 2009/0125719 A1 | 5/2009 | Cochran | |
| 2009/0132347 A1 | 5/2009 | Anderson et al. | |
| 2009/0140799 A1 | 6/2009 | Kasperkovitz | |
| 2009/0150272 A1 | 6/2009 | Blythe | |
| 2009/0156310 A1 | 6/2009 | Fargo | |
| 2009/0163227 A1 | 6/2009 | Collins | |
| 2009/0164314 A1 | 6/2009 | Blythe | |
| 2009/0171842 A1 | 7/2009 | Blythe | |
| 2009/0171853 A1 | 7/2009 | Georgiou et al. | |
| 2009/0182718 A1* | 7/2009 | Waclawik | G06F 17/30699 |
| 2009/0210261 A1 | 8/2009 | Mortimore, Jr. et al. | |
| 2009/0228365 A1 | 9/2009 | Tomchek et al. | |
| 2009/0247193 A1 | 10/2009 | Kalavade | |
| 2009/0247282 A1 | 10/2009 | Cheng | |
| 2009/0248457 A1 | 10/2009 | Munter et al. | |
| 2009/0248543 A1 | 10/2009 | Nihalani et al. | |
| 2009/0259499 A1 | 10/2009 | Bhojwani et al. | |
| 2009/0265236 A1 | 10/2009 | Schultz et al. | |
| 2009/0271263 A1 | 10/2009 | Regmi et al. | |
| 2009/0276306 A1 | 11/2009 | Hicks | |
| 2009/0287562 A1 | 11/2009 | Bosch et al. | |
| 2009/0288012 A1 | 11/2009 | Hertel et al. | |
| 2009/0288140 A1 | 11/2009 | Huber | |
| 2009/0289111 A1 | 11/2009 | Motycka et al. | |
| 2009/0307114 A1* | 12/2009 | Hahn-Carlson | G06Q 10/08 705/30 |
| 2009/0313109 A1* | 12/2009 | Bous | G06Q 30/02 705/14.31 |

(56) References Cited

U.S. PATENT DOCUMENTS

| | | |
|---|---|---|
| 2009/0319353 A1 | 12/2009 | Palmeri |
| 2009/0327062 A1 | 12/2009 | Botes |
| 2009/0327129 A1 | 12/2009 | Collas |
| 2009/0327174 A1 | 12/2009 | Honkala |
| 2010/0002722 A1 | 1/2010 | Porat |
| 2010/0057565 A1 | 3/2010 | Au-Yeung et al. |
| 2010/0076777 A1 | 3/2010 | Paretti et al. |
| 2010/0079336 A1 | 4/2010 | Skibiski et al. |
| 2010/0082418 A1 | 4/2010 | Loeger et al. |
| 2010/0082446 A1 | 4/2010 | Hjelm et al. |
| 2010/0088174 A1 | 4/2010 | Cohagan et al. |
| 2010/0088219 A1* | 4/2010 | Knowles ............... G06Q 20/105 705/37 |
| 2010/0094697 A1 | 4/2010 | Cananaugh |
| 2010/0094698 A1 | 4/2010 | Cawley |
| 2010/0094699 A1 | 4/2010 | Beal |
| 2010/0106568 A1 | 4/2010 | Grimes |
| 2010/0106569 A1 | 4/2010 | Grimes |
| 2010/0106578 A1 | 4/2010 | Allio et al. |
| 2010/0106596 A1 | 4/2010 | Grimes |
| 2010/0114661 A1* | 5/2010 | Alderfer ............... G06Q 30/02 705/14.3 |
| 2010/0114686 A1 | 5/2010 | Carlson et al. |
| 2010/0131342 A1 | 5/2010 | Thibedeau |
| 2010/0131840 A1 | 5/2010 | Walker et al. |
| 2010/0138299 A1 | 6/2010 | Preston et al. |
| 2010/0145744 A1* | 6/2010 | Beck ............... G06Q 10/02 705/5 |
| 2010/0145762 A1 | 6/2010 | Coladonato et al. |
| 2010/0145778 A1 | 6/2010 | Fordyce et al. |
| 2010/0145786 A1 | 6/2010 | Fordyce, III et al. |
| 2010/0145798 A1* | 6/2010 | Richards ............... B65D 31/12 705/14.49 |
| 2010/0145835 A1* | 6/2010 | Davis ............... G06Q 20/10 705/30 |
| 2010/0145860 A1 | 6/2010 | Pelegero |
| 2010/0153194 A1 | 6/2010 | Oram |
| 2010/0179869 A1* | 7/2010 | Hofer ............... G06Q 20/102 705/14.23 |
| 2010/0179879 A1 | 7/2010 | Cunningham et al. |
| 2010/0191572 A1 | 7/2010 | Newman et al. |
| 2010/0203963 A1 | 8/2010 | Allen |
| 2010/0211419 A1 | 8/2010 | Nickolayev et al. |
| 2010/0228613 A1 | 9/2010 | Anderson et al. |
| 2010/0235283 A1* | 9/2010 | Gerson ............... G06Q 20/1085 705/75 |
| 2010/0241502 A1 | 9/2010 | Walker et al. |
| 2010/0241559 A1 | 9/2010 | O'Connor et al. |
| 2010/0250351 A1 | 9/2010 | Gillenson et al. |
| 2010/0250356 A1 | 9/2010 | Gillenson et al. |
| 2010/0257047 A1* | 10/2010 | Foodman ............... G06Q 10/10 705/14.26 |
| 2010/0262456 A1 | 10/2010 | Feng et al. |
| 2010/0312629 A1 | 12/2010 | Wolf et al. |
| 2010/0324990 A1 | 12/2010 | D'Angelo et al. |
| 2010/0325048 A1 | 12/2010 | Carlson |
| 2010/0332307 A1 | 12/2010 | Parento |
| 2011/0004497 A1 | 1/2011 | Mortimore, Jr. et al. |
| 2011/0004554 A1* | 1/2011 | Knight ............... G06Q 20/04 705/45 |
| 2011/0004558 A1* | 1/2011 | MacLean ............... G06Q 30/02 705/80 |
| 2011/0022448 A1* | 1/2011 | Strock ............... G06Q 30/02 705/14.1 |
| 2011/0022455 A1 | 1/2011 | Wolf et al. |
| 2011/0029363 A1 | 2/2011 | Gillenson et al. |
| 2011/0029364 A1 | 2/2011 | Roeding et al. |
| 2011/0029367 A1 | 2/2011 | Olson et al. |
| 2011/0035266 A1 | 2/2011 | Patterson |
| 2011/0035269 A1* | 2/2011 | Cohagan ............... G06Q 30/02 705/14.32 |
| 2011/0040539 A1 | 2/2011 | Szymczyk et al. |
| 2011/0047023 A1 | 2/2011 | Lieblang et al. |
| 2011/0055880 A1 | 3/2011 | Archer |
| 2011/0066483 A1 | 3/2011 | Salmon et al. |
| 2011/0066548 A1* | 3/2011 | Rodin ............... G06Q 20/10 705/39 |
| 2011/0078030 A1 | 3/2011 | Borst et al. |
| 2011/0078055 A1 | 3/2011 | Faribault et al. |
| 2011/0083101 A1 | 4/2011 | Sharon et al. |
| 2011/0087530 A1 | 4/2011 | Fordyce et al. |
| 2011/0087531 A1 | 4/2011 | Winters et al. |
| 2011/0093327 A1 | 4/2011 | Fordyce et al. |
| 2011/0093335 A1 | 4/2011 | Fordyce et al. |
| 2011/0093361 A1 | 4/2011 | Morales |
| 2011/0106607 A1 | 5/2011 | Alfonso et al. |
| 2011/0119133 A1 | 5/2011 | Igelman et al. |
| 2011/0125561 A1 | 5/2011 | Marcus |
| 2011/0125565 A1 | 5/2011 | MacIlwaine et al. |
| 2011/0125645 A1* | 5/2011 | Benkert ............... G06Q 20/04 705/44 |
| 2011/0131077 A1 | 6/2011 | Tan |
| 2011/0137716 A1 | 6/2011 | Reuthe et al. |
| 2011/0137717 A1 | 6/2011 | Reuthe et al. |
| 2011/0137721 A1 | 6/2011 | Bansal |
| 2011/0145047 A1 | 6/2011 | Chetty et al. |
| 2011/0145149 A1 | 6/2011 | Valdes et al. |
| 2011/0161149 A1 | 6/2011 | Kaplan |
| 2011/0161154 A1 | 6/2011 | McLaughlin et al. |
| 2011/0161172 A1 | 6/2011 | Lee |
| 2011/0167440 A1 | 7/2011 | Greenfield |
| 2011/0178928 A1* | 7/2011 | Carmichael ............... G06K 7/10079 705/44 |
| 2011/0184792 A1 | 7/2011 | Butcher et al. |
| 2011/0191150 A1 | 8/2011 | Blackhurst et al. |
| 2011/0213670 A1 | 9/2011 | Strutton |
| 2011/0218031 A1 | 9/2011 | Bryant et al. |
| 2011/0225033 A1 | 9/2011 | Schmeyer et al. |
| 2011/0225063 A1* | 9/2011 | Grunski ............... G06Q 20/10 705/26.8 |
| 2011/0231224 A1 | 9/2011 | Winters |
| 2011/0231235 A1 | 9/2011 | MacIlwaine et al. |
| 2011/0231246 A1 | 9/2011 | Bhatia et al. |
| 2011/0238469 A1 | 9/2011 | Gershman et al. |
| 2011/0246219 A1 | 10/2011 | Smith |
| 2011/0246280 A1 | 10/2011 | Satyavolu et al. |
| 2011/0246281 A1 | 10/2011 | Satyavolu et al. |
| 2011/0246287 A1 | 10/2011 | Wright et al. |
| 2011/0246299 A1 | 10/2011 | Satyavolu et al. |
| 2011/0251883 A1* | 10/2011 | Satyavolu ............... G06Q 30/02 705/14.25 |
| 2011/0251891 A1 | 10/2011 | Satyavolu et al. |
| 2011/0251934 A1 | 10/2011 | Satyavolu et al. |
| 2011/0258011 A1 | 10/2011 | Burns |
| 2011/0264490 A1 | 10/2011 | Durvasula et al. |
| 2011/0270617 A1 | 11/2011 | Murta et al. |
| 2011/0270666 A1 | 11/2011 | Welsh et al. |
| 2011/0276373 A1 | 11/2011 | Juszczak et al. |
| 2011/0276377 A1 | 11/2011 | Kim et al. |
| 2011/0282702 A1 | 11/2011 | Mortimore, Jr. |
| 2011/0288918 A1 | 11/2011 | Cervenka et al. |
| 2011/0295689 A1 | 12/2011 | Brady |
| 2011/0295749 A1 | 12/2011 | Scalisi |
| 2011/0302011 A1 | 12/2011 | Yoder et al. |
| 2011/0307509 A1 | 12/2011 | Hsiao |
| 2011/0313840 A1 | 12/2011 | Mason et al. |
| 2011/0313874 A1 | 12/2011 | Hardie et al. |
| 2011/0320250 A1 | 12/2011 | Gemmell et al. |
| 2012/0004964 A1 | 1/2012 | Satyavolu et al. |
| 2012/0004965 A1 | 1/2012 | Satyavolu et al. |
| 2012/0004966 A1 | 1/2012 | Satyavolu et al. |
| 2012/0004967 A1 | 1/2012 | Satyavolu et al. |
| 2012/0004968 A1 | 1/2012 | Satyavolu et al. |
| 2012/0004969 A1 | 1/2012 | Satyavolu et al. |
| 2012/0004970 A1 | 1/2012 | Satyavolu et al. |
| 2012/0004975 A1 | 1/2012 | Satyavolu et al. |
| 2012/0010932 A1 | 1/2012 | Satyavolu et al. |
| 2012/0010933 A1 | 1/2012 | Satyavolu et al. |
| 2012/0010934 A1 | 1/2012 | Walker et al. |
| 2012/0010936 A1 | 1/2012 | Satyavolu et al. |
| 2012/0010937 A1 | 1/2012 | Hanson et al. |
| 2012/0015714 A1* | 1/2012 | Ocko ............... G06Q 10/10 463/25 |

(56) References Cited

U.S. PATENT DOCUMENTS

| | | |
|---|---|---|
| 2012/0022923 A1 | 1/2012 | Walker et al. |
| 2012/0023122 A1 | 1/2012 | Gregov et al. |
| 2012/0029990 A1 | 2/2012 | Fisher |
| 2012/0029996 A1 | 2/2012 | Lang et al. |
| 2012/0030048 A1 | 2/2012 | Manley et al. |
| 2012/0035997 A1 | 2/2012 | Burgess et al. |
| 2012/0036079 A1 | 2/2012 | Sushil et al. |
| 2012/0036178 A1 | 2/2012 | Gavini et al. |
| 2012/0041810 A1* | 2/2012 | Hofer ............... G06Q 20/12 705/14.23 |
| 2012/0046958 A1 | 2/2012 | Pynadath |
| 2012/0047008 A1* | 2/2012 | Alhadeff ........... G06Q 30/0214 705/14.16 |
| 2012/0053987 A1 | 3/2012 | Satyavolu et al. |
| 2012/0059701 A1 | 3/2012 | Van Der Veen et al. |
| 2012/0066037 A1 | 3/2012 | Glen |
| 2012/0066046 A1 | 3/2012 | Satyavolu et al. |
| 2012/0066050 A1* | 3/2012 | Satyavolu ........ G06Q 30/0224 705/14.27 |
| 2012/0066051 A1 | 3/2012 | Black et al. |
| 2012/0066062 A1 | 3/2012 | Yoder et al. |
| 2012/0072270 A1 | 3/2012 | Waylonis et al. |
| 2012/0078689 A1 | 3/2012 | Rothschild |
| 2012/0089508 A1* | 4/2012 | Lindbom ............ G06Q 20/102 705/40 |
| 2012/0101881 A1 | 4/2012 | Taylor et al. |
| 2012/0109751 A1 | 5/2012 | Binenstock et al. |
| 2012/0130737 A1 | 5/2012 | Finizio |
| 2012/0150641 A1 | 6/2012 | Dobbs |
| 2012/0150740 A1 | 6/2012 | Isaacson et al. |
| 2012/0196568 A1 | 8/2012 | Bakshi |
| 2012/0197707 A1* | 8/2012 | Cohagan ............ G06Q 30/02 705/14.27 |
| 2012/0197887 A1 | 8/2012 | Anderson |
| 2012/0203604 A1 | 8/2012 | Brown et al. |
| 2012/0203846 A1 | 8/2012 | Hull et al. |
| 2012/0209672 A1* | 8/2012 | Winner ............. G06Q 30/02 705/14.13 |
| 2012/0209695 A1 | 8/2012 | Winner et al. |
| 2012/0209696 A1 | 8/2012 | Winner et al. |
| 2012/0209771 A1* | 8/2012 | Winner ............. G06Q 30/02 705/44 |
| 2012/0220308 A1 | 8/2012 | Ledlie |
| 2012/0221437 A1 | 8/2012 | Yoo |
| 2012/0221479 A1 | 8/2012 | Schneck et al. |
| 2012/0226530 A1 | 9/2012 | Gebb et al. |
| 2012/0233073 A1* | 9/2012 | Salmon ............. G06Q 40/00 705/44 |
| 2012/0239417 A1 | 9/2012 | Pourfallah |
| 2012/0239477 A1* | 9/2012 | Cueli ............... G06Q 20/027 705/14.23 |
| 2012/0239479 A1 | 9/2012 | Amaro et al. |
| 2012/0239556 A1* | 9/2012 | Magruder ........... G06Q 20/381 705/39 |
| 2012/0246004 A1 | 9/2012 | Book |
| 2012/0253852 A1 | 10/2012 | Pourfallah |
| 2012/0253957 A1 | 10/2012 | Bakshi |
| 2012/0278127 A1 | 11/2012 | Kirakosyan et al. |
| 2012/0296724 A1 | 11/2012 | Faro et al. |
| 2012/0303425 A1 | 11/2012 | Katzin et al. |
| 2012/0303430 A1 | 11/2012 | Tiku et al. |
| 2013/0006737 A1 | 1/2013 | Goldberg |
| 2013/0006766 A1 | 1/2013 | Dedeoglu |
| 2013/0013396 A1 | 1/2013 | Vinson et al. |
| 2013/0024256 A1 | 1/2013 | Wolf et al. |
| 2013/0040654 A1 | 2/2013 | Parish |
| 2013/0041902 A1 | 2/2013 | Swann et al. |
| 2013/0060623 A1 | 3/2013 | Walker et al. |
| 2013/0060644 A1 | 3/2013 | Le Ouay |
| 2013/0073336 A1 | 3/2013 | Heath |
| 2013/0073361 A1 | 3/2013 | Silver |
| 2013/0073366 A1 | 3/2013 | Heath |
| 2013/0073371 A1 | 3/2013 | Bosworth et al. |
| 2013/0073374 A1 | 3/2013 | Heath |
| 2013/0073376 A1 | 3/2013 | Heath |
| 2013/0073377 A1 | 3/2013 | Heath |
| 2013/0073387 A1 | 3/2013 | Heath |
| 2013/0073388 A1 | 3/2013 | Heath |
| 2013/0073389 A1 | 3/2013 | Heath |
| 2013/0073400 A1 | 3/2013 | Heath |
| 2013/0073473 A1 | 3/2013 | Heath |
| 2013/0073568 A1 | 3/2013 | Federov et al. |
| 2013/0080259 A1 | 3/2013 | Durvasula |
| 2013/0091000 A1 | 4/2013 | Hagey et al. |
| 2013/0103472 A1 | 4/2013 | Burgess et al. |
| 2013/0110555 A1 | 5/2013 | Dunham |
| 2013/0110604 A1 | 5/2013 | Rooke et al. |
| 2013/0124283 A1 | 5/2013 | Kaulbach |
| 2013/0132175 A1 | 5/2013 | Claessen et al. |
| 2013/0132183 A1 | 5/2013 | Klein et al. |
| 2013/0145016 A1 | 6/2013 | Vantalon |
| 2013/0151602 A1 | 6/2013 | McClelland et al. |
| 2013/0173320 A1 | 7/2013 | Bank et al. |
| 2013/0173478 A1 | 7/2013 | Farhi |
| 2013/0178280 A1 | 7/2013 | Ganz |
| 2013/0179246 A1 | 7/2013 | Ross et al. |
| 2013/0191195 A1* | 7/2013 | Carlson ............. G06Q 30/0261 705/14.17 |
| 2013/0212177 A1 | 8/2013 | Friedman |
| 2013/0218653 A1 | 8/2013 | Rooke et al. |
| 2013/0238412 A1 | 9/2013 | Boncyk et al. |
| 2013/0246146 A1 | 9/2013 | Fischer et al. |
| 2013/0246185 A1 | 9/2013 | Hardman et al. |
| 2013/0260727 A1 | 10/2013 | Knudson et al. |
| 2013/0262209 A1 | 10/2013 | Boyer |
| 2013/0268333 A1 | 10/2013 | Ovick et al. |
| 2013/0275192 A1 | 10/2013 | Aissa |
| 2013/0304563 A1 | 11/2013 | Haupt et al. |
| 2013/0325946 A1 | 12/2013 | Allison, Jr. et al. |
| 2013/0346170 A1 | 12/2013 | Epstein et al. |
| 2014/0006129 A1 | 1/2014 | Heath |
| 2014/0006132 A1 | 1/2014 | Barker |
| 2014/0025451 A1 | 1/2014 | Knowles et al. |
| 2014/0025452 A1 | 1/2014 | Knowles et al. |
| 2014/0025453 A1 | 1/2014 | Knowles et al. |
| 2014/0025460 A1 | 1/2014 | Knowles et al. |
| 2014/0046675 A1 | 2/2014 | Harwood |
| 2014/0046744 A1 | 2/2014 | Hagey |
| 2014/0046748 A1 | 2/2014 | Nagarajan et al. |
| 2014/0046794 A1 | 2/2014 | Vallery |
| 2014/0108108 A1 | 4/2014 | Artman et al. |
| 2014/0108521 A1 | 4/2014 | Marquess |
| 2014/0164199 A1 | 6/2014 | Wilkes |
| 2015/0039393 A1 | 2/2015 | Jain |
| 2015/0073980 A1 | 3/2015 | Griffin |
| 2015/0170256 A1 | 6/2015 | Pettyjohn |
| 2015/0248702 A1 | 9/2015 | Chatterton |

FOREIGN PATENT DOCUMENTS

| | | |
|---|---|---|
| WO | 2012106114 | 8/2012 |
| WO | 2012170088 | 12/2012 |
| WO | 2013015846 | 1/2013 |
| WO | 2014106207 | 7/2014 |
| WO | 2015102889 | 7/2015 |
| WO | 2015134947 | 9/2015 |

OTHER PUBLICATIONS

USPTO; Final Office Action dated Apr. 5, 2011 in U.S. Appl. No. 12/857,424.

Todorova, Aleksandra, "The Best Rewards Programs," www.smartmoney.com, Sep. 2005, pp. 1-2.

Todorova, Aleksandra, "Capital One Tests a New Type of Debit Card," www.smartmoney.com, Jun. 2007, pp. 1-2.

Nickel, "Citi Thank You Redemptions: No Thanks," www.fivecentnickel.com, Sep. 2005.

American Express Website, Frequenty Asked Questions regarding American Express GiftCards, www.americanexpress.com/gift/faq from Feb. 25, 2005, 2 pages.

USPTO; Office Action dated Nov. 26, 2010 in U.S. Appl. No. 12/857,424.

(56) References Cited

OTHER PUBLICATIONS

USPTO; Office Action dated Nov. 26, 2010 in U.S. Appl. No. 12/857,389.
USPTO; Office Action dated Apr. 30, 2010 in U.S. Appl. No. 11/779,734.
USPTO; Advisory Action dated Jan. 6, 2011 in U.S. Appl. No. 11/779,734.
USPTO; Final Office Action dated Oct. 15, 2010 in U.S. Appl. No. 11/779,734.
USPTO; Advisory Action dated Jul. 11, 2011 in U.S. Appl. No. 12/857,389.
USPTO; Advisory Action dated Jul. 11, 2011 in U.S. Appl. No. 12/857,424.
PCT; International Search Report and Written Opinion dated Nov. 17, 2011 in Application No. PCT/US2011/047012.
USPTO; Office Action dated Nov. 10, 2011 in U.S. Appl. No. 13/153,890.
USPTO; Final Office Action dated Apr. 5, 2012 in U.S. Appl. No. 13/153,890.
PCT; International Search Report and Written Opinion dated May 7, 2012 in Application No. PCT/US2012/021648.
PCT; International Search Report and Written Opinion dated Jun. 19, 2012 in Application No. PCT/US2012/027810.
PCT; International Search Report and Written Opinion dated Jul. 6, 2012 in Application No. PCT/US2012/027664.
USPTO; Office Action dated Aug. 3, 2012 in U.S. Appl. No. 13/466,412.
USPTO; Office Action dated Aug. 17, 2012 in U.S. Appl. No. 13/466,445.
USPTO; Office Action dated Aug. 30, 2012 in U.S. Appl. No. 13/188,693.
USPTO; Office Action dated Aug. 30, 2012 in U.S. Appl. No. 13/468,880.
USPTO; Office Action dated Sep. 6, 2012 in U.S. Appl. No. 13/467,503.
USPTO; Office Action dated Sep. 14, 2012 in U.S. Appl. No. 13/476,910.
USPTO; Office Action dated Sep. 17, 2012 in U.S. Appl. No. 13/021,237.
USPTO; Office Action dated Oct. 9, 2012 in U.S. Appl. No. 13/468,931.
USPTO; Office Action dated Oct. 9, 2012 in U.S. Appl. No. 13/477,806.
USPTO; Office Action dated Oct. 12, 2012 in U.S. Appl. No. 13/439,768.
USPTO; Final Office Action dated Oct. 12, 2012 in U.S. Appl. No. 13/466,412.
USPTO; Office Action dated Oct. 15, 2012 in U.S. Appl. No. 13/594,528.
USPTO; Office Action dated Oct. 18, 2012 in U.S. Appl. No. 13/593,204.
USPTO; Office Action dated Oct. 19, 2012 in U.S. Appl. No. 13/411,281.
Dan Oshinsky, "Jet Blue's $1 Million Twitter Hashtag," Aug. 18, 2010, 4 pages, retrieved from: http://danoshinsky.com/2010/08/18/a-social-media-case-study-jetblue-vs-sun-country/.
USPTO; Office Action dated Nov. 15, 2012 in U.S. Appl. No. 13/443,100.
USPTO; Advisory Action dated Nov. 23, 2012 in U.S. Appl. No. 13/466,412.
International Preliminary Report on Patentability dated Dec. 7, 2012 in Application No. PCT/US2011/047012.
MG Seigler, "Want Everyone to See your Credit Card Transactions? Of Course you do. Meet Blippy.", techcrunch.com, Dec. 11, 2009, 3 pages.
Tsotsis, Alexia, "The End of Blippy as We Know it." techcrunch.com, May 19, 2011, 3 pages.
USPTO; Office Action dated Jan. 4, 2013 in U.S. Appl. No. 13/593,204.
USPTO; Office Action dated Jan. 7, 2013 in U.S. Appl. No. 13/467,503.
USPTO; Office Action dated Jan. 7, 2013 in U.S. Appl. No. 13/466,445.
USPTO; Advisory Action dated Mar. 15, 2013 in U.S. Appl. No. 13/593,204.
USPTO; Advisory Action dated Mar. 18, 2013 in U.S. Appl. No. 13/467,503.
USPTO; Advisory Action dated Mar. 19, 2013 in U.S. Appl. No. 13/021,237.
USPTO; Advisory Action dated Mar. 19, 2013 in U.S. Appl. No. 13/468,931.
International Search Report and Written Opinion dated Mar. 22, 2013 in Application No. PCT/2013/028209.
USPTO; Advisory Action dated Mar. 28, 2013 in U.S. Appl. No. 13/411,281.
USPTO; Office Action dated Apr. 11, 2013 in U.S. Appl. No. 12/857,424.
USPTO; Office Action dated Apr. 12, 2013 in U.S. Appl. No. 13/467,910.
USPTO; Final Office Action dated Mar. 1, 2013 in U.S. Appl. No. 13/439,768.
USPTO; Final Office Action dated Mar. 4, 2013 in U.S. Appl. No. 13/594,528.
USPTO; Final Office Action dated Mar. 6, 2013 in U.S. Appl. No. 13/188,693.
USPTO; Final Office Action dated Jan. 10, 2013 in U.S. Appl. No. 13/468,931.
USPTO; Final Office Action dated Jan. 31, 2013 in U.S. Appl. No. 13/411,281.
USPTO; Final Office Action dated Jan. 31, 2013 in U.S. Appl. No. 13/467,910.
USPTO; Final Office Action dated Feb. 14, 2013 in U.S. Appl. No. 13/021,237.
USPTO; Final Office Action dated Feb. 25, 2013 in U.S. Appl. No. 13/477,806.
USPTO; Office Action dated May 2, 2013 in U.S. Appl. No. 13/468,880.
International Preliminary Report on Patentability dated May 7, 2013 in Application No. PCT/US2012/021648.
USPTO; Advisory Action dated May 9, 2013 in U.S. Appl. No. 13/477,806.
USPTO; Advisory Action dated May 22, 2013 in U.S. Appl. No. 13/188,693.
USPTO; Office Action dated May 23, 2013 in U.S. Appl. No. 13/734,693.
International Preliminary Report on Patentability dated May 23, 2013 in Application No. PCT/US2012/027810.
International Preliminary Report on Patentability dated Jun. 28, 2013 in Application No. PCT/US2012/027664.
USPTO; Advisory Action dated Jun. 6, 2013 in U.S. Appl. No. 13/466,445.
USPTO; Office Action dated Jul. 19, 2013 in U.S. Appl. No. 13/715,423.
USPTO; Office Action dated Aug. 14, 2013 in U.S. Appl. No. 11/779,734.
USPTO; Final Office Action dated Aug. 14, 2013 in U.S. Appl. No. 12/857,424.
USPTO; Office Action dated Aug. 26, 2013 in U.S. Appl. No. 13/889,305.
USPTO; Office Action dated Aug. 27, 2013 in U.S. Appl. No. 13/889,285.
USPTO; Final Office Action dated Aug. 28, 2013 in U.S. Appl. No. 13/443,100.
USPTO; Office Action dated Sep. 23, 2013 in U.S. Appl. No. 13/889,307.
USPTO; Advisory Action dated Oct. 7, 2013 in U.S. Appl. No. 12/857,424.
USPTO; Advisory Action dated Oct. 4, 2013 in U.S. Appl. No. 13/468,880.
USPTO; Final Office Action dated Oct. 30, 2013 in U.S. Appl. No. 11/779,734.

(56) References Cited

OTHER PUBLICATIONS

USPTO; Restriction Requirement dated Oct. 30, 2013 in U.S. Appl. No. 13/889,288.
USPTO; Final Office Action dated Oct. 31, 2013 in U.S. Appl. No. 13/889,305.
USPTO; Advisory Action dated Nov. 5, 2013 in U.S. Appl. No. 13/443,100.
USPTO; Final Office Action dated Nov. 5, 2013 in U.S. Appl. No. 13/889,285.
USPTO; Office Action dated Nov. 6, 2013 in U.S. Appl. No. 13/889,272.
USPTO; Office Action dated Nov. 22, 2013 in U.S. Appl. No. 13/889,299.
USPTO; Final Office Action dated Nov. 26, 2013 in U.S. Appl. No. 13/734,693.
USPTO; Notice of Allowance dated Dec. 17, 2013 in U.S. Appl. No. 13/594,528.
USPTO; Office Action dated Jan. 3, 2014 in U.S. Appl. No. 13/889,288.
USPTO; Advisory Action dated Jan. 14, 2014 in U.S. Appl. No. 13/889,285.
USPTO; Office Action dated Jan. 15, 2014 in U.S. Appl. No. 13/411,281.
USPTO; Final Office Action dated Jan. 29, 2014 in U.S. Appl. No. 13/889,307.
USPTO; Office Action dated Jan. 30, 2014 in U.S. Appl. No. 13/476,910.
USPTO; Office Action dated Feb. 3, 2014 in U.S. Appl. No. 13/593,204.
International Preliminary Report on Patentability dated Feb. 3, 2014 in Application No. PCT/US2013/028209.
USPTO; Advisory Action dated Feb. 5, 2014 in U.S. Appl. No. 13/734,693.
USPTO; Final Office Action dated Feb. 11, 2014 in U.S. Appl. No. 13/715,423.
USPTO; Office Action dated Feb. 12, 2014 in U.S. Appl. No. 13/468,931.
Golson, "Major League Baseball Rolling out Thousands of iBeacons for Opening Day," Jan. 30, 2014, pp. 2-3, retrieved from http://www.macrumors.com/2014/01/30/mlb-ibeacon-rollout/ on Feb. 12, 2014.
D Arthur, S Vassilvitskii , "k-means++: The advantages of careful seeding", Proceedings of the eighteenth annual ACM-SIAM symposium on Discrete algorithms, pp. 1027-1035, 2007, dl.acm.org.
AK Jain, "Data clustering: 50 years beyond K-means", Pattern Recognition Letters, 2010, pp. 1-33, Elsevier.
K-means++ Wikipedia Page, pp. 1-4, page last modified on Nov. 18, 2013, http://en.wikipedia.org/wiki/K-means++ retrieved from the web Nov. 21, 2013.
USPTO; Advisory Action dated Apr. 30, 2014 in U.S. Appl. No. 13/715,423.
USPTO; Final Office Action dated May 5, 2014 in U.S. Appl. No. 13/411,281.
USPTO; Office Action dated Jan. 15, 2016 in U.S. Appl. No. 13/889,299.
USPTO; Advisory Action dated Jan. 15, 2016 in U.S. Appl. No. 13/476,910.
USPTO; Office Action dated Jan. 20, 2016 in U.S. Appl. No. 13/889,307.
Pashtan, et al., "Personal Service Areas for Mobile Web Applications," IEEE Internet Computing, 2004, ieeexplore.ieee.org, 7 pages.
Pandey, et al., "Exploiting User Profiles to Support Differentiated Services in Next-Generation Wireless Networks," Network, IEEE, 2004, ieeexplore.ieee.org, 23 pages.
Liapis, et al., Implementing a Low-Cost, Personalized and Location Based Service for Delivering Advertisements to Mobile Users, Athens Information Technology, Oct. 2008, ieeexplore.ieee.org, 49 pages.
Park, et al., "Location-Based Recommendation System using Bayesian User's Preference Model in Mobile Devices," Ubiquitous Intelligence and Computing, 2007, Springer-Verlag Berlin Heidelberg, 10 pages.
Office Action dated Oct. 26, 2015 in Canadian Application No. 2,863,576.
Notice of Acceptance dated Nov. 30, 2015 in Australian Application No. 2012316453.
Office Action dated Dec. 10, 2015 in Canadian Application No. 2,849,271.
USPTO; Office Action dated Feb. 1, 2016 in U.S. Appl. No. 13/443,100.
USPTO; Final Office Action dated Feb. 2, 2016 in U.S. Appl. No. 13/926,789.
USPTO; Final Office Action dated Feb. 2, 2016 in U.S. Appl. No. 13/941,306.
USPTO; Final Office Action dated Feb. 9, 2016 in U.S. Appl. No. 13/794,374.
USPTO; Final Office Action dated Feb. 9, 2016 in U.S. Appl. No. 13/794,272.
USPTO; Final Office Action dated Feb. 11, 2016 in U.S. Appl. No. 13/794,334.
USPTO; Final Office Action dated Feb. 11, 2016 in U.S. Appl. No. 13/926,884.
USPTO; Final Office Action dated Feb. 12, 2016 in U.S. Appl. No. 13/926,895.
USPTO; Office Action dated Feb. 12, 2016 in U.S. Appl. No. 13/593,204.
USPTO; Office Action dated Feb. 19, 2016 in U.S. Appl. No. 13/468,931.
Office Action dated Feb. 29, 2016 in Canadian Application No. 2,874,582.
USPTO; Office Action dated Feb. 29, 2016 in U.S. Appl. No. 13/686,608.
USPTO; Office Action dated Mar. 4, 2016 in U.S. Appl. No. 13/466,412.
USPTO; Office Action dated Mar. 4, 2016 in U.S. Appl. No. 13/794,226.
USPTO; Office Action dated Mar. 7, 2016 in U.S. Appl. No. 12/857,389.
USPTO; Office Action dated Mar. 17, 2016 in U.S. Appl. No. 13/889,305.
USPTO; Advisory Action dated Mar. 18, 2016 in U.S. Appl. No. 13/439,768.
USPTO; Advisory Action dated Mar. 18, 2016 in U.S. Appl. No. 13/411,281.
USPTO; Advisory Action dated Mar. 25, 2016 in U.S. Appl. No. 13/794,301.
USPTO; Advisory Action dated Mar. 28, 2016 in U.S. Appl. No. 14/065,883.
White, "Deals as Debit Rewards? Bank of America Brings Back Debit Card Rewards With a Twist," Jan. 25, 2012, 2 pages, retrieved from http://moneyland.time.com/2012/01/25/deals-as-debit-rewards-bank-of-america-brings-back-debit-card-rewards-with-a-twist/.
Owen, et al., "Improving the Value and Performance of Online Offers," A First Data White Paper, First Data Corporation, 2012, 10 pages.
Noyes, "Card-Linked Offers Update," Transaction World Magazine, Jul. 2012, 2 pages.
Examination Report dated Feb. 26, 2016 in Australian Application No. 2015201925.
USPTO; Office Action dated Mar. 31, 2016 in U.S. Appl. No. 13/889,288.
USPTO; Final Office Action dated Apr. 14, 2016 in U.S. Appl. No. 13/715,770.
USPTO; Office Action dated Apr. 15, 2016 in U.S. Appl. No. 13/188,693.
USPTO; Advisory Action dated Apr. 15, 2016 in U.S. Appl. No. 13/926,789.
USPTO; Notice of Allowance dated Apr. 18, 2016 in U.S. Appl. No. 13/734,693.
USPTO; Advisory Action dated Apr. 21, 2016 in U.S. Appl. No. 13/794,272.

(56) References Cited

OTHER PUBLICATIONS

USPTO; Advisory Action dated Apr. 22, 2016 in U.S. Appl. No. 13/794,374.
Office Action dated Apr. 25, 2016 in Canadian Application No. 2,888,085.
USPTO; Advisory Action dated May 2, 2016 in U.S. Appl. No. 13/926,884.
USPTO; Advisory Action dated May 2, 2016 in U.S. Appl. No. 13/794,334.
USPTO; Office Action dated May 16, 2016 in U.S. Appl. No. 13/153,890.
USPTO; Office Action dated May 19, 2016 in U.S. Appl. No. 13/926,895.
Ghose, et al., "Opinion Mining using Econometrics: A case study on Reputation Systems", Department of Information, Operations, and Management Sciences, Annual Meeting, 2007.
Pang, et al., "Opinion mining and sentiment analysis", Foundations and trends in information retrieval, vol. 2, No. 1-2 (2008) 1-135.
Pavlovic, "Dynamics, robustness and fragility of trust", Formal Aspects in Secruity and Trust, 2009—Springer.
USPTO; Office Action dated Feb. 26, 2014 in U.S. Appl. No. 13/467,503.
USPTO; Office Action dated Feb. 26, 2014 in U.S. Appl. No. 12/857,389.
USPTO; Office Action dated Feb. 26, 2014 in U.S. Appl. No. 13/466,412.
USPTO; Office Action dated Feb. 26, 2014 in U.S. Appl. No. 13/021,237.
USPTO; Office Action dated Feb. 26, 2014 in U.S. Appl. No. 13/466,445.
USPTO; Office Action dated Feb. 26, 2014 in U.S. Appl. No. 13/889,305.
USPTO; Office Action dated Mar. 7, 2014 in U.S. Appl. No. 13/889,285.
USPTO; Office Action dated Mar. 11, 2014 in U.S. Appl. No. 13/153,890.
USPTO; Final Office Action dated Mar. 13, 2014 in U.S. Appl. No. 13/889,272.
USPTO; Final Office Action dated Apr. 25, 2014 in U.S. Appl. No. 13/889,299.
USPTO; Final Office Action dated Apr. 28, 2014 in U.S. Appl. No. 13/889,288.
USPTO; Notice of Allowance dated May 22, 2014 in U.S. Appl. No. 13/245,636.
International Preliminary Report on Patentability dated Aug. 22, 2013 in PCT/US2012/056231.
USPTO; Office Action dated May 7, 2014 in U.S. Appl. No. 13/477,806.
USPTO; Final Office Action dated May 13, 2014 in U.S. Appl. No. 13/476,910.
USPTO; Final Office Action dated May 20, 2014 in U.S. Appl. No. 13/593,204.
USPTO; Advisory Action dated Jul. 8, 2014 in U.S. Appl. No. 13/889,299.
USPTO; Final Office Action dated May 29, 2014 in U.S. Appl. No. 13/468,931.
USPTO; Advisory Action dated Jun. 2, 2014 in U.S. Appl. No. 13/889,272.
USPTO; Office Action dated Jun. 5, 2014 in U.S. Appl. No. 11/779,734.
USPTO; Office Action dated Jun. 11, 2014 in U.S. Appl. No. 13/188,693.
USPTO; Final Office Action dated Jun. 16, 2014 in U.S. Appl. No. 13/467,503.
USPTO; Final Office Action dated Jun. 16, 2014 in U.S. Appl. No. 12/857,389.
USPTO; Final Office Action dated Jun. 16, 2014 in U.S. Appl. No. 13/466,412.
USPTO; Final Office Action dated Jun. 16, 2014 in U.S. Appl. No. 13/466,445.
USPTO; Office Action dated Jun. 24, 2014 in U.S. Appl. No. 13/468,880.
USPTO; Final Office Action dated Jun. 30, 2014 in U.S. Appl. No. 13/021,237.
USPTO; Final Office Action dated Jun. 30, 2014 in U.S. Appl. No. 13/889,305.
USPTO; Notice of Allowance dated Jul. 2, 2014 in U.S. Appl. No. 13/889,285.
USPTO; Advisory Action dated Jul. 2, 2014 in U.S. Appl. No. 13/889,288.
USPTO; Office Action dated Jul. 3, 2014 in U.S. Appl. No. 13/889,307.
International Preliminary Report on Patentability dated Sep. 19, 2012 in Application No. PCT/US2011/047012.
USPTO; Final Office Action dated Jan. 28, 2015 in U.S. Appl. No. 13/889,307.
USPTO; Office Action dated Oct. 11, 2013 in U.S. Appl. No. 13/245,636.
USPTO; Office Action dated Feb. 5, 2014 in U.S. Appl. No. 13/245,636.
USPTO; Office Action dated Jul. 30, 2014 in U.S. Appl. No. 13/794,301.
USPTO; Advisory Action dated Jul. 30, 2014 in U.S. Appl. No. 13/411,281.
USPTO; Advisory Action dated Jul. 30, 2014 in U.S. Appl. No. 13/593,204.
USPTO; Advisory Action dated Jul. 31, 2014 in U.S. Appl. No. 13/476,910.
USPTO; Advisory Action dated Aug. 7, 2014 in U.S. Appl. No. 13/468,931.
Examination Report dated Aug. 11, 2014 in New Zealand Application No. 623019.
USPTO; Final Office Action dated Aug. 13, 2014 in U.S. Appl. No. 13/153,890.
USPTO; Office Action dated Aug. 14, 2014 in U.S. Appl. No. 13/794,145.
USPTO; Office Action dated Aug. 14, 2014 in U.S. Appl. No. 13/794,334.
USPTO; Office Action dated Aug. 15, 2014 in U.S. Appl. No. 13/794,374.
USPTO; Advisory Action dated Sep. 3, 2014 in U.S. Appl. No. 13/466,412.
USPTO; Advisory Action dated Sep. 3, 2014 in U.S. Appl. No. 13/467,503.
USPTO; Advisory Action dated Sep. 3, 2014 in U.S. Appl. No. 13/021,237.
USPTO; Advisory Action dated Sep. 3, 2014 in U.S. Appl. No. 12/857,389.
USPTO; Advisory Action dated Sep. 2, 2014 in U.S. Appl. No. 13/466,445.
USPTO; Advisory Action dated Jun. 10, 2015 in U.S. Appl. No. 13/477,806.
USPTO; Advisory Action dated Jun. 11, 2015 in U.S. Appl. No. 13/926,789.
USPTO; Advisory Action dated Jun. 15, 2015 in U.S. Appl. No. 13/715,770.
USPTO; Office Action dated Jun. 19, 2015 in U.S. Appl. No. 13/794,301.
USPTO; Office Action dated Jun. 25, 2015 in U.S. Appl. No. 13/889,307.
USPTO; Advisory Action dated Jun. 25, 2015 in U.S. Appl. No. 13/734,693.
USPTO; Advisory Action dated Jun. 26, 2015 in U.S. Appl. No. 13/794,145.
USPTO; Advisory Action dated Jun. 29, 2015 in U.S. Appl. No. 13/715,792.
USPTO; Office Action dated Jul. 10, 2015 in U.S. Appl. No. 13/794,374.
USPTO; Advisory Action dated Jul. 10, 2015 in U.S. Appl. No. 12/857,424.
USPTO; Office Action dated Jul. 10, 2015 in U.S. Appl. No. 13/411,281.

(56) References Cited

OTHER PUBLICATIONS

USPTO; Final Office Action dated Jul. 17, 2015 in U.S. Appl. No. 13/188,693.
USPTO; Final Office Action dated Jul. 20, 2015 in U.S. Appl. No. 13/686,608.
USPTO; Advisory Action dated Jul. 21, 2015 in U.S. Appl. No. 11/779,734.
USPTO; Final Office Action dated Jul. 23, 2015 in U.S. Appl. No. 13/466,445.
USPTO; Office Action dated Aug. 4, 2015 in U.S. Appl. No. 13/794,334.
USPTO; Office Action dated Aug. 5, 2015 in U.S. Appl. No. 13/926,789.
USPTO; Final Office Action dated Aug. 5, 2015 in U.S. Appl. No. 13/021,237.
USPTO; Final Office Action dated Aug. 7, 2015 in U.S. Appl. No. 13/889,299.
USPTO; Office Action dated Aug. 11, 2015 in U.S. Appl. No. 13/926,895.
USPTO; Final Office Action dated Aug. 12, 2015 in U.S. Appl. No. 13/468,880.
USPTO; Office Action dated Aug. 17, 2015 in U.S. Appl. No. 14/065,883.
USPTO; Office Action dated Aug. 17, 2015 in U.S. Appl. No. 13/439,768.
USPTO; Office Action dated Aug. 19, 2015 in U.S. Appl. No. 13/926,884.
USPTO; Office Action dated Aug. 28, 2015 in U.S. Appl. No. 13/794,272.
Burke, "Hybrid Recommender Systems: Survey and Experiments," User modeling and user-adapted interaction, 2002, Kluwer Academic Publishers, pp. 331-370.
Aimeur et al., "Alambic: a privacy-preserving recommender system for electronic commerce," Feb. 27, 2008, Springer-Verlag, pp. 307-334.
Tang, "Approac to detection of community's consensus and interest," Institute of Systems Science, 2008, Springer-Verlag, pp. 17-29.
Lee et al., "iJADE eMiner—A Web Based Mining Agent Based on Intelligent Java Agent Development Environment (iJADE) on Internet Shopping," Advances in Knowledge Discovery and Data Mining, 2001, Springer-Verlag, pp. 28-40.
Written Opinion dated Aug. 5, 2015 in Singapore Application No. 11201400788P.
USPTO; Advisory Action dated Sep. 29, 2015 in U.S. Appl. No. 13/686,608.
USPTO; Notice of Allowance dated Sep. 29, 2015 in U.S. Appl. No. 13/715,792.
USPTO; Office Action dated Oct. 8, 2015 in U.S. Appl. No. 13/941,306.
USPTO; Advisory Action dated Oct. 13, 2015 in U.S. Appl. No. 13/021,237.
USPTO; Advisory Action dated Oct. 16, 2015 in U.S. Appl. No. 13/466,445.
USPTO; Final Office Action dated Oct. 16, 2015 in U.S. Appl. No. 13/443,100.
USPTO; Advisory Action dated Oct. 22, 2015 in U.S. Appl. No. 13/188,693.
USPTO; Final Office Action dated Oct. 26, 2015 in U.S. Appl. No. 13/476,910.
USPTO; Final Office Action dated Oct. 26, 2015 in U.S. Appl. No. 13/467,503.
USPTO; Advisory Action dated Nov. 17, 2015 in U.S. Appl. No. 13/889,299.
USPTO; Advisory Action dated Nov. 17, 2015 in U.S. Appl. No. 13/468,880.
USPTO; Office Action dated Dec. 4, 2015 in U.S. Appl. No. 13/794,145.
USPTO; Office Action dated Dec. 17, 2015 in U.S. Appl. No. 13/715,770.
USPTO; Office Action dated Dec. 31, 2015 in U.S. Appl. No. 13/734,693.
USPTO; Final Office Action dated Dec. 30, 2015 in U.S. Appl. No. 14/065,883.
USPTO; Advisory Action dated Jan. 6, 2016 in U.S. Appl. No. 13/443,100.
USPTO; Final Office Action dated Jan. 11, 2016 in U.S. Appl. No. 13/411,281.
USPTO; Advisory Action dated Jan. 11, 2016 in U.S. Appl. No. 13/467,503.
USPTO; Office Action dated Jan. 14, 2016 in U.S. Appl. No. 13/889,272.
USPTO; Final Office Action dated Jan. 14, 2016 in U.S. Appl. No. 13/794,301.
USPTO; Office Action dated Oct. 23, 2014 in U.S. Appl. No. 13/715,770.
USPTO; Advisory Action dated Oct. 24, 2014 in U.S. Appl. No. 13/153,890.
USPTO; Office Action dated Oct. 29, 2014 in U.S. Appl. No. 13/926,884.
USPTO; Office Action dated Oct. 29, 2014 in U.S. Appl. No. 13/926,895.
USPTO; Office Action dated Nov. 7, 2014 in U.S. Appl. No. 13/715,792.
USPTO; Office Action dated Nov. 7, 2014 in U.S. Appl. No. 13/715,423.
USPTO; Office Action dated Dec. 29, 2014 in U.S. Appl. No. 13/188,693.
USPTO; Office Action dated Jan. 9, 2015 in U.S. Appl. No. 13/468,880.
USPTO; Office Action dated Jan. 16, 2015 in U.S. Appl. No. 13/889,299.
USPTO; Advisory Action dated Sep. 5, 2014 in U.S. Appl. No. 13/889,305.
USPTO; Office Action dated Sep. 17, 2014 in U.S. Appl. No. 13/794,226.
USPTO; Office Action dated Sep. 26, 2014 in U.S. Appl. No. 13/477,806.
USPTO; Office Action dated Oct. 17, 2014 in U.S. Appl. No. 14/065,883.
USPTO; Office Action dated Oct. 17, 2014 in U.S. Appl. No. 11/779,734.
USPTO; Office Action dated Oct. 20, 2014 in U.S. Appl. No. 13/941,306.
USPTO; Office Action dated Oct. 3, 2014 in U.S. Appl. No. 12/857,424.
USPTO; Office Action dated Oct. 8, 2014 in U.S. Appl. No. 13/734,693.
USPTO; Office Action dated Oct. 9, 2014 in U.S. Serial No. 13/926,789.
USPTO; Final Office Action dated Jan. 30, 2015 in U.S. Appl. No. 13/794,301.
USPTO; Final Office Action dated Feb. 11, 2015 in U.S. Appl. No. 14/065,883.
USPTO; Final Office Action dated Feb. 13, 2015 in U.S. Appl. No. 13/794,334.
Search Report and Written Opinion dated Feb. 16, 2015 in Singapore Application No. 11201400788P.
USPTO; Final Office Action dated Feb. 26, 2015 in U.S. Appl. No. 13/941,306.
USPTO; Office Action dated Feb. 27, 2015 in U.S. Appl. No. 13/443,100.
USPTO; Office Action dated Mar. 2, 2015 in U.S. Appl. No. 13/686,608.
USPTO; Final Office Action dated Mar. 13, 2015 in U.S. Appl. No. 13/794,374.
USPTO; Final Office Action dated Mar. 23, 2015 in U.S. Appl. No. 13/926,789.
Examination Report dated Mar. 24, 2015 in Australian Application No. 2012316453.
USPTO; Final Office Action dated Mar. 25, 2015 in U.S. Appl. No. 13/477,806.

(56) References Cited

OTHER PUBLICATIONS

USPTO; Final Office Action dated Mar. 25, 2015 in U.S. Appl. No. 13/794,226.
USPTO; Office Action dated Mar. 27, 2015 in U.S. Appl. No. 13/466,445.
USPTO; Final Office Action dated Apr. 3, 2015 in U.S. Appl. No. 13/926,884.
USPTO; Final Office Action dated Apr. 3, 2015 in U.S. Appl. No. 13/715,770.
USPTO; Final Office Action dated Apr. 7, 2015 in U.S. Appl. No. 13/926,895.
USPTO; Advisory Action dated Apr. 8, 2015 in U.S. Appl. No. 13/794,301.
USPTO; Office Action dated Apr. 8, 2015 in U.S. Appl. No. 13/021,237.
USPTO; Final Office Action dated Apr. 8, 2015 in U.S. Appl. No. 13/794,145.
USPTO; Final Office Action dated Apr. 13, 2015 in U.S. Appl. No. 13/734,693.
USPTO; Advisory Action dated Apr. 17, 2015 in U.S. Appl. No. 13/889,307.
USPTO; Final Office Action dated Apr. 17, 2015 in U.S. Appl. No. 13/715,792.
USPTO; Advisory Action dated Apr. 23, 2015 in U.S. Appl. No. 13/794,334.
USPTO; Advisory Action dated Apr. 23, 2015 in U.S. Appl. No. 14/065,883.
USPTO; Final Office Action dated Apr. 30, 2015 in U.S. Appl. No. 12/857,424.
Notice of Acceptance dated May 8, 2015 in New Zealand Application No. 623019.
USPTO; Advisory Action dated May 8, 2015 in U.S. Appl. No. 13/941,306.
USPTO; Final Office Action dated May 13, 2015 in U.S. Appl. No. 11/779,734.
USPTO; Office Action dated May 19, 2015 in U.S. Appl. No. 13/476,910.
USPTO; Office Action dated May 28, 2015 in U.S. Appl. No. 13/467,503.
USPTO; Advisory Action dated Jun. 3, 2015 in U.S. Appl. No. 13/794,226.
USPTO; Advisory Action dated Jun. 3, 2015 in U.S. Appl. No. 13/794,374.
USPTO; Office Action dated Jun. 3, 2016 in U.S. Appl. No. 14/065,883.
USPTO; Office Action dated Jun. 3, 2016 in U.S. Appl. No. 12/857,424.
USPTO; Notice of Allowance dated Jun. 3, 2016 in U.S. Appl. No. 13/593,204.
USPTO; Final Office Action dated Jun. 8, 2016 in U.S. Appl. No. 12/857,389.
USPTO; Office Action dated Jun. 9, 2016 in U.S. Appl. No. 13/926,895.
USPTO; Final Office Action dated Jun. 10, 2016 in U.S. Appl. No. 13/466,412.
USPTO; Final Office Action dated Jun. 13, 2016 in U.S. Appl. No. 13/468,931.
USPTO; Final Office Action dated Jun. 15, 2016 in U.S. Appl. No. 13/686,608.
USPTO; Office Action dated Jun. 17, 2016 in U.S. Appl. No. 13/468,880.
USPTO; Office Action dated Jun. 17, 2016 in U.S. Appl. No. 13/941,306.
USPTO; Final Office Action dated Jun. 17, 2016 in U.S. Appl. No. 13/794,145.
USPTO; Advisory Action dated Jun. 24, 2016 in U.S. Appl. No. 13/715,770.
USPTO; Final Office Action dated Jul. 1, 2016 in U.S. Appl. No. 13/794,226.
USPTO; Final Office Action dated Jul. 5, 2016 in U.S. Appl. No. 13/889,305.
USPTO; Advisory Action dated Jul. 6, 2016 in U.S. Appl. No. 13/468,931.
USPTO; Office Action dated Jul. 7, 2016 in U.S. Appl. No. 14/284,817.
USPTO; Notice of Allowance dated Jul. 13, 2016 in U.S. Appl. No. 11/779,734.
USPTO; Final Office Action dated Jul. 28, 2016 in U.S. Appl. No. 13/889,272.
USPTO; Final Office Action dated Aug. 12, 2016 in U.S. Appl. No. 13/889,299.
"What is a token in programming?" Quora, pp. 1-3, retrieved from https://www.quora.com/What-is-a-token-in-programming on May 31, 2016.
USPTO; Notice of Allowance dated May 25, 2016 in U.S. Appl. No. 13/439,768.
USPTO; Office Action dated May 26, 2016 in U.S. Appl. No. 13/477,806.
IP Australia; Examination Report dated Aug. 3, 2016 in Australian Application No. 2015201925.
USPTO; Advisory Action dated Aug. 17, 2016 in U.S. Appl. No. 12/857,389.
CIPO; Notice of Allowance dated Aug. 18, 2016 in Canadian Application No. 2,863,576.
USPTO; Advisory Action dated Aug. 18, 2016 in U.S. Appl. No. 13/466,412.
USPTO; Notice of Allowance dated Aug. 24, 2016 in U.S. Appl. No. 13/021,237.
USPTO; Advisory Action dated Aug. 24, 2016 in U.S. Appl. No. 13/686,608.
USPTO; Office Action dated Aug. 24, 2016 in U.S. Appl. No. 13/794,334.
USPTO; Final Office Action dated Aug. 25, 2016 in U.S. Appl. No. 13/466,445.
USPTO; Advisory Action dated Aug. 25, 2016 in U.S. Appl. No. 13/794,145.
USPTO; Final Office Action dated Aug. 26, 2016 in U.S. Appl. No. 13/443,100.
USPTO; Final Office Action dated Aug. 30, 2016 in U.S. Appl. No. 13/889,307.
USPTO; Office Action dated Sep. 2, 2016 in U.S. Appl. No. 13/467,503.
USPTO; Final Office Action dated Sep. 2, 2016 in U.S. Appl. No. 12/857,424.
USPTO; Final Office Action dated Sep. 7, 2016 in U.S. Appl. No. 13/153,890.
USPTO; Notice of Allowance dated Sep. 9, 2016 in U.S. Appl. No. 13/926,789.
USPTO; Advisory Action dated Sep. 12, 2016 in U.S. Appl. No. 13/889,305.
USPTO; Final Office Action dated Sep. 14, 2016 in U.S. Appl. No. 13/477,806.
USPTO; Advisory Action dated Sep. 21, 2016 in U.S. Appl. No. 13/889,272.
USPTO; Final Office Action dated Sep. 22, 2016 in U.S. Appl. No. 13/889,288.
USPTO; Advisory Action dated Sep. 22, 2016 in U.S. Appl. No. 13/794,226.
USPTO; Final Office Action dated Sep. 23, 2016 in U.S. Appl. No. 14/065,883.
USPTO; Office Action dated Sep. 29, 2016 in U.S. Appl. No. 12/857,389.
USPTO; Office Action dated Sep. 29, 2016 in U.S. Appl. No. 13/466,412.
USPTO; Final Office Action dated Sep. 30, 2016 in U.S. Appl. No. 13/941,306.
USPTO; Office Action dated Oct. 7, 2016 in U.S. Appl. No. 13/715,770.
USPTO; Notice of Allowance dated Oct. 11, 2016 in U.S. Appl. No. 13/926,884.
USPTO; Office Action dated Oct. 11, 2016 in U.S. Appl. No. 13/794,145.

(56) References Cited

OTHER PUBLICATIONS

USPTO; Office Action dated Oct. 11, 2016 in U.S. Appl. No. 13/794,226.
USPTO; Office Action dated Oct. 11, 2016 in U.S. Appl. No. 13/794,301.
USPTO; Advisory Action dated Oct. 20, 2016 in U.S. Appl. No. 13/889,307.
USPTO; Advisory Action dated Oct. 27, 2016 in U.S. Appl. No. 12/857,424.
Examination Report dated Jan. 11, 2017 in Australian Application No. 2016201509.
USPTO; Final Office Action dated Jan. 19, 2017 in U.S. Appl. No. 13/466,445.
USPTO; Final Office Action dated Jan. 20, 2017 in U.S. Appl. No. 13/467,503.
Examination Report dated Jan. 23, 2017 in Australian Application No. 2015201925.
USPTO; Office Action dated Jan. 23, 2017 in U.S. Appl. No. 14/464,439.
USPTO; Advisory Action dated Jan. 25, 2017 in U.S. Appl. No. 14/284,817.
USPTO; Office Action dated Jan. 30, 2017 in U.S. Appl. No. 14/464,474.
USPTO; Notice of Allowance dated Feb. 2, 2017 in U.S. Appl. No. 12/857,389.
USPTO; Advisory Action dated Feb. 7, 2017 in U.S. Appl. No. 13/188,693.
USPTO; Final Office Action dated Feb. 8, 2017 in U.S. Appl. No. 13/715,770.
USPTO; Final Office Action dated Feb. 9, 2017 in U.S. Appl. No. 13/443,100.
USPTO; Final Office Action dated Feb. 14, 2017 in U.S. Appl. No. 13/466,412.
USPTO; Notice of Allowance dated Feb. 14, 2017 in U.S. Appl. No. 13/794,226.
USPTO; Notice of Allowance dated Feb. 15, 2017 in U.S. Appl. No. 13/794,145.
USPTO; Notice of Allowance dated Feb. 16, 2017 in U.S. Appl. No. 13/889,307.
Examination Report dated Feb. 24, 2017 in Australian Application No. 2015201925.
USPTO; Advisory Action dated Feb. 27, 2017 in U.S. Appl. No. 13/468,880.
USPTO; Final Office Action dated Feb. 27, 2017 in U.S. Appl. No. 13/926,895.
Pocket-lint, Apple's iBeacons explained: What it is and why it matters, retrieved from internet on Feb. 21, 2017, http://web.archive.org/web/20130925141212/http://www.pocket-lint.com/news/123730-apple-sibeacons-explained-what-it-is-and-why-it-matters> published on Sep. 25, 2013 as per Wayback Machine, 10 pages.
Resnick, et al., "Recommender Systems", Mar. 1997, Commuincations of the ACM, vol. 40,No. 3, pp. 56-58.
Ricci, et al.; "Recommendation and Personalization in eCommerce", Proceedings of the AH'2002 Workshop on Recommendation and Personalization in eCommerce, Malaga, Spain, May 28, 2002, pp. 1-160.
Supplementary Examination Report dated Oct. 17, 2016 in New Zealand Application No. 11201400788P.
USPTO; Advisory Action dated Oct. 31, 2016 in U.S. Appl. No. 13/889,288.
USPTO; Advisory Action dated Nov. 1, 2016 in U.S. Appl. No. 13/153,890.
USPTO; Final Office Action dated Nov. 1, 2016 in U.S. Appl. No. 13/926,895.
Notice of Eligibility for Grant dated Nov. 1, 2016 in Singapore Application No. 11201400788P.
USPTO; Notice of Allowance dated Nov. 2, 2016 in U.S. Appl. No. 13/477,806.
USPTO; Advisory Action dated Nov. 3, 2016 in U.S. Appl. No. 14/065,883.
USPTO; Advisory Action dated Nov. 4, 2016 in U.S. Appl. No. 13/443,100.
USPTO; Final Office Action dated Nov. 4, 2016 in U.S. Appl. No. 13/794,334.
USPTO; Office Action dated Nov. 10, 2016 in U.S. Appl. No. 13/476,910.
USPTO; Final Office Action dated Nov. 10, 2016 in U.S. Appl. No. 14/284,817.
USPTO; Advisory Action dated Nov. 15, 2016 in U.S. Appl. No. 13/889,299.
USPTO; Advisory Action dated Nov. 16, 2016 in U.S. Appl. No. 13/941,306.
USPTO; Notice of Allowance dated Nov. 17, 2016 in U.S. Appl. No. 12/857,424.
USPTO; Final Office Action dated Nov. 17, 2016 in U.S. Appl. No. 13/188,693.
USPTO; Notice of Allowance dated Nov. 18, 2016 in U.S. Appl. No. 13/468,931.
USPTO; Office Action dated Nov. 18, 2016 in U.S. Appl. No. 13/443,100.
Examination Report dated Nov. 22, 2016 in Australian Application No. 2015201925.
USPTO; Office Action dated Nov. 28, 2016 in U.S. Appl. No. 14/065,883.
USPTO; Office Action dated Dec. 2, 2016 in U.S. Appl. No. 13/153,890.
USPTO; Office Action dated Dec. 14, 2016 in U.S. Appl. No. 13/941,306.
USPTO; Advisory Action dated Dec. 14, 2016 in U.S. Appl. No. 13/794,334.
USPTO; Final Office Action dated Dec. 15, 2016 in U.S. Appl. No. 13/468,880.
USPTO; Office Action dated Dec. 15, 2016 in U.S. Appl. No. 13/411,281.
USPTO; Office Action dated Dec. 20, 2016 in U.S. Appl. No. 13/889,305.
USPTO; Office Action dated Jan. 4, 2017 in U.S. Appl. No. 13/794,334.
USPTO; Office Action dated Jan. 13, 2017 in U.S. Appl. No. 13/794,374.
USPTO; Advisory Action dated Dec. 8, 2016 in U.S. Appl. No. 13/926,895.
Office Action dated Jan. 11, 2017 in Canadian Application No. 2,849,271.
Office Action dated Feb. 15, 2017 in Canadian Application No. 2,874,582.
USPTO; Notice of Allowance dated Mar. 10, 2017 in U.S. Appl. No. 13/467,503.
USPTO; Advisory Action dated Mar. 10, 2017 in U.S. Appl. No. 13/466,445.
USPTO; Advisory Action dated Mar. 13, 2017 in U.S. Appl. No. 13/466,412.
Morris, U.S. Appl. No. 15/456,777, filed Mar. 13, 2017 and entitled Purchase Instructions Complying With Reservation Instructions.
USPTO; Notice of Allowance dated Mar. 15, 2017 in U.S. Appl. No. 13/476,910.
USPTO; Advisory Action dated Mar. 23, 2017 in U.S. Appl. No. 13/443,100.
Examination Report dated Mar. 23, 2017 in Australian Application No. 2016201509.
USPTO; Notice of Allowance dated Mar. 24, 2017 in U.S. Appl. No. 13/794,334.
USPTO; Final Office Action dated Mar. 27, 2017 in U.S. Appl. No. 13/794,374.
Notice of Allowance dated Mar. 29, 2017 in Canadian Application No. 2,888,085.
USPTO; Advisory Action dated Mar. 29, 2017 in U.S. Appl. No. 13/715,770.
USPTO; Office Action dated Apr. 7, 2017 in U.S. Appl. No. 13/889,272.
USPTO; Office Action dated Apr. 10, 2017 in U.S. Appl. No. 13/443,100.

(56) References Cited

OTHER PUBLICATIONS

USPTO; Office Action dated Apr. 12, 2017 in U.S. Appl. No. 13/794,272.
USPTO; Office Action dated Apr. 13, 2017 in U.S. Appl. No. 13/466,412.
USPTO; Notice of Allowance dated Apr. 17, 2017 in U.S. Appl. No. 13/466,445.
USPTO; Notice of Allowance dated Apr. 20, 2017 in U.S. Appl. No. 13/889,288.
USPTO; Final Office Action dated Apr. 20, 2017 in U.S. Appl. No. 14/065,883.
USPTO; Final Office Action dated Apr. 20, 2017 in U.S. Appl. No. 13/941,306.
USPTO; Notice of Allowance dated Apr. 24, 2017 in U.S. Appl. No. 13/926,895.
Aloni, U.S. Appl. No. 15/495,428, filed Apr. 24, 2017 and entitled Offers Selected During Authorization.
Fischer, U.S. Appl. No. 15/494,94, filed Apr. 24, 2017 and entitled Ranking Merchants Based on a Normalized Popularity Score.
USPTO; Final Office Action dated Apr. 28, 2017 in U.S. Appl. No. 13/153,890.
USPTO; Final Office Action dated Apr. 28, 2017 in U.S. Appl. No. 13/889,305.
USPTO; Final Office Action dated May 4, 2017 in U.S. Appl. No. 13/794,301.
USPTO; Final Office Action dated May 17, 2017 in U.S. Appl. No. 13/411,281.
USPTO; Advisory Action dated May 17, 2017 U.S. Appl. No. 13/794,374.
USPTO; Final Office Action dated May 17, 2017 in U.S. Appl. No. 14/464,439.
USPTO; Final Office Action dated May 17, 2017 in U.S. Appl. No. 14/464,474.
USPTO; Final Office Action dated Aug. 11, 2017 in U.S. Appl. No. 13/443,100.
USPTO; Final Office Action dated Aug. 18, 2017 in U.S. Appl. No. 13/794,272.
USPTO; Non-Final Office Action dated Aug. 30, 2017 in U.S. Appl. No. 13/941,306.
USPTO; Final Office Action dated Sep. 20, 2017 in U.S. Appl. No. 13/466,412.
USPTO; Advisory Action dated Oct. 3, 2017 in U.S. Appl. No. 13/794,272.
USPTO; Non-Final Office Action dated Oct. 3, 2017 in U.S. Appl. No. 15/626,598.
USPTO; Non-Final Office Action dated Oct. 6, 2017 in U.S. Appl. No. 13/188,693.
USPTO; Non-Final Office Action dated Oct. 6, 2017 in U.S. Appl. No. 13/468,880.
USPTO; Final Office Action dated Oct. 25, 2017 in U.S. Appl. No. 13/889,272.
USPTO; Notice of Allowance dated Oct. 30, 2017 in U.S. Appl. No. 13/794,374.
USPTO; Advisory Action dated Nov. 9, 2017 in U.S. Appl. No. 13/466,412.
USPTO; Non-Final Office Action dated Nov. 14, 2017 in U.S. Appl. No. 14/284,817.
USPTO; Advisory Action dated Nov. 28, 2017 in U.S. Appl. No. 13/889,272.
USPTO; Final Office Action dated Dec. 11, 2017 in U.S. Appl. No. 13/715,423.
USPTO; Notice of Allowance dated Dec. 13, 2017 in U.S. Appl. No. 13/941,306.
USPTO; Advisory Action dated Jun. 2, 2017 in U.S. Appl. No. 13/941,306.
USPTO; Notice of Allowance dated Jun. 9, 2017 in U.S. Appl. No. 14/464,439.
USPTO; Notice of Allowance dated Jun. 13, 2017 in U.S. Appl. No. 13/889,305.
USPTO; Notice of Allowance dated Jun. 13, 2017 in U.S. Appl. No. 14/464,474.
USPTO; Office Action dated Jun. 15, 2017 in U.S. Appl. No. 13/715,770.
Notice of Acceptance dated Jun. 21, 2017 in Australian Application No. 2016201509.
USPTO; Office Action dated Jun. 21, 2017 in U.S. Appl. No. 13/466,412.
USPTO; Notice of Allowance dated Jun. 29, 2017 in U.S. Appl. No. 13/889,299.
USPTO; Advisory Action dated Jul. 14, 2017 in U.S. Appl. No. 13/794,301.
USPTO; Notice of Allowance dated Jul. 25, 2017 in U.S. Appl. No. 13/411,281.
USPTO; Non-Final Office Action dated Dec. 22, 2017 in U.S. Appl. No. 15/139,176.
USPTO; Non-Final Office Action dated Jan. 11, 2018 in U.S. Appl. No. 15/195,781.
USPTO; Final Office Action dated Jan. 18, 2018 in U.S. Appl. No. 13/715,770.
Australian Examination Report dated Jan. 19, 2018 in Australian Application No. 2017201307.
Lynn, Michael et al., "Gratutude and Fratuity: A Meta-Analysis of Research on the Service-tipping Relationship", Cornel University of Hotel Admiistraiton, 2000, Journal of Socio-Economics 29, pp. 1-18.
USPTO; Non-Final Office Action dated Feb. 2, 2018 in U.S. Appl. No. 14/928,680.
USPTO; Final Office Action dated Feb. 27, 2018 in U.S. Appl. No. 15/626,598.
USPTO; Advisory Action dated Feb. 28, 2018 in U.S. Appl. No. 13/715,770.
Ying Cai et al., Design, Analysis, and Implentation of a Large-scale Real-time Location-based Information Sharing System, pp. 106-117, Proceedings of the 6th International Conference on . . . , 2008, dl.acm.org.
Moon-Hee Parket et al., Location-Based Recommendation System Using Bayesian User's Preference Model in Mobile Devices, International Conference on Ubiquitous, pp. 1130-1139, 2007, Spring-Verlag Berlin Heidelberg.
Rashid, O. et. al., "Providing Location based information/ advertising for existing mobile phone users", Personal and Ubiquitous Computing, 2008, pp. 3-10, Springer.
Singhal, M., et al., "Implementation of Location based servcies in Android Using GPS and Web Servies", IJCSI International Journal of Computer Science Issues, vol. 9, Issue 1, No. 2, Jan. 2012, pp. 237-242, pdfs. semanticscholar.org.
"Standard Score", Wikipedia.org entry, retrieved on Nov. 30, 2017 from http://en.wikipedia.org/wiki/Standard_score, pp. 1-4.
Mahmoud, Q., "Provisioning Context-Aware Advertisements to Wireless Mobile Users", pp. 669-672, Multimedia and Expo, 2006 IEEE International, 2006.
Dhar, S. et al., "Challenges and Business Models for Mobile Location-Based Servies and Advertising", Communications of the ACM, May 2011, vol. 54, No. 5, pp. 121-129.
USPTO; Non-Final Action dated Mar. 9, 2018 in U.S. Appl. No. 13/794,301.
USPTO; Advisory Action dated Mar. 22, 2018 in US. U.S. Appl. No. 13/715,423.
USPTO; Non-Final Office Action dated Apr. 5, 2018 in U.S. Appl. No. 15/216,264.
USPTO; Final Office Action dated Apr. 6, 2018 in U.S. Appl. No. 13/468,880.
USPTO; Final Office Action dated Apr. 25, 2018 in U.S. Appl. No. 15/195,781.
USPTO; Advisory Action dated Apr. 26, 2018 in U.S. Appl. No. 15/626,598.
USPTO; Final Office Action dated Aug. 6, 2018 in U.S. Appl. No. 15/216,264.
USPTO; Non-Final Office Action dated Jul. 23, 2018 in U.S. Appl. No. 13/889,272.
USPTO Advisory Action dated Jun. 8, 2018 in U.S. Appl. No. 13/468,880.

(56) References Cited

OTHER PUBLICATIONS

Uspto; Advisory Action dated Jul. 20, 2018 in U.S. Appl. No. 15/195,781.
USPTO; Final Office Action dated Jul. 13, 2018 in U.S. Appl. No. 14/928,680.
USPTO; Non-Final Office Action dated Jul. 11, 2018 in U.S. Appl. No. 13/794,272.
USPTO; Final Office Action dated Jul. 6, 2016 in U.S. Appl. No. 14/284,817.
USPTO; Advisory Actoin dated Jul. 5, 2018 in U.S. Appl. No. 15/139,176.
USPTO; Non-Final Office action dated Jun. 28, 2018 in U.S. Appl. No. 14/928,855.
USPTO; Non-final Office action dated Jun. 22, 2018 in U.S. Appl. No. 15/018,239.
Canadian Examination Search Report dated Jun. 21, 2018 in Canadian Application No. 2,874,582.
Canadian Examination Search Report dated Jan. 31, 2018 in Canadian Application No. 2,849,271.
USPTO; Final Office Action dated May 9, 2018 in U.S. Appl. No. 15/139,176.
USPTO; Non-Final Office action dated May 18, 2018 in U.S. Appl. No. 15/018,623.
USPTO; Non-Final Office action dated May 24, 2018 in U.S. Appl. No. 14/928,905.
USPTO; Notice of Allowance dated May 25, 2018 in U.S. Appl. No. 15/626,598.
USPTO Non-Final Office Action dated Sep. 4, 2018 in U.S. Appl. No. 15/195,781.
USPTO Non-Final Office Action dated Aug. 10, 2018 in U.S. Appl. No. 14/928,786.

* cited by examiner

504A

Sync Your Transaction Account

Turn your Broadcasts into exclusive offers loaded directly to your Transaction Account. No coupons. No printouts. Sync, Broadcast and Save.

Sync an eligible American Express Card with Twitter below.

Broadcast the special offer identifiers to load exclusive Cardmember offers directly to your Card Save with an automatic Transaction Account credit when you make a qualified purchase at a Merchant with your synced Transaction Account.

Enter your eligible Transaction Account Card number and we will securely sync it to your Broadcast account. Your account information will remain private and will not be shared with Twitter.

First Name        Last Name

| John |        | Doe |

American Express Card Number
Not a Cardmember? Apply now.

| xxx | xxxxxx | xxxxx |

Card number is not valid. Please try again.

E-mail Address        Confirm E-mail Address

| JohnDoe@gmail.com |    | JohnDoe@gmail.com |

○ Yes, please e-mail me special offers, information about new programs and general updates from the American Express Network.

For information about how we protect your privacy and use your information, please read our Privacy Statement.

Please carefully review the terms below before syncing:
Program Terms & Conditions
Registration Terms and Conditions
Last Modified: January 10, 2012

By clicking "I Agree, Sync," I confirm I have reviewed, understand and agree to the above Terms and Conditions.

[I Agree, Sync] — 505A

Phone panel:
7:13 PM

DD Dunkin Donuts
Tweet #AMEXDD.
Spend $10+ Get $5
1x on a synced
@AmericanExpress
Card thru 1/31/12.
Qty Ltd. See offer terms:
aexp.com/tw1.

Frost CF
Can't wait for my free coffee #AMEXDD.

AmexSync
@frost_CF congrats!
Now spend w/your synced Card to redeem. See offer terms: aexp.com/tw1

Home  Connect  Account  Me

FIGURE 5D

Return Policy Logic

| | 7/1/06 Purchase | ← 60 days → 7/24/06 Purchase | | 9/1/06 Return | TAP Action Debit CM | Rationale |
|---|---|---|---|---|---|---|
| 1) | | | | $1,000 Return | No Action | 0 tx in past 60 days |
| 2) | $1,000 | $100 Statement credit | | $1,000 Return | Debit $100 | 1 tx Return = Tx amount |
| 3) | $1,000 | $100 Statement credit | | $400 Return | Debit $40 | 1 tx in pst 60 days Partial Return |
| 4) | $1,000 | $100 (10%) Statement credit | $600 | $100 Statement credit | Return < $600 | Debit $60 | 2 tx in pst 60 days |
| | $1,000 $1,000 | $100 (10%) Statement credit | $600 | $100 Statement credit | Return > $600 | Debit $120 | 2 tx in pst 60 days |
| 5) | $1,000 | $100 Statement credit | $500 | | Return < 600 | No Action | Assume return of 2$^{nd}$ tx |
| | $1,000 | $100 Statement credit | $600 | | Return > 601 | Debit $60 | Assume return of 7/1 tx |

Non TM eligible tx

Figure 19

Return Policy Logic (Returns, Fraud, Disputes, Credit Refund)

| 60 days | | | | | | TAP Action Debit CM | Write off Up to $xx |
|---|---|---|---|---|---|---|---|
| Purchase | | | Purchase | | Return $1050 | | |
| (1) $ | (2) $500 (15%) | (3) | (4) $1,000 | (5) $700 (15%) | (6) $1,000 (10%) | Look back, assume first exact tx matched is the correct original tx. Debit CM for $100 | CM claims return is part of tx 4 – write off |
| (1) $400 (30%) | (2) $900 (15%) | (3) $500 | (4) $800 | (5) $100 (15%) | (6) $5,000 | If no exact matched tx, use first tx > to return tx. No action | CM claims return is part of tx 5 & 2 – write off |
| (1) $150 | (2) $100 (15%) | (3) $300 | (4) $200 | (5) $250 (25%) | (6) $200 | If sum of return is equal or smaller than sum of tx in past 60 days, than assume that the return refers to TM tx's up to $1,000. (i.e., debit CM for 15% of $100 + 25% of $250 = $77.5). Else, do nothing. | CM claims return is part of a tx earlier than 60 days, no write off |
| None TM tx ○ | TM tx ● | | | | | | |

Figure 20

LOCATION-BASED DISCOUNTS IN DIFFERENT CURRENCIES

CROSS REFERENCE TO RELATED APPLICATION

The present application is a continuation of, claims priority to and the benefit of, U.S. Ser. No. 13/439,768 filed Apr. 4, 2012 and entitled "SYSTEM AND METHOD FOR PROVIDING INTERNATIONAL COUPON-LESS DISCOUNTS." The 768 application is a continuation-in-part of and claims priority to U.S. Ser. No. 13/411,281 entitled "System and Method for Providing Coupon-less Discounts Based on a User Broadcasted Message" filed Mar. 2, 2012. The '281 application is a continuation-in-part of and claims priority to U.S. Ser. No. 13/153,890 entitled "System and Method for Administering Marketing Programs" filed Jun. 6, 2011. The '890 application is a continuation-in-part of and claims priority to U.S. Ser. No. 12/857,389 entitled "System and Method for E-Mail Based Rewards" filed on Aug. 16, 2010. The '389 application is a continuation-in-part of and claims priority to U.S. Ser. No. 11/779,734, entitled "Loyalty Incentive Program Using Transaction Cards," filed on Jul. 18, 2007. The '734 application claims priority to U.S. Provisional Ser. No. 60/831,457, filed Jul. 18, 2006. The '768 application is also a continuation-in-part of and claims priority to U.S. Ser. No. 13/021,237 entitled "Systems and Methods for Providing Location Based Coupon-Less Offers to Registered Card Members" filed on Feb. 4, 2011. The '768 application is also a continuation-in-part of and claims priority to U.S. Ser. No. 13/188,693 entitled "System and Method for Coupon-Less Product Level Discounts" filed on Jul. 22, 2011. The disclosures of each are incorporated herein by reference in their entirety for any purpose.

FIELD

The present disclosure relates generally to systems and methods for providing marketing partners an automated platform for managing promotions, and more particularly, to systems and methods for establishing and maintaining loyalty incentive programs and other promotions that permit consumers to receive discounts and notices of discounts, without requiring a coupon to be redeemed.

BACKGROUND

Loyalty, incentive or reward programs are typically used as a form of highly customizable and targeted marketing. A loyalty program provider often attracts customers who sign-up for a loyalty program. Shopping benefits such as discounts are offered to the customers by the provider. The provider then markets to merchants that the provider can bring customers to the merchant. For example, a loyalty program provider may approach a merchant (e.g., the clothing retailer GAP® Inc.) with an offer to bring customers to the GAP® in exchange for a fee. The provider would then send a solicitation (via email or regular mail) to its customers offering, for example, a 10% discount coupon that may be redeemed at the GAP® on a particular day. The success of the solicitation can be assessed based on the number of coupons redeemed.

In such a loyalty solicitation, the merchant would usually pay the loyalty program provider a percentage of the sales (e.g., 10%) that result from the solicitation. The merchant benefits from the increased sales. The loyalty program provider benefits from the commission that it receives, and the customers benefit from the received discount.

There are several areas that could be improved in such traditional loyalty programs. For example, such traditional programs suffer from leakage. Leakage occurs when the merchant does not fully report sales resulting from the solicitation. Leakage results in loss revenues for the loyalty program provider. Further, administrative marketing programs such as coupon redemption is costly. For example, setting up and maintaining offers, eligibility criteria, redemption criteria, reporting criteria and other functions of a promotion system traditionally requires business analysts of the reward program platform provider to manually configure the platform. What is needed is a marketing and promotions platform that enables intelligent, automated (e.g., via application programming interfaces) interfaces with a reward platform.

SUMMARY

In various embodiments, a computing platform includes application programming interfaces that enable third parties to create, configure, manage, modify, update, delete, report on, and enhance reward offers and marketing programs. For example, a program provider may wish to create a custom application ("partner application") that serves as a front-end or interface with the computing platform. The partner application accesses the computing platform via various application programming interfaces (APIs). In various embodiments, a marketing program is set up and merchants are associated with the marketing program. Offers are created and associated with the program and/or the merchant and customers are offered and signed up for the offers.

In various embodiments, an automated marketing system comprises: a network interface communicating with a memory, the memory communicating with a processor for automated marketing and storing a computer program and a plurality of application programming interfaces (APIs); and the processor, when executing a computer program, performs operations. The operations include receiving, by the processor and via an offer setup API, a first offer setup request, wherein the offer setup API is from the plurality of APIs; parsing, by the processor, the offer set up request into a plurality of first offer parameters; validating, by the processor, at least one of the offer setup request and the first offer parameters; in response to the validating, notifying, by the processor, a first approver of the offer setup request; receiving, by the processor and from the first approver, an approval of the offer set up request; saving, by the processor and to the memory, a first offer comprising the first offer parameters, wherein the first offer is associated with a first marketing program; and determining, by the processor, a first population comprising a plurality of transaction accounts that comply with first offer criteria, wherein the first offer parameters comprise the first offer criteria.

In various embodiments, the first offer criteria comprise at least one of a customer identifier, a customer demographic, a customer location, spend frequency, a spend threshold, a spend history, an award cap, a tiered reward requirement, a product identifier, a product category, a stock-keeping unit (SKU), a universal product code (UPC), a QR code, a merchant, a merchant type, an industry, a merchant location.

In various embodiments, operations performed by the system include receiving via an enrollment API from the plurality of APIs, a first enrollment setup-request; validating the first enrollment setup-request, wherein the validating comprises determining that the first enrollment setup request is associated with at least one of the first offer and a second offer; receiving an approval of the first enrollment setup-request from at least one of the first approver and the second approver; parsing the first enrollment setup request into first enrollment parameters and saving the first offer enrollment parameters to the memory and receiving a first offer acceptance from a first user associated with a first transaction account from the first population.

In various embodiments, a method for operating a loyalty incentive program includes the following steps: a list of participating merchants is received; a list of participating account holders is received; a record of charge corresponding to a purchase by an account holder customer is received from a merchant, and upon receipt, an account of the account holder customer is debited by the amount of the charge, a merchant identification contained in the record of charge is compared with the list of participating merchants, and an account holder identification contained in the record of charge is compared with the list of participating account holders. If the account holder is a participating account holder and the merchant is a participating merchant, then it is determined whether the record of charge qualifies for a rebate credit. If the record of charge qualifies for a rebate credit, then the rebate credit is provided to an account of the account holder customer.

In various embodiments, a method includes the following steps: participation of a merchant in a loyalty incentive program is solicited; an offer from a participating merchant is received; enrollment of an account holder customer to the loyalty incentive program is solicited; the offer is provided to an enrolled account holder customer; information is received which relates to a purchase by the enrolled account holder customer in accordance with the offer from the participating merchant; an amount of a discount in accordance with the offer is calculated; and the amount of the discount is provided to a transaction account provider so that an account of the enrolled account holder customer is credited in the amount of the discount.

In various embodiments, a method for managing a rewards program includes monitoring spend data associated with a transaction account. The spend data may be analyzed and compared to a set of criteria (spend levels at particular merchants, spend level on classes of products, spend level in a particular region). The transaction account may then be assigned to one or more transaction account populations based on spend data and criteria. The spend data associated with the transaction account is also analyzed to determine whether a beneficiary of the transaction account qualifies for a reward in accordance with a rewards program. Where the spend data complies with the rules governing the rewards program, a reward (e.g. a credit of monetary value to the transaction account, a merchant prepaid account, a discount, a credit of loyalty points) is provided to a beneficiary of the transaction account. The spend data activities associated with the transaction accounts of the population are also monitored. Where the activities comply with criteria associated with the transaction account population, a rewards offer (an offer of a credit of monetary value to the transaction account, a merchant prepaid account, a discount, a credit of loyalty points) is sent to owner of transaction accounts associated with the population.

In various embodiments, the criteria may be established by a merchant or a prepaid account issuer. Enrollment in a transaction account population may be automatic or may include registration by the owner of the transaction account. Further features of various embodiments, as well as the structure and operation of various embodiments are described in detail below with reference to the accompanying drawings.

The present disclosure includes systems, methods, and articles for providing location based coupon-less offers, based upon a location of a participant (e.g., card member (CM)). A location of a CM may be determined based upon one or more of a travel itinerary, a GPS signal, a proximity of a mobile communication device to a cellular base station, and/or a zip code. A CM may register to receive a coupon-less offer. An offer from a merchant registered to provide coupon-less offers may be transmitted to a mobile communication device based upon the location. An offer, once accepted by a CM, may be matched to a record of charge associated with a transaction account held by the CM. A credit may be applied to the CM's transaction account and a debit may be applied to a transaction account of the registered merchant. A credit may be applied based upon a transaction complying with one or more criteria specified by a registered merchant for a coupon-less offer. An exemplary criterion comprises a spend level on a class of products. One or more offer categories and/or one or more offer category classes may be transmitted to the mobile communication device based upon the CM's location.

Systems and methods for managing a product level discount are provided. In various embodiments, a product level discount may be managed, by a computer based system, during a transaction. The system may receive a transaction identifier associated with a transaction, where the transaction identifier comprises a transaction value, a customer account identifier, a merchant identifier, and a product identifier. The product identifier may be assessed, by the computer based system, to determine whether the transaction qualifies for a rebate credit in accordance with a predetermined offer. Furthermore, a value is determined of any rebate credit based on the transaction information and the predetermined offer. In an exemplary embodiment, the computer based system for managing a product level discount comprises a network interface communicating with a memory, where the memory communicates with a processor for managing a product level discount, and the processor, when executing a computer program, is configured to receive, by the processor, the transaction identifier associated with a transaction, assess the product identifier to determine whether the transaction qualifies for the rebate credit in accordance with the predetermined offer, and determine the value of the rebate credit.

The product level discount management may include determining whether the transaction qualifies for the rebate credit, based on at least one of the customer account identifier and the merchant identifier. Furthermore, the product level discount management may also include verifying, by the computer based system, that the transaction has been completed, and applying the rebate credit to a customer account associated with the customer identifier after completion of the transaction. The product identifier could be a stock-keeping unit (SKU) code. The SKU code may be the basis for qualifying for the rebate credit. Furthermore, a merchant associated with the merchant identifier, which is part of the transaction, does not need to be informed of the application of the rebate credit to the customer account. From the viewpoint of a merchant, a product level discount may be applied post-transaction and the merchant may have no knowledge of the applied discount. In various embodiments, the product level discount management may include applying the rebate credit to the transaction at the point of sale, and determining authorization of the transaction after the applying the rebate credit.

The predefined offer may be sent to the user associated with the customer account identifier to incentivize completion of the transaction. The determination of who receives the predefined offer can be based (at least in part) on the transaction history of the user. Furthermore, the qualification for the rebate credit may be based (at least in part) on an aggregate transaction history of the user associated with the customer account identifier. Also, the qualification for the rebate credit may be based (at least in part) on the product identifier corresponding to at least one of a particular product or a vendor. A user (or customer in this case) can receive the predefined offer in a variety of ways. For example, the customer can also receive the predefined offer on a portable electronic device. Moreover, in various embodiments, the customer account identifier may include a unique identifier associated with the portable electronic device. The unique identifier associated with the portable electronic device may be used to match the transaction to the customer account identifier.

In various embodiments, the systems and methods described herein provide an offer to a user that may be accepted by the user through an action by the user. The action may be a broadcast through a social media channel. For example, the broadcast may be a tweet from a Twitter account that comprises a particular offer identifier. The offer identifier may comprise particular elements associated with a merchant, product, brand, account issuer, loyalty program provider, rewards, and/or the like. The parameters of the offer may define that the broadcast comprise an offer identifier and may require that a user take subsequent action to fulfill the offer. For example, once a CM has associated with offer with a CM's transaction account, the CM may be required to spend at a particular level with a sponsoring merchant, buy a particular product designated by a sponsoring manufacturer, or spend in a particular region designated by a sponsoring organization. The systems and methods described herein may also be configured to monitor one or more broadcast channels, identify the source of a broadcast, identify transaction accounts associated with the source, evaluate transaction data associated with the transaction account, and provide benefits to the source and/or the transaction account.

In various embodiments, systems, methods, and computer readable medium are provided for managing a rewards program. These systems, methods and computer readable medium are configured to cause a computer based system to perform operations comprising: receiving, by the computer based system, transaction information comprising transaction account information and merchant information; parsing, by the computer based system, the transaction information into a merchant portion and a transaction account portion; transmitting, by the computer based system, a transaction (e.g., purchase) credit to a merchant associated with the merchant information based on the merchant portion; analyzing, by the computer based system and in response to the transaction credit, the merchant portion against a plurality of offers to determine an identified offer, wherein a transaction associated with transaction information corresponds to the identified offer; and transmitting, by the computer based system, reward instructions in response to the merchant portion corresponding to the identified offer.

The systems may further provide reward instructions comprising a reward amount provided to a transaction account and a reward cost associated with a sponsoring entity. The sponsoring entity may be at least one of a transaction account issuer and the merchant.

The system may be further configured to transmit the reward instructions to a global clearing and settlement module and/or an issuer account payable module, in response to the sponsoring entity being the transaction account issuer and/or transmit the reward instructions to a global clearing and settlement module and an merchant account payable module, in response to the sponsoring entity being the merchant.

In the context of international transactions, the system may be configured to analyze the transaction information to determine the geographic region of the merchant associated with the transaction information, wherein the geographic region is at least one of United States and another jurisdiction. The debit is transmitted through a first account payable module in response to the geographic region being the United States, or through a second account payable module in response to the geographic region being the other jurisdiction.

In various embodiments, the systems may be operated by a transaction account issuer or by a third party.

BRIEF DESCRIPTION OF THE FIGURES

A more complete understanding of the present disclosure may be derived by referring to the detailed description and claims when considered in connection with the Figures, wherein like reference numbers refer to similar elements throughout the Figures, and:

FIG. 5D is screenshot of a step performed by a system executing the process illustrated in FIG. 5A, in accordance with various embodiments;

FIG. 19 is a diagram of a method for determining whether a return relates to a purchase for which a rebate credit was provided to the account holder customer, in accordance with various embodiments;

FIG. 20 is a diagram of another method for determining whether a return was made on a purchase in which the account holder received a discount credit, in accordance with another embodiment;

DETAILED DESCRIPTION

Figure 1:
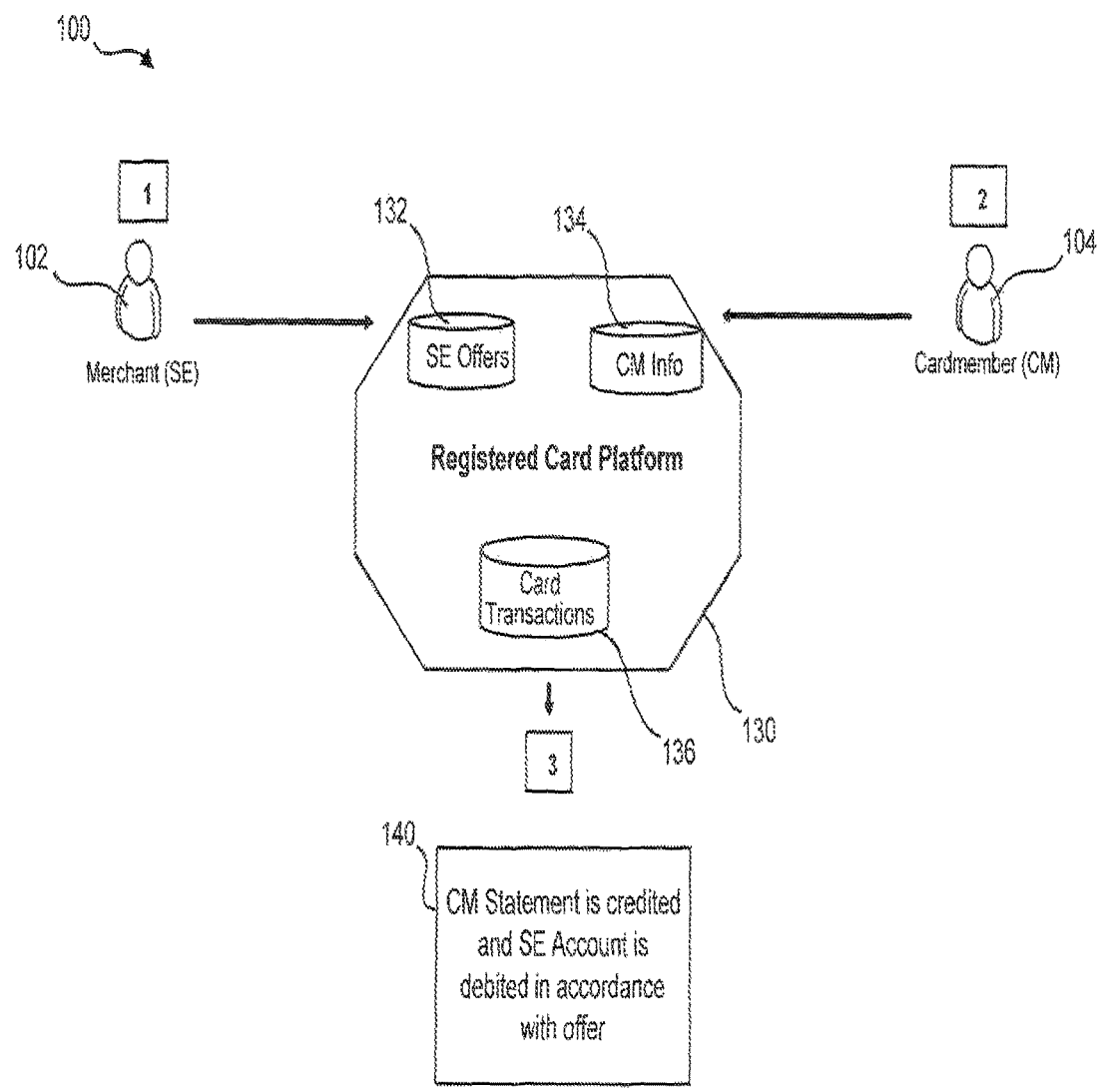
FIG. 1 is a high level flow diagram of a process for providing loyalty incentives to an account holder customer in accordance with various embodiments.

The present disclosure is directed to a system and method for providing loyalty incentives to an account holder customer and operating a loyalty incentive program. The present system is now described in more detail herein in terms of an exemplary embodiment. This is for convenience only and is not intended to limit the application of the present disclosure. While specific configurations and arrangements are discussed, it should be understood that this is done for illustrative purposes only. In fact, after reading the following description, it will be apparent to one skilled in the relevant art(s) how to implement the following exemplary embodiments. A person skilled in the pertinent art will recognize that other configurations and arrangements can be used without departing from the spirit and scope of the present disclosure. It will be apparent to a person skilled in the pertinent art that this disclosure can also be employed in a variety of other applications.

The terms "user," "end user," "consumer," "customer," "participant," and/or the plural form of these terms are used interchangeably throughout herein to refer to those persons or entities capable of accessing, using, being affected by and/or benefiting from the tool that the present disclosure provides for the rewards program described herein. This includes both individual consumers and corporate customers such as, for example, small businesses.

The term user, consumer, cardmember, CM, and/or the plural form of these terms shall mean any person, entity, government organization, business, machine associated with a transaction account, regardless of whether a physical card is associated with the account. For example, the cardmember and/or CM may include a transaction account owner, an transaction account user, an account affiliate, a child account user, a subsidiary account user, a beneficiary of an account, a custodian of an account, or any other person or entity affiliated or associated with a transaction account.

Furthermore, the terms "service provider," "service establishment," "business" or "merchant" may be used interchangeably with each other and shall mean any person, entity, distributor system, software and/or hardware that is a provider, broker and/or any other entity in the distribution chain of goods or services. For example, a service provider may be a retail store, a hotel company, an airline company, a travel agency, an on-line merchant or the like.

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionallysized transaction cards, radio-frequency enabled transaction cards, or other types of transaction cards, such as credit, charge, debit, pre-paid or stored-value cards, or any other like financial transaction instrument. A financial transaction instrument may also have electronic and communications functionality. Such functionality may be enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, *Near Field Communication Interface and Protocol*-1 (NFCIP-1); ISO/IEC 21481/ECMA-352, *Near Field Communication Interface and Protocol*-2 (NFCIP-2); and EMV 4.2 available at http://www.emvco.com/default.aspx.

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as the clothing retailer Gap®, Inc.

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

With regard to use of a transaction account, users may communicate with service providers in person (e.g., at the box office), telephonically, or electronically (e.g., from a user computer via the Internet). During the interaction, the service provider may offer goods and/or services to the user. The service provider may also offer the user the option of paying for the goods and/or services using any number of available transaction accounts. Furthermore, the transaction accounts may be used by the service provider as a form of identification of the user. The service provider may have a computing unit implemented in the form of a computer-server, although other implementations are possible.

In general, transaction accounts may be used for transactions between the user and service provider through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

An "account," "account number" or "account code," as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), NFC, wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y.

A merchant account number may be, for example, any number or alpha-numeric characters that identify a particular merchant for purposes of card acceptance, account reconciliation, reporting and the like.

It should be noted that the transfer of information in accordance with various embodiments may be done in a format recognizable by a merchant system or account issuer. In that regard, by way of example, the information may be transmitted from an RFID device to an RFID reader, or from the RFID reader to the merchant system in magnetic stripe or multi-track magnetic stripe format.

Because of the proliferation of devices using magnetic stripe format, the standards for coding information in magnetic stripe format were standardized by the International Organization for Standardization in ISO/IEC 7811-n (characteristics for identification cards) which are incorporated herein by reference. The ISO/IEC 7811 standards specify the conditions for conformance, physical characteristics for the card (warpage and surface distortions) and the magnetic stripe area (location, height and surface profile, roughness, adhesion, wear and resistance to chemicals), the signal amplitude performance characteristics of the magnetic stripe, the encoding specification including technique (MFM), angle of recording, bit density, flux transition spacing variation and signal amplitude, the data structure including track format, use of error correction techniques, user data capacity for ID-1, ID-2 and ID-3 size cards, and decoding techniques, and the location of encoded tracks.

Typically, magnetic stripe information is formatted in three tracks. Certain industry information must be maintained on certain portions of the tracks, while other portions of the tracks may have open data fields. The contents of each track and the formatting of the information provided to each track is controlled by the ISO/IEC 7811 standard. For example, the information must typically be encoded in binary. Track 1 is usually encoded with user information (i.e., name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with various embodiments, it may be provided in magnetic stripe track format. For example, the counter values, authentication tags and encrypted identifiers may be forwarded encoded in all or a portion of a data stream representing data encoded in, for example, track 2 or track 3 formats.

Persons skilled in the relevant arts will understand the breadth of the terms used herein and that the exemplary descriptions provided are not intended to be limiting of the generally understood meanings attributed to the foregoing terms.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with various embodiments, it would be within the knowledge of one skilled in the art to affect such feature, structure, or characteristic in connection with other embodiments whether or not explicitly described.

In various embodiments and with references to FIG. 1, a flow diagram illustrates operation of system 2100. A transaction account provider (TAP) (such as American Express Travel Related Services Company, Inc., of New York, N.Y.) operates a registered card platform (RCP) 130 to implement a reward or incentive program (sometimes referred to herein a registered card program), which does not require paper coupons for fulfillment of merchant offers to account holders. RCP 130 provides the capability to match merchant (SE or "service establishment") offers and account holder (CM) customer information with card transactions for an account holder customer's purchases or returns at a merchant participating in the registered card program. As a result of such matching capability, RCP 130 allows TAP to fulfill a merchant's discount offer applicable to account holder customer's purchase by providing a rebate credit in accordance with the discount offer on the account holder customer's transaction account statement. In various embodiments, RCP 130 includes or is accessible by a plurality of application programming interfaces (APIs) that enable a merchant, marketing partner, or other entity to define custom applications that interface with RCP 130 in order to define offers, rewards, offer eligibility, etc. Embodiment of such APIs will be disclosed below. If a return is made on a purchase for which a rebate credit was previously provided, RCP 130 also allows the TAP to debit the account holder customer the amount of the rebate credit and credit the same back to the merchant.

TAP may collaborate with a loyalty program provider to produce the reward or incentive program. While, as used herein, "loyalty program provider" (LPP) refers to an external, third-party provider of marketing packages that may be provided to CMs in accordance with various embodiments, TAP may internally administer loyalty programs, such as restaurant or travel marketing program. Therefore, to distinguish from programs provided by an LPP, TAPS internal loyalty programs will be referred to herein as a "TAP marketing program" or simply a "TAP program." In the figures, the service mark "TailorMade" is used to refer to an example loyalty program offered by an LPP. Accordingly, although embodiments will be described herein in the environment of such collaboration between a TAP and an LPP, one of skill in the pertinent art(s) will recognize that a registered card program can be implemented with or without a loyalty program provider or other types of providers without departing from the spirit and scope of the present disclosure.

As shown in FIG. 1, in step 1, a merchant 102 enrolls and submits a discount offer to a loyalty program or other marketing program. These offers are compiled in an offer database 132. In step 2, an account holder customer (CM) 104 registers their transaction account managed by TAP, such that CM's account is "registered" to the registered card program, thereby permitting the registered CM to receive coupon-less discounts in the form of rebate credits (via CM's account statement). Information relating to CM's now registered card is compiled in enrollee database 134. When CM shops and makes purchases (or returns) at a merchant using their financial transaction card, TAP will receive a record of charge (ROC) for the transaction, which may be stored in a card transaction database 136. The ROC may be any information that can be used to identify a card transaction. In step 3, matching is performed by RCP 130. In the case of a CM purchase, the CM's statement is credited and the merchant's account is debited in accordance with the merchant's offer, as illustrated in step 140. Further description of providing a credit to the CM and a debit to the merchant in step 140 is described below with reference to FIG. 3.

Figure 2:
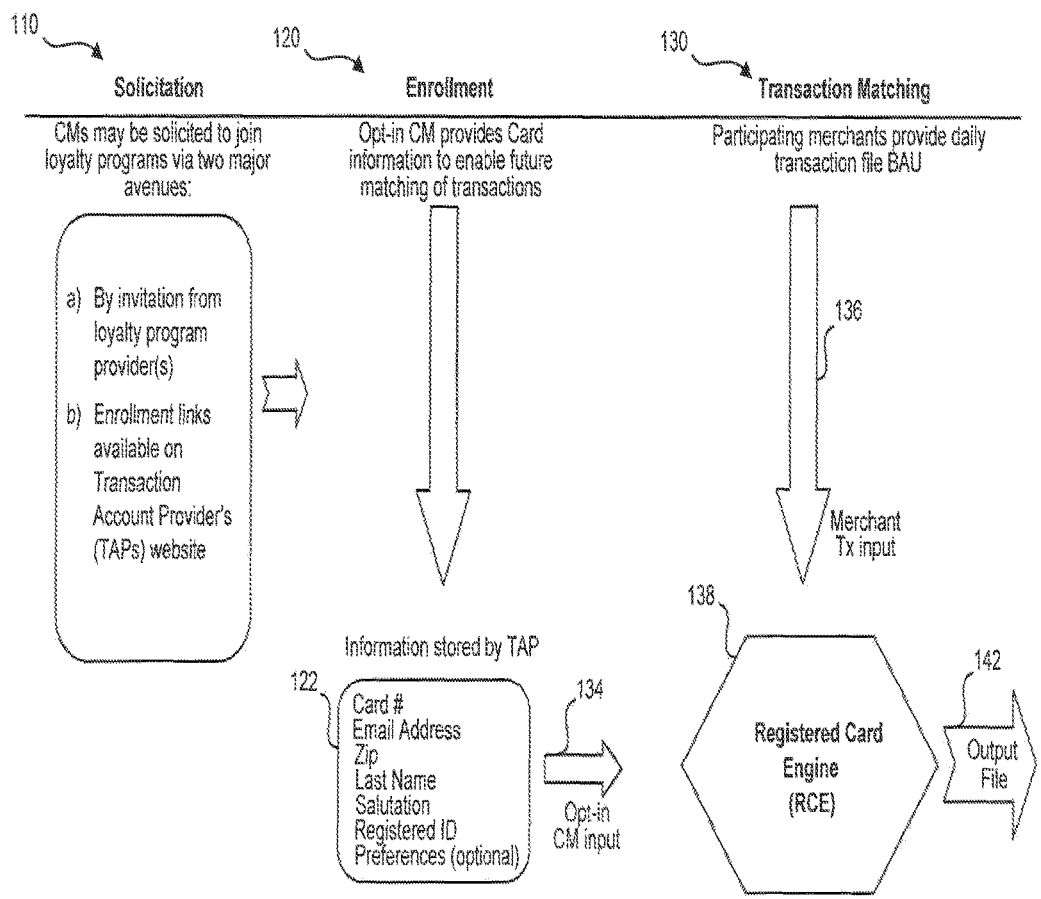
FIG. 2 is a high level flow diagram showing data management flow of account holder customer information and participating merchant information for transaction matching in the process of FIG. 1.

FIG. 2 provides another high level flow diagram illustrating the steps of solicitation 110 and enrollment 120 relative to transaction matching 130 (performed by the registered card platform), in accordance with various embodiments. Solicitation 110 of a CM may include a targeted invitation, such as by e-mail, from loyalty program provider(s) or TAP, or by simply making available to a CM a link on TAP's website prompting the CM to enroll in TAP's registered card program. During enrollment 120, the CM opts to register their card information to enable RCP 130 to perform future matching of transactions. Box 122 sets forth exemplary fields of information stored by TAP for each enrolled CM. CM information is stored in database 134 (represented here as an arrow 134), and the information is provided to a matching transaction processor 138 of RCP 130. Matching processor 138 is shown and described in the example embodiments presented using the term "registered card engine" (RCE). As shown, in FIG. 2, RCE 138 is provided with merchant transaction information from participating merchants (i.e., a daily, "business as usual" (BAU) transaction file). This transaction information may be stored in transaction database 136 (shown here as an arrow 136). RCE 138 also receives participating merchant offers 132 (shown in FIG. 1) and matches them with transactions 136 made by registered CMs (i.e., via information from enrollee database 134). Matched transactions are provided in an output file 142.

Figure 3:
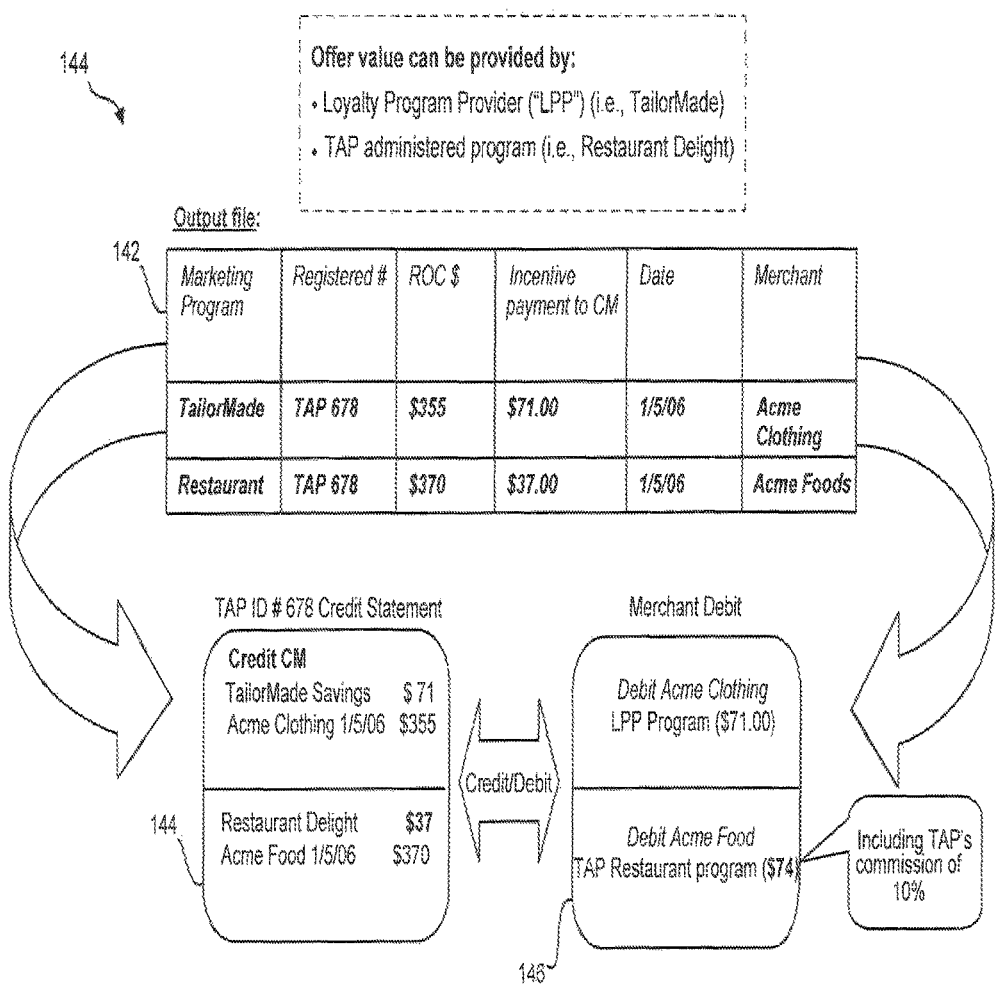
FIG. 3 illustrates an exemplary output file of matched transactions with corresponding statements of credit to an account holder customer and debit to participating merchants.

FIG. 3 illustrates an exemplary output file and credit and debit statement for the CM and the merchant, in accordance with step 140 of FIG. 1. Output file 142 from RCE 138 (as shown in FIG. 2) includes an itemization of a discount amount (i.e., incentive payment) to CM for a purchase made (i.e., ROC) at a participating merchant in which a discount offer was applicable. In this embodiment, upon enrollment in the registered card program, the registered accounts of the CM receive a registration identification (i.e., "registered number"), which is also included in output file 142. In this embodiment, output file 142 includes marketing programs administered by TAP and marketing programs administered by a loyalty program provider. One of skill in the pertinent art(s) will recognize that output file 142 may be configured in any number of ways and include less or more information represented in FIG. 3. For example, a separate output file may be provided for each LPP or TAP program, and for each loyalty program offered by the same LPP. Further, the transaction and discount information reflected therein may be provided collectively or separately for downstream processing of a CM credit statement 144 and a merchant debit statement 146.

As shown in FIG. 3, output file 142 is processed by TAP to provide line item rebate credits on CM statement 144 for each purchase subject to a discount offer available pursuant to a marketing program. For example, CM statement 144 includes a TailorMade rebate credit of $71, for an original charge amount of $355 at participating merchant, Acme Clothing. Similarly, a credit of $37 under TAP's restaurant marketing program is provided for an original charge amount of $370 at participating merchant, Acme Food. Merchant debit statement 146 includes line item debits in accordance with CM's rebate credits also as line items for each marketing program. The debit for the merchant may be equal or unequal to the rebate credit to CM. For example, for Acme Clothing, the merchant debit of $71 is equal to CM credit of $71, whereas the debit for Acme Food is $74, corresponding to the sum of the rebate credit to CM and a commission or service fee of 10% of the original charge amount imposed by TAP for performing the services described herein. Although not shown here, a similar commission may be imposed by LPP and/or TAP on Acme Clothing's account and incorporated as part of a line item debit on its statement. Alternatively, such commission may be a separate line item from the line item for the merchant's debit for CM's rebate credit.

Figure 4A:
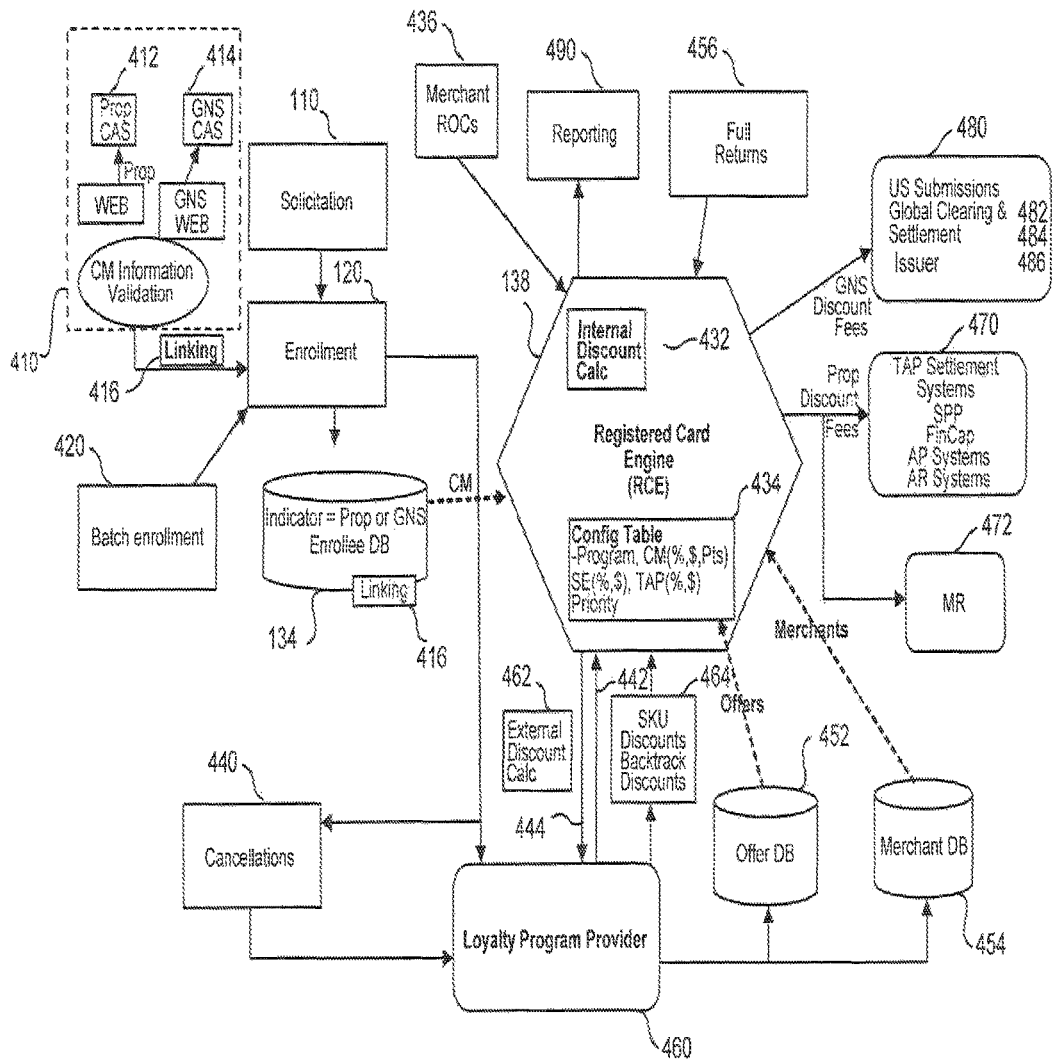
FIG. 4A is a detailed high level flow diagram of the process of FIG. 1, in accordance with various embodiments.

FIG. 4 is a detailed high level block diagram of the process of FIG. 1, showing processes for registration of a CM, calculation of a rebate credit to the CM (or a negative discount amount in case of a return), and downstream settlement with the CM and the merchant relating to the rebate credit (or negative discount amount), in accordance with various embodiments. The CM registers with TAP to receive coupon-less discounts for purchases drawn on their transaction card/account. Generally, the registration process begins with solicitation 110 of the CM, followed by enrollment 120 of one or more transaction cards held by the CM. Description of exemplary embodiments of process for solicitation 110 and enrollment 120 will be provided further below. In order to enroll, each transaction card and corresponding customer information undergoes a validation process 410 to determine whether the CM's card is eligible for participation in TAP's registered card program. This registered card program may be made available to not only CMs holding transaction cards issued by TAP, but also to CMs holding cards issued by third party transaction account providers in a brand network. Third party transaction account providers are referred to herein collectively as Global Network Services (GNS). For example, "American Express" branded cards are available from both American Express Travel Related Services Company, Inc (referred to herein as proprietary cards, or "Prop cards") as well as from other issuers (referred to herein as "GNS cards"), such as Citibank, N.A. of New York, N.Y. Accordingly, validation process 410 may include validation of proprietary cards and GNS cards. For proprietary cards, customer information is validated by TAP's card authorization system (CAS) 412, and for GNS cards, CM information is validated by GNS's card authorization system 414.

The CM may be provided the option to enroll more than one card and link each second and additional card to a primary enrolled card, which is illustrated in FIG. 4 as linking 416. Linking 416 provides the capability to assign a single registration identification to the CM and provides the CM the flexibility to make a purchase on any of the linked cards, with discount payments appearing on the CM's statement for the primary card. The linked cards may be all Prop cards, all GNS cards, or a mixture of Prop and GNS cards. Further, the linked cards assigned to a single registration identification may be corporate cards, personal cards, or a mixture thereof. The registration process may also include the capability of batch enrollment 420 of a plurality of cards of one or more CMs in a single instance. Information relating to enrolled CMs is stored in enrollee database 134. Information relating to linking 416 of a plurality of cards to the CM is also contained therein. Information from the enrollee database 134 may then be provided to RCE 138, as described above with reference to FIG. 2.

The CM or a non-cardmember may also be offered the option to enroll based on an action taken by the CM or non-cardmember that is not an enrollment activity. For example, offers may be communicated by through various channels that communicate offers to CMs and non-cardmembers. These offers may require that the CM or non-cardmember take an affirmative action (e.g., an action through a social media website) to be eligible for an offer. Once the CM has taken the affirmative action, solicitation 110 may provide enrollment information to the CM or non-cardmember or automatically enroll a CM. Where the affirmative action is taken by a CM who is not enrolled with the RCE 138, solicitation 110 may offer the CM the option to enroll or may automatically enroll the CM and communicate the enrollment to the CM through a suitable channel (e.g., e-mail, text message, social media message, and/or the like). Where a non-cardmember takes the affirmative action, solicitation 110 may present the non-cardmember with the option of apply for a transaction account to take advantage of the offer associated with the affirmative action. If the transaction account for the non-cardmember is approved, the non-cardmember becomes a new CM and may automatically be enrolled through enrollment 120 or may have to manually enroll through enrollment 120. Once enrolled, the transaction card may be used to take advantage of the offer associated with the affirmative action.

In various embodiments illustrated in FIG. 4, information on participating merchants and their offers are divided into separate databases, i.e., an offer database 452 and a merchant database 454, and provided to RCE 138. As described above, TAP may collaborate with a loyalty program provider (LPP) 460 to deliver loyalty incentives to the CM in the form of coupon-less discounts. Accordingly, offer database 452 and merchant database 454 may be populated by TAP and/or LPP, with offers and merchants associated with TAP's marketing programs and LPP's marketing programs, respectively. TAP may screen merchants participating in LPP's marketing programs prior to accepting and storing them in merchant database 454. TAP's program administrator (not shown) may upload merchants and offers to the respective databases along with other information associating merchants and offers with one or more marketing programs. In various embodiments, as discussed below, TAP's program administrator may specify offers and programs, reward criteria, eligibility criteria, reporting options, tracking options, triggered alerts, etc. via API's of RCP 130.

For marketing programs administered by TAP, RCE 138 may include its own calculation of discount 432 for purchases made by registered CMs with merchants participating in TAP's marketing program. Further, LPP 460 may be responsible for calculation of discount 462 for purchases made at merchants participating in marketing programs administered by LPP 460. A merchant may be a participating merchant for a plurality of externally administered and/or internally administered marketing programs. Therefore, these offer and merchant databases may include a field identifying each offer and merchant to one or more marketing programs, as further described below with reference to FIG. 5.

Another input to RCE 138 are merchant ROCs 436, which may be compiled as a daily transaction file and stored in transaction database 136 (shown in FIGS. 1 and 2). RCE 138 performs transaction matching of merchant ROCs 436 with enrolled CM information from enrollee database 134 and participating merchant and offer information from respective databases 454 and 452. Further detail regarding this matching will be described below with reference to FIGS. 5 through 7. Matched transactions relating to loyalty programs administered by loyalty program provider 460 are provided as an output file 444 to LPP 460 for discount calculation 462, whereby LPP 460 returns an output file (represented here as arrow 442), which includes the discount amount, or rebate credit, similar to the incentive payment field in output file 142 described above with reference to FIG. 3. This process of discount calculation by LPP 460 and exchange of information thereof with RCE 138 is discussed below with reference to FIG. 8.

A problem to be overcome in implementing a loyalty incentive program as described herein is how to deal with returns. For example, assume an account holder makes a purchase for $100 and receives a 10% discount (also called a rebate or incentive) on his or her account. If the account holder then returns the purchased goods to the merchant, it is desirable to be able to ascertain whether the purchase involved an incentive so that a return credit can be made in the appropriate amount. This problem is solved by providing a mechanism for dealing with returns. In various embodiments of FIG. 4, RCE 138 has the capability to process returns 456 on purchases for which a registered CM may have been provided a rebate credit pursuant to a marketing program. If a rebate credit had been previously provided, then processing of returns 456 includes providing a credit to the merchant for the earlier debited amount of the rebate credit provided to the CM and providing a corresponding debit to the CM of the earlier rebate credit. Processing of returns is similar to the transaction processing of purchases and is described in greater detail below with reference to FIGS. 15 and 16. Accordingly, output file 444 from RCE 438 may include return transactions, whereby loyalty program provider 460 calculates a negative discount, or a discount reversal amount, 464 for each eligible return. Eligible returns may be identified based on a stock keeping unit (SKU) associated with the purchase or based on the date of the purchase and the amount of the purchase (i.e., "backtrack discounts"). Logic associated with matching prior purchases with returns by means other than SKUs is described in further detail with reference to FIGS. 19 and 20.

RCE 138 has the capability to convert the discount amount to an equivalent of membership reward points which may be redeemable in accordance with membership rewards program. Typically, a membership rewards program offers goods or travel packages in exchange for membership reward points. Moreover, the discount amount may be a combination of a monetary credit and an equivalent of reward points. To implement such conversions, as well as to support service fee calculation, etc. RCE 138 may include a configuration table 434. Configuration table 434 may include fields for each marketing program and corresponding information for converting the calculated discount (i.e., the rebate credit) between a monetary credit and/or an equivalence in membership rewards points (shown as "CM (%, $, Pts)"). Further, since a discount offer may be represented in units of monetary amount off or percent off a purchase price, or in terms of membership rewards points, then for internally calculated discounts 432, RCE uses configuration table 434 to match program, merchant, and conversion terms (shown as "SE (%, $)") to convert the offer terms to the desired units for discount calculation. Configuration table 434 may also have a field for TAP's service fees for each program and participating merchants, and service fees may be in units such percent of purchase or monetary amount (shown as "TAP (%, $)"). Further, since a merchant may be submitting the same offer for more than one marketing program, configuration table includes a "priority" field that is used to identify repeated offers and ensure that the CM receives only a single rebate credit on a purchase that is eligible to receive a discount pursuant to multiple marketing programs.

The calculated discount (or discount reversal, if relating to a return) is provided to TAP settlement systems 470 for transactions on Prop registered cards, or to GNS settlement systems 480 for transactions on GNS registered cards. An AR system of TAP settlement systems 470 processes the discount amount and provides the rebate credit (as a monetary credit or an equivalence in reward points, or both) on CM's credit statement. If the rebate credit includes membership reward points, then information relating the rebate credit is also provided to membership rewards 472 for appropriate record keeping for that CM. AP systems of TAP settlement systems 470 processes the merchant debit in accordance with CM's rebate credit, as well as any service fee charged by TAP for providing the services described herein. Further detail regarding processing of matched transactions via TAP settlement systems is described below with reference to FIG. 16. GNS settlement systems 480 include U.S. submissions 482, global clearing and settlement ("GC&S") 484, and one or more issuers 486. Global clearing and settlement 484 may be considered a repository for RCE 138's matched transactions associated with GNS cards so as to permit each GNS issuer 486 to retrieve their respective GNS card transaction information, including information of the discount and any service fees charged by TAP. GNS issuers 486 may then use this information to provide a rebate credit to CMs accounts managed by issuers 486 and to provide a debit to participating merchants in a similar manner as described above with reference to FIG. 2. Further details regarding application of the registered card program to GNS registered cards is described below with reference to FIGS. 17 and 18.

In various embodiments, system 400 may be configured to process transactions and associated rewards based on the entity sponsoring the reward. For example, transactions associated with a transaction account issuer sponsored reward (e.g., a reward funded by a transaction account issuer) may be processed differently than a transaction corresponding to a merchant sponsored reward. Sponsoring may include at least one of endorsing, funding, supporting, processing, analyzing, validating, fulfilling, affiliating with, providing information for and/or the like.

System 400 may be configured to initially process transactions, and issue debits and credits associated with a transaction (e.g., the purchase of an item). System 400 may be a standalone system, part of a larger accounts payable/account receivable system, and/or part of a separately contained rewards processing system. This processing may be conducted by any suitable system with accounts receivable and/or accounts payable processing capabilities. In various embodiments, credits and debits associated with transaction information (e.g., a ROC or a transaction account authorization) and rewards associated with the transaction corresponding to the transaction information may be processed in series (e.g., the credit and debit associated with the transaction information and the rewards processing associated with the transaction information do not occur at substantially the same time, but occur in any suitable order) or in parallel.

Moreover, the credits and debits may be processed in substantially real-time or may be processed in batches. Batch processing may allow a sponsoring entity to set a limit on the number of rewards provided (e.g., 300 rewards to the first 300 CMs that make 3 qualifying transactions), to set timing for the reward being provided, or to set other suitable parameters for issuing rewards.

Figure 4B:
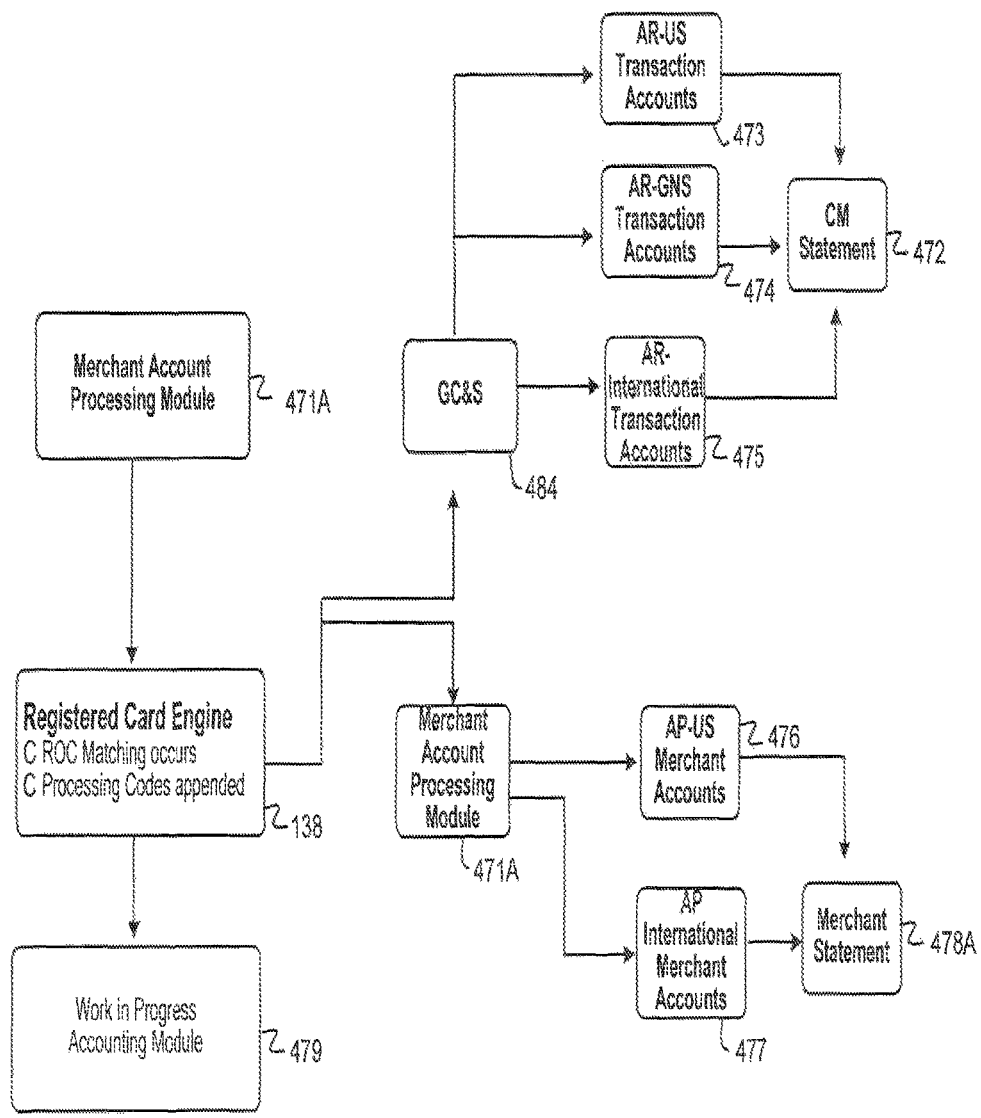
FIG. 4B is a high level flow diagram associated with a merchant funded reward, in accordance with various embodiments.
Figure 4C:
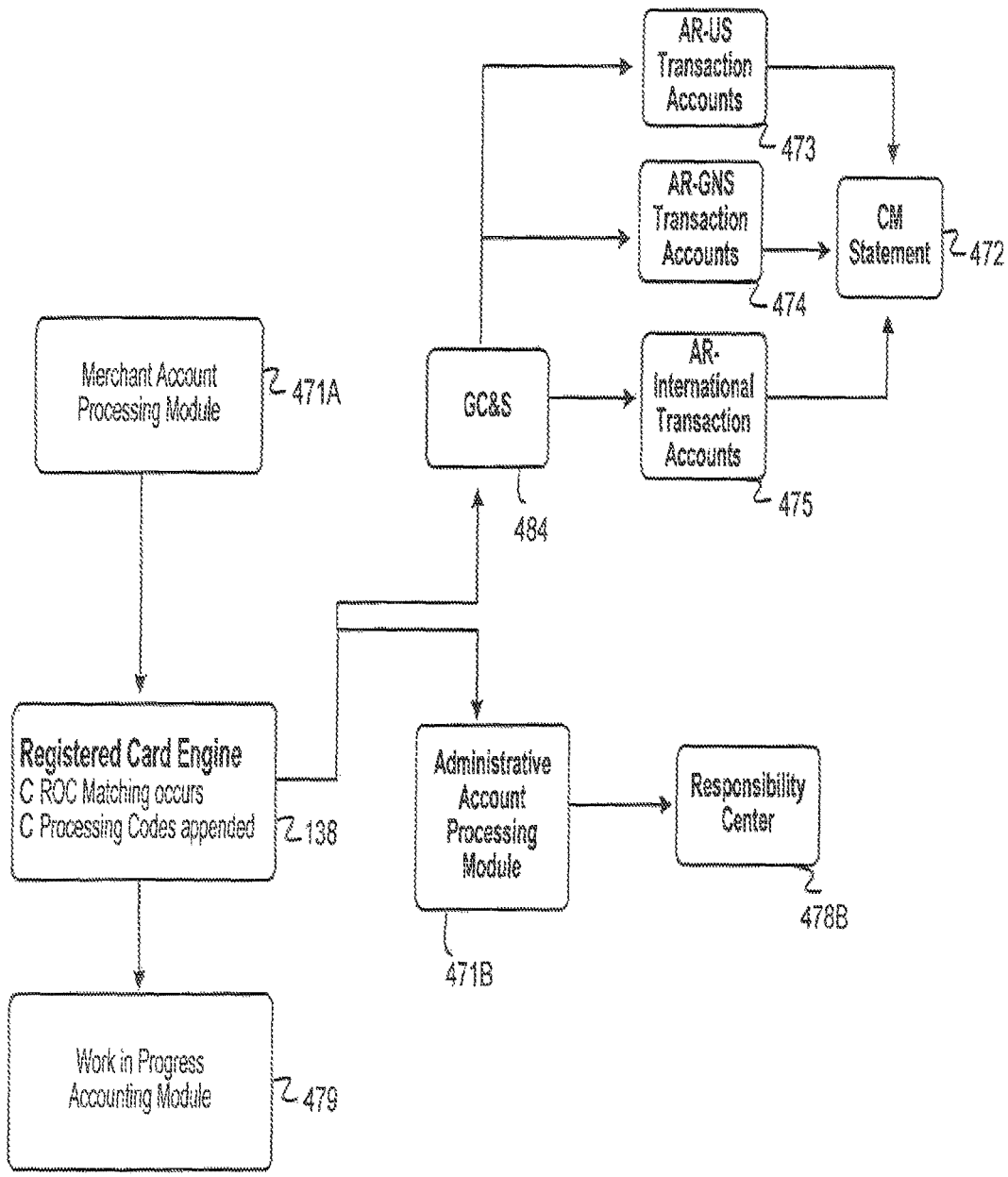
FIG. 4C is a high level flow diagram associated with transaction account issuer funded rewards, in accordance with various embodiments.
Figure 5A:
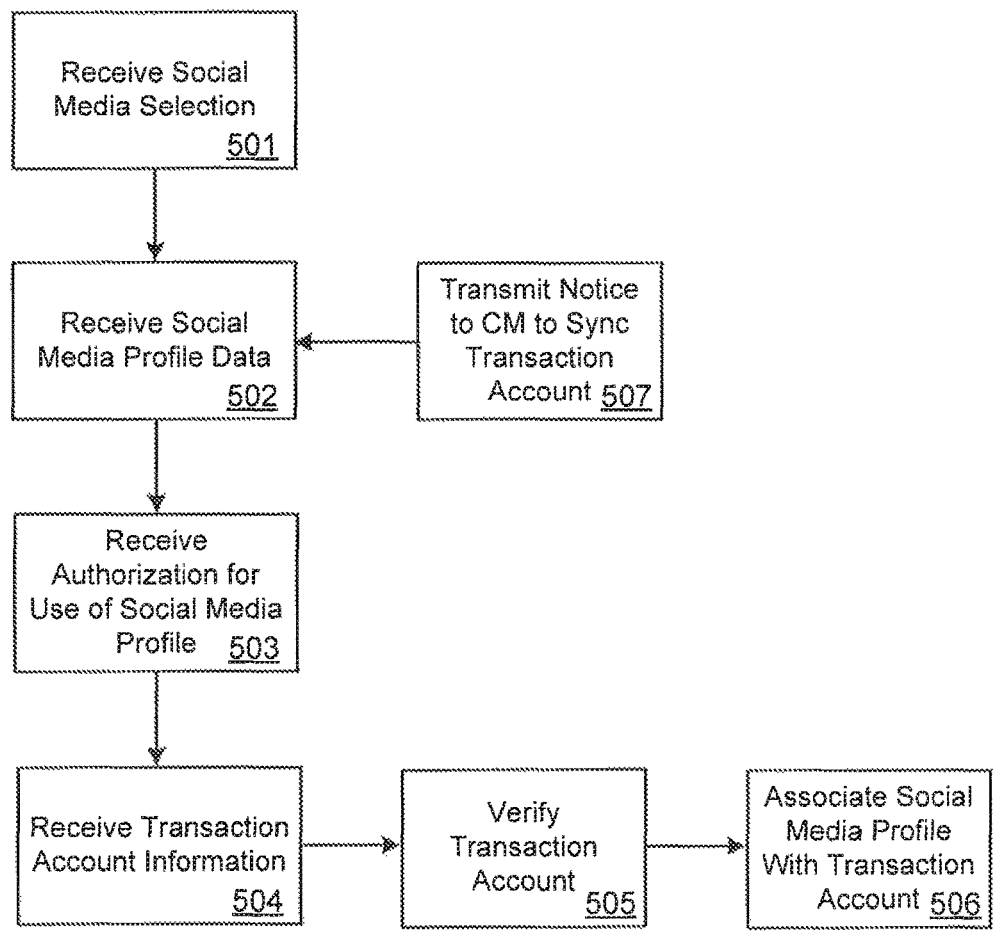
FIG. 5A is a detailed high level flow diagram of the process performed by a system for managing offers based on user broadcasts, in accordance with various embodiments.
Figure 5B:
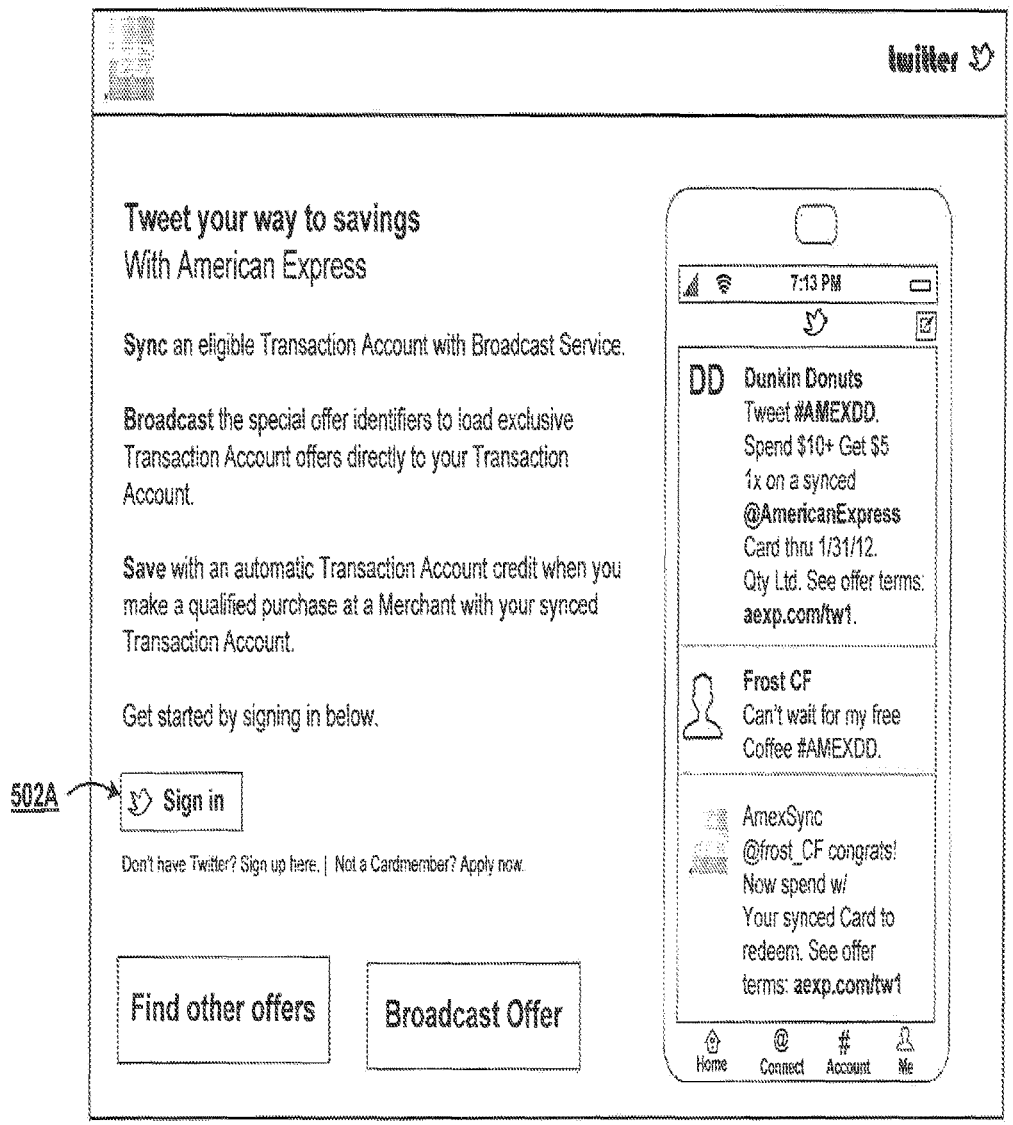
FIG. 5B is screenshot of a step performed by a system executing the process illustrated in FIG. 5A, in accordance with various embodiments.
Figure 5C:
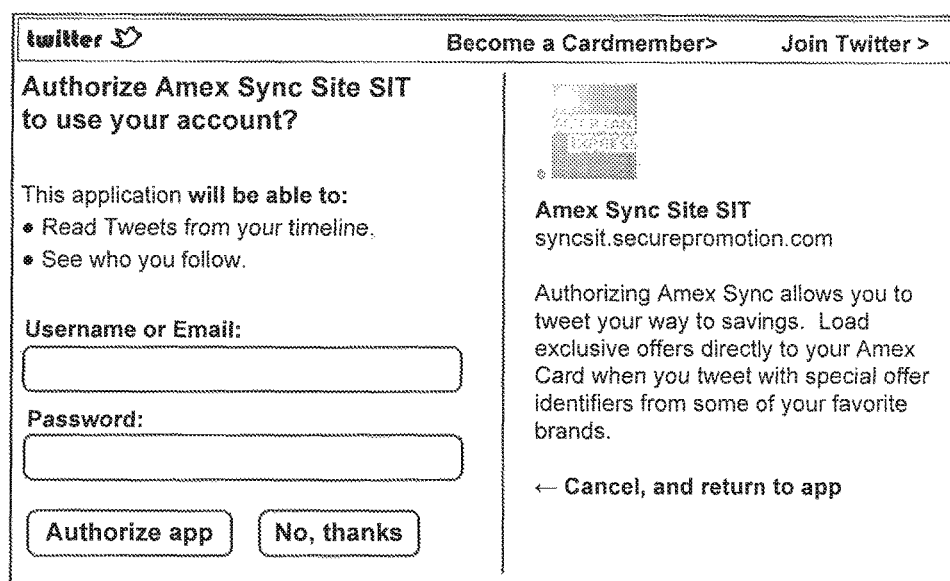
FIG. 5C is screenshot of a step performed by a system executing the process illustrated in FIG. 5A, in accordance with various embodiments.
Figure 5E:
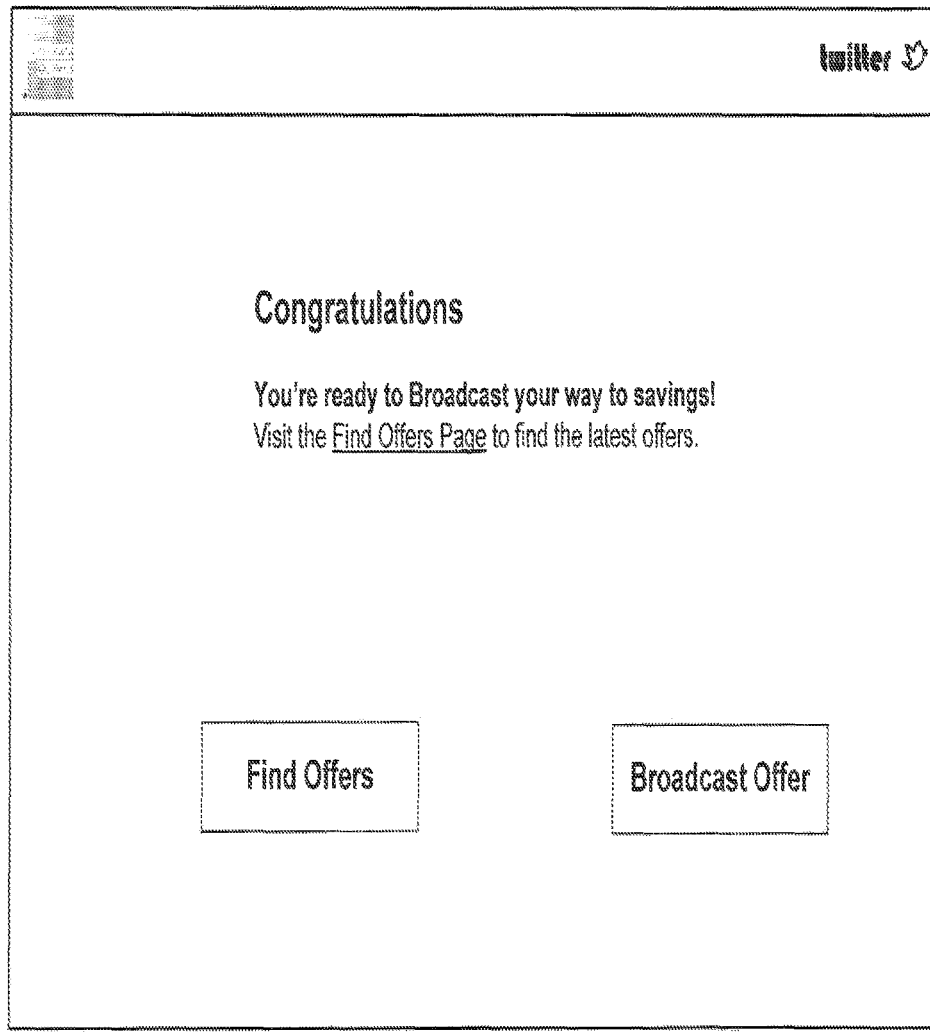
FIG. 5E is screenshot of a step performed by a system executing the process illustrated in FIG. 5A, in accordance with various embodiments.
Figure 5F:
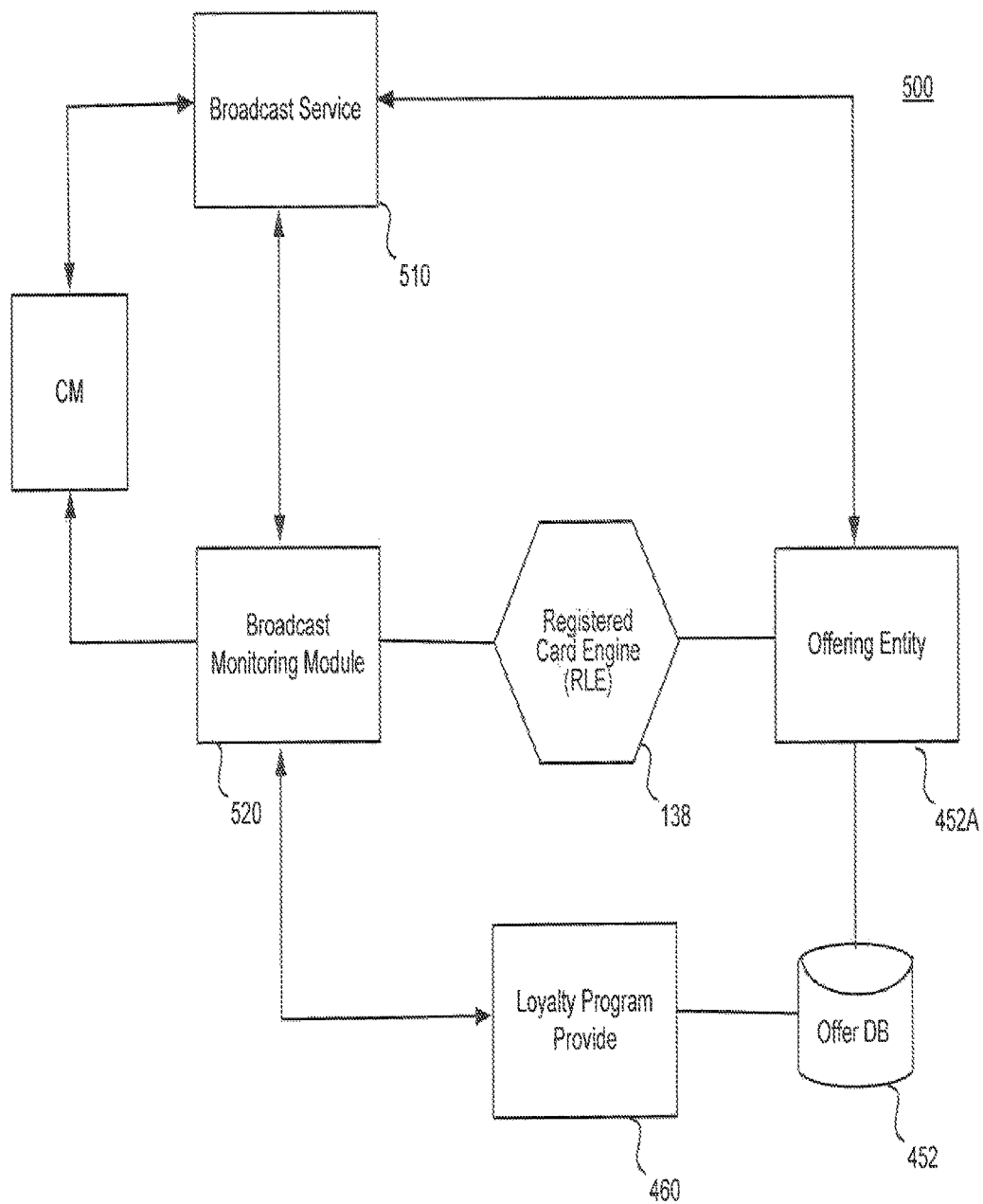
FIG. 5F shows an exemplary system diagram, in accordance with various embodiments.
Figure 5G:
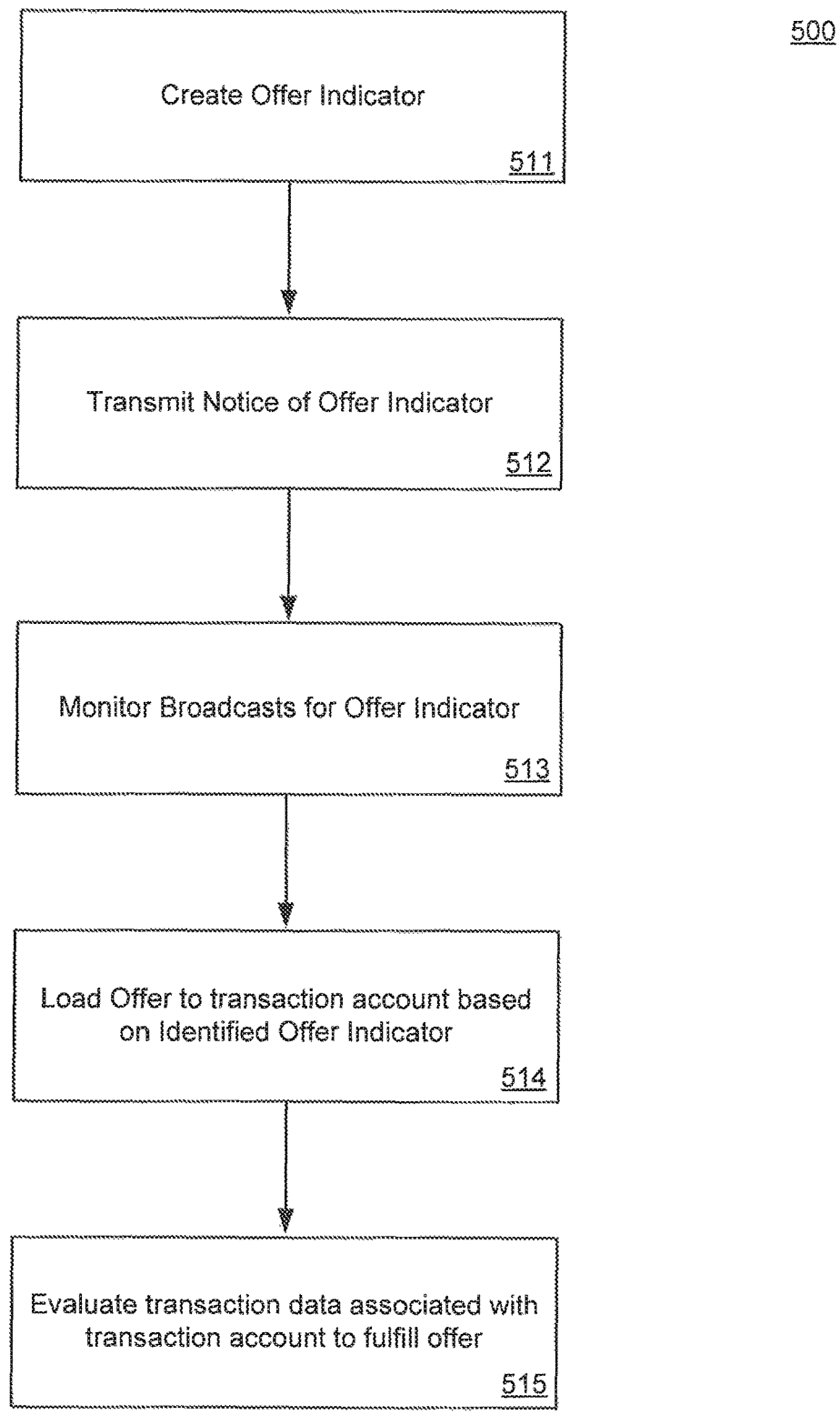
FIG. 5G is a detailed high level flow diagram of the process performed by the system illustrated by FIG. 5F, in accordance with various embodiments.
Figure 5H:
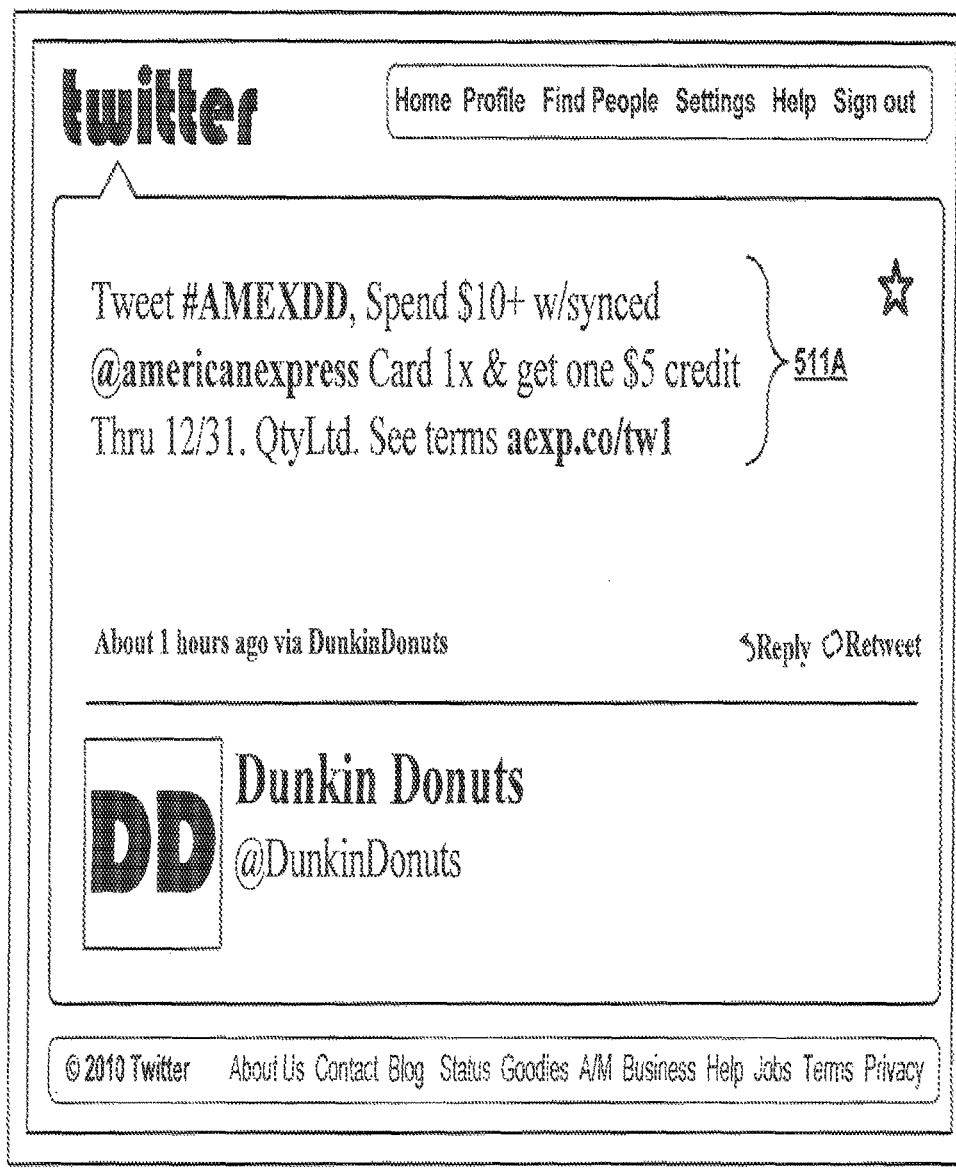
FIG. 5H is screenshot of a step performed by a system executing the process illustrated in FIG. 5G, in accordance with various embodiments.
Figure 5I:
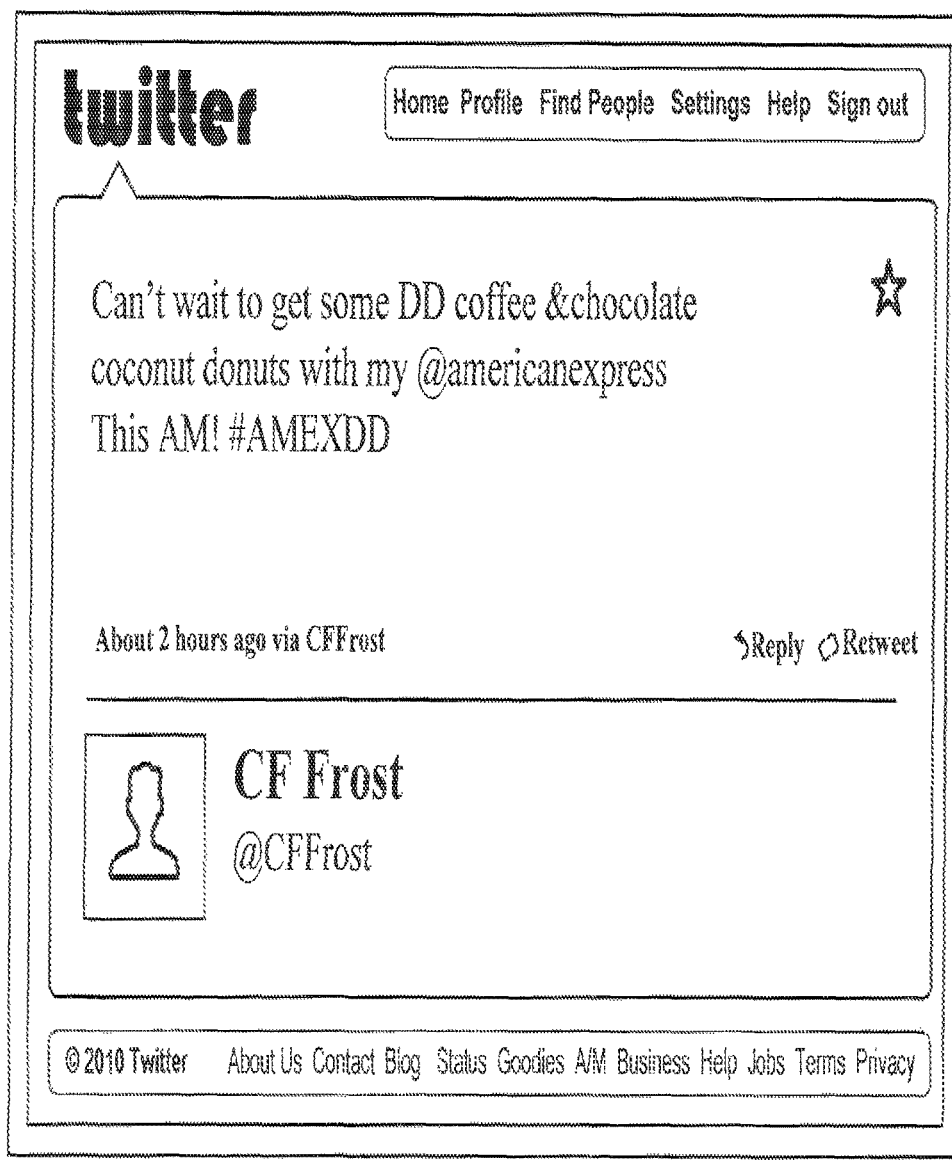
FIG. 5I is screenshot of a step performed by a system executing the process illustrated in FIG. 5G, in accordance with various embodiments.
Figure 5J:
FIG. 5J is screenshot of a step performed by a system executing the process illustrated in FIG. 5G, in accordance with various embodiments.
Figure 5K:
FIG. 5K is screenshot of a step performed by a system executing the process illustrated in FIG. 5A, in accordance with various embodiments.

In various embodiments and with reference to FIGS. 4B and 4C, reward processing of the transaction information may occur in series. The transaction information may be acquired by any suitable system or process, such as, an accounts payable and/or accounts receivable processing system. System 400 may be a sub-system or may interface with the account payable/accounts receivable processing system. As part of the processing, system 400 and/or account payable/accounts receivable processing system may identify a CM associated with the transaction information and/or associated CM data with particular transaction information. The account payable/accounts receivable processing system may also create an account payable record associated with the transaction information (e.g., a merchant portion of a ROC) and an account receivable record associated with the transaction information (e.g., a CM portion of a ROC) and provide the corresponding debit and/or credit associated with each of the account payable record and account receivable record. The debit and/or credit may then be provided to the appropriate systems for issuance to the corresponding merchant and/or CM. Instructions associated with the debit and/or credit may be provided to a suitable system and/or module for further reporting (e.g., CM statement 472 and/or Merchant Statement 478A).

The account payable portion of the transaction information may be transmitted from a merchant account processing module 471A to RCE 138. (FIG. 4B includes two merchant account processing modules 471A, which may be the same processing module or different processing modules. The module is shown twice for clarity and ease of explanation). Transaction information associated with international charges may be routed through one or more sub-systems. GC&S 484 and/or merchant account processing module 471A may be administered by any suitable entity including for example, a transaction account issuer, a payment processor, a merchant acquirer, a loyalty program provider, and/or any suitable third party.

RCE 138 may be configured to further process the transaction information and associated CM data, evaluate offers, match transaction information and/or CM data with one or more merchant sponsored offers or transaction account issuer sponsored offers. Where RCE 138 identifies a match associated with the transaction information and/or CM data, RCE 138 associates and/or appends a processing code and/or reward identifier to the transaction information. The code or identifier may designate the type and/or amount of the reward. The code may also identify the entity sponsoring the reward (e.g., a merchant sponsored reward or a transaction account issuer sponsored reward). RCE 138 may also transmit credit and debit data (e.g., actual credits and debits (or instructions) to credit and debit the associated transaction account and sponsoring entity account) to the various AR and AP systems discussed herein.

With particular reference to FIG. 4B, system 400 may be configured to process a merchant sponsored reward. Where the transaction information comprises a code and/or an identifier indicates that the reward is merchant sponsored, RCE 138 transmits the transaction information to GC&S 484 and Merchant account processing module 471A, which may be part of the larger account payable/accounts receivable processing system or may be a suitable reward processing sub-system.

GC&S 484 may further process the transaction information to determine the type of account associated with the transaction information such as, for example, a proprietary transaction account associated with a U.S. CM, a proprietary transaction account associated with an International CM, and/or a GNS issued account. The reward (e.g., a credit or instructions to provide a credit to a transaction account) may then be transmitted by GC&S 484 through the appropriate AR processing system (e.g., AR—U.S. Transaction Accounts 473, AR—GNS Transaction Accounts 474, and/or AR—International Transaction Accounts 475) corresponding to the type of transaction account to the issuer, entity, or system responsible for administering the credit. The reward may then be provided to the CM and/or credited to the associated transaction account and shown on a CM's statement 472.

Merchant account processing module 471A may receive debit information associated with the reward that corresponds to the amount of the reward and any associated fee from RCE 138. Merchant account processing module 471A may further process the transaction information and/or reward information to determine whether the merchant is a U.S. merchant or an international merchant. Based on that determination, merchant account processing module 471A may then transmit the transaction information and/or reward information (e.g., the debit and/or debit information) to the appropriate AP system (e.g., AP—U.S. merchants 476, or AP—international merchants 477) for further processing. The AP system may further transmit the transaction information and/or reward information to the appropriate merchant, such that the debit is applied or associated with a merchant account and a suitable identifier associated with the debit is provided on the merchant statement 478A. The suitable identifier may be an identifier associated with a single debit, or may be an identifier associated with a plurality of debits corresponding to CM rewards and/or fees paid by the merchant. In other words, the suitable identifier may comprise one or more debits and/or one or more fees payable by the merchant to the transaction account issuer.

With particular reference to FIG. 4C, system 400 may be configured to process a transaction account issuer sponsored reward. Where the transaction information comprises a code (or identifier indicates that the reward is issuer sponsored), RCE 138 transmits the transaction information to GC&S 484 and administrative account processing module 471B, which may be part of the larger account payable/accounts receivable processing system or may be a suitable reward processing sub-system. GC&S 484 and/or administrative account processing module 471B may be administered by any suitable entity including for example, a transaction account issuer, a payment processor, a merchant acquirer, a loyalty program provider, and/or any suitable third party.

GC&S 484 may further process the transaction information to determine the type of account associated with the transaction information such as, for example, a proprietary transaction account associated with a U.S. CM, a proprietary transaction account associated with an International CM, or a GNS issued account. The reward (e.g., a credit or instructions to provide a credit to a transaction account) may then be transmitted by GC&S 484 through the appropriate AR processing system (e.g., AR U.S. Transaction Accounts 473, AR—GNS Transaction Accounts 474, and/or AR—International Transaction Accounts 475) corresponding to the type of transaction account to the issuer, entity, or system responsible for administering the credit. The reward may then be provided to the CM and/or credited to the associated transaction account and shown on a CM's statement 472.

The issuer may be associated with various sub-entities or groups that offer or provide rewards programs to encourage specific CM behavior. For example, the issuer may be associated with a first group that provides a program that offers rewards for the purchase of travel services and a second group that provides a program that offers rewards for purchases from small businesses. In order to insure proper accounting, the issuer associates costs associated with each program to the specific sub-entity or group providing the program. As such, administrative account processing module 471B may receive debit information associated with the reward that corresponds to the amount of the reward and any associated fee from RCE 138. Administrative account processing module 471B may further process the transaction information and/or reward information to determine the group or sub-entity responsible for or associated with the reward. Based on that determination, administrative account processing module 471B may then transmit the transaction information and/or reward information (e.g., the debit and/or debit information) to an appropriate responsibility center 478B associated with group or sub-entity responsible for the reward.

RCE 138 may also be coupled to or configured to provide the credits and debits associated the each reward to a work in progress ("WIP") accounting module 479. WIP accounting module 479 may be any suitable hardware, software, or hardware-software system configured to receive, track, compare, balance, monitor, analyze, or otherwise process credit and associated debits. WIP accounting module 479 may also be configured to insure that each credit is properly associated with a corresponding debit to insure financial balance.

System 400 further allows issuers and merchants to provide rewards in various currencies and based on CM transactions or spends in various countries. The parameters of rewards offers associated with the reward in various countries may be determined at the time the sponsoring entity (e.g., sponsoring merchant, a sponsoring transaction account issuer, a sponsoring product manufacturer, a sponsoring service provider, a sponsoring third party, a sponsoring merchant acquirer, a sponsoring promotional organization, and/or the like) sets up the offer. The sponsoring entity may be affiliated with an entity providing the item associated with the reward, but may not supply the item (e.g., a chamber of commerce or other promotional or civic organization, a university, a club, or similar entity). The reward offer parameters may include for example, the currency of the reward (e.g., the currency of the reward credit and associated debit). Typically, the reward credit and associated debit may be provided in the same currency or in different currencies. However, in for some rewards program the currencies must be provided in the same currency. Similarly, in some jurisdictions where a reward offer is presented to CM's, the laws of the jurisdiction or accounting practices of the jurisdiction may require the credit and debit are provided in the same currency. A sponsoring entity may also define currency based on the currency of the country where the transaction associated with the reward offer will take place or based on the currency of the country associated with a population of CM that are being targeted by the reward offer or sponsoring entity, or any other suitable currency.

The reward offer parameters or rules governing transaction processing of a particular account issuer may also define when an exchange rate is captured for international rewards programs. For example, a German CM may accept and conduct a purchase associated with a U.S. offer, where the offer parameters define that the offer credit and debit are administered in U.S. Dollars. As such, the credit to the German CM and the debit the U.S. merchant are provided in U.S. Dollars. However, the credit to the German CM is provided on CM Statement 472 in Euros and thus an exchange rate associated with the transaction is defined. The exchange rate may be the time that the transaction is initiated or authorized (e.g., when the CM presents the transaction account for payment at a POS). The exchange rate may be captured at the time the merchant submissions is processed by the account payable/accounts receivable processing system. The exchange rate may also be captured at any suitable time or may be based on a pre-determined exchange rate selected by the CM and/or guaranteed by the account issuer.

For example, the system allows a merchant or issuer to provide a reward credit in the currency of the country where the spend occurred (e.g., a U.S. CM conducts a transaction in Germany in Euros and receives a reward credit and/or a notification of a reward credit in Euros). This allows the U.S. CM to understand the amount of the reward in the context of the transaction. The system also allows a merchant or issuer to provide a reward credit in the currency of the home country of the CM (e.g., a U.S. CM conducts a transaction in Germany in Euros and receives a reward credit and/or a notification of a reward credit in U.S. Dollars). This would allow the U.S. CM to understand the amount of the reward in the context of currency most familiar to the CM. The system may further provide a percentage reward (e.g., a 10% credit based on reward criteria) that could be administered in any suitable currency selected by the issuer and/or merchant.

CM may be notified of these various international offers in any suitable fashion. For example, if the CM books travel using a transaction account associated with a rewards program having international rewards in destinations associated with the booked travel, a merchant or issuer may provide notices associated with one of more rewards programs based on the travel itinerary. This notification process is discussed in more detail below. Similarly, the CM may leverage social media to conduct a check-in at a particular international destination through Foursquare, and as a result, receive offers based on the CM's location, as discussed herein. A CM spend in a foreign country (i.e., a country that is not the country of residence of the CM such as, a British CM's spend in the U.S.) may be a triggering event that produces notifications of rewards to the British CM that may be loaded to a card based on a selection by the CM or an overt act by the CM (e.g., a tweet, a Facebook check-in, multiple spends at one or more merchants or associated with one or more items).

RCE 138 may further have the capability to provide TAP with reporting 490, which may include a marketing analysis or monitoring of the success of various marketing programs and information relating to account holder participation therein. Reporting 490 thereby permits TAP to target CMs and deliver merchant offers that are desirable to its registered CMs and/or merchants.

Offer DB 452 may comprise a plurality of offers. In various embodiments, the offers may be predetermined offers and/or offers based on merchant criteria. The offers may be configured to be delivered electronically through reporting 490. The electronic delivery may include delivery via email, text messaging, instant messaging and/or social networking distribution (e.g., via Facebook, Twitter, Myspace, Linked-in). The electronic delivery may be automatic or require a manual input.

In various embodiments, and with reference to FIGS. 5A-5K, system 500 may be configured to associate offers with a CM based on publishing actions by the CM. Many channels (e.g., blog websites, social media website, and/or the like) available through the internet allow a CM to publish content that can be viewed by people or entities associated with the CM. Channels may include, for example, Facebook, Twitter, You Tube, foursquare, Linkedin, Pintrest, Google Plus, Feedji, Chatter, Yammer, Cubetree, Socialtext, Jive, Neustar, Weightless, Blogger, and/or the like. These channels are generally able to identify publications by a CM, through components of the system that support the channel. For example, data associated with a user's social media account may be indexed by the social media service. The particular data (e.g., a broadcast, message, or other suitable data) published by the user through the social media site can be particularly identified if the data comprises a predetermined object (e.g., offer identifier, text, picture, symbol, keyword, graphic, sound, etc.).

Initially, the CM may have to associate a transaction account and a broadcast channel with the entity response for administering the rewards program. The CM may navigate through a web browser to a offer program landing page 501A. The CM may select one or more broadcast channels (e.g., social media channels) (Step 501). In response to the receiving the broadcast channel selection, system 500 may request profile data for the CM's broadcast channel account (Step 502). System 500 may be configured to display a webpage that allows a CM to input the profile information or may allow the CM to sign-in with a selected broadcast channel user name and password. For example, system 500 may provide a broadcast channel login button 502A. System 500 may also require the CM to specifically authorize system 500, RCE 138, or a third party 503A (e.g., a partner, merchant, service provider, monitoring service, and/or the like) to monitor, collect, evaluate or otherwise process the data broadcasted by the CM through the broadcast channel (Step 503). In various embodiments, system 500 may be configured with an application provided through an authorization page 503A that installs on a device (e.g., a smart phone, laptop, tablet computer, and/or the like) to facilitate monitoring of the CM broadcasts, CM profile information, transaction accounts associated with a CM and process or manage any other suitable CM data.

The CM may then provide profile information for the channel associated with the CM's broadcast channel account (Step 504). In response to receiving the profile information, system 500 may be configured to request transaction account information (Step 504). The transaction account information may be provided through an account registration webpage 504A, or be automatically identified by system 500 based on the login information, where the login information sufficiently complies with (e.g., is identical to) login information associated with one or more transaction accounts. System 500 may further request the CM to affirmatively sync the transaction account with the CM's broadcast channel profile (e.g., by selecting a sync button 505A). System 500 may be configured to verify that the transaction account is eligible to sync with the broadcast channel profile and receive offer based on CM broadcasts, based on card type, spending level, payment history, spending history, creditworthiness, enrollment in loyalty programs, or any other suitable factor (Step 505). For example, CM with standard accounts may be eligible to receive offers, but CM with branded transaction accounts may not be eligible to receive offers based on CM broadcasts.

Based on the sync and the verification that a card is eligible, system 500 may acknowledge to the CM the association between the transaction account and the CM's broadcast channel profile (Step 506). System 500 may also provide a confirmation webpage 506A, may electronically communicate confirmation that a transaction account has been synced (e.g., via an e-mail, SMS, social media message, and/or the like), or any other suitable confirmation. In various embodiments, system 500 may be configured to provide additional information to the CM during the registration process. For example, system 500 may be configured with an offer database that is searchable by the CM. This allows the CM to evaluate the various offers available, allowing the CM to determine whether she would be interested in receiving the offers. System 500 may also brand various web pages based on the broadcast channel selected by the user. For example, where system 500 allows a CM to associate an American Express transaction account with the social media channel such as Twitter, system 500 may be configured to co-brand one of more web pages during registration with American Express brands and Twitter brands. This may be based on the CM's selection of Twitter and/or the providing American Express Transaction account information.

Any entity associated with, distributing and/or sponsoring the offer may create an offer indicator and offer details 511A (Step 511). Thereafter, the offer may be communicated to CMs and/or non-cardmembers through any suitable communication channel 512A as discussed herein (Step 512). In response to the offer being distributed and/or communicated from Offer DB 452, a CM may be requested to take action to accept, associate and/or load the offer to a transaction account, as discussed above. In various embodiments, the CM or non-cardmember may be requested to broadcast an offer indicator 513A or predefined message 513A to accept, associate, and/or load the offer. The CM or non-cardmember may use a broadcast service 510 (e.g., Twitter, You Tube, Facebook, and/or the like) to transmit the predetermined message 513A. The loyalty program provider 460, offering entity 452A and/or RCE 138 may be configured to monitor or receive broadcast information from a broadcast monitoring module 520 (Step 513).

The broadcast monitoring module may be configured to monitor all broadcasts from a particular channel. The broadcast monitoring module may be operated by or reside with the broadcast channel (e.g., Twitter, Facebook, You Tube, Linkedin, Pintrest and/or the like) or an entity responsible for administering the offer (e.g., loyalty program provider 460, offering entity 452A and/or RCE 138). The channel may be a social media channel such as, for example, Twitter, Facebook, You Tube, Linkedin, Pintrest and/or the like. In response the offer indicator 513A or predetermined message 513A being identified through broadcast monitoring module 520, the offer may be loaded to or associated with a CM transaction account (Step 514). System 500 may be configured to transmit a confirmation message 514A to the CM, in response to loading the offer to the CM's transaction account. The confirmation message 514A may be transmitted through the channel of the original CM broadcast or through any other suitable communication channel.

In various embodiments, where the CM account is not synced with a broadcast channel, but the CM may still broadcast the offer identifier through a channel, such that the entity responsible for administering the offer invites the CM to associate a transaction account with the channel (Step 507). For example, the entity responsible for administering the offer may provide a message 514A to the CM. The message could be transmitted through the channel that the CM used to broadcast the offer identifier or through any other suitable communication channel. Alternative communication channels may be used where the profile from the broadcast channel used to broadcast the offer is associated with another communication channel (e.g., a twitter account may be associated with at least one of another social media account, a mobile phone number or an e-mail address).

If the offer indicator or predetermined message is broadcast by a non-cardmember, the non-cardmember may be offered the opportunity to apply for a transaction account so that the non-cardmember can take advantage or the offer. Transaction data associated with the transaction account is monitored and compared with the parameter of the associated offer, so that the offer can be fulfilled when the conditions of the offer are met (Step 515).

For example, using Twitter or any other suitable push based short message service, a CM or non-cardmember may receive a communication indicating that if the CM or non-cardmember broadcasts or tweets an offer indicator, the CM or non-cardmember will be eligible to take advantage of an offer (e.g., a discount on a product, a credit of loyalty points, an experience, and or the like). As noted above, a non-cardmember will need to apply for and be granted a transaction account in order to take advantage of the offer.

In operation, a user (e.g., a CM or non-cardmember) broadcasts or, in the Twitter example, tweets a message comprising the offer indicator. The broadcast is received by the broadcast platform. Any broadcast that comprises the offer indicator is identified by the broadcast platform. This subset of broadcasts is transmitted to the entity responsible for administering the offer. The subset of broadcasts may be transmitted in real time, in batches, or at any suitable frequency. Once the broadcasts are provided to the entity responsible for providing instructions to load or associating offers to a transaction account, the broadcasts are analyzed are parsed to identify specific offer identifiers. Based on the identification of a specific offer identifier, the offer can be loaded on the transaction account associated with the source of the broadcast. Transaction data may be evaluated against offer loaded to a transaction account to provide the benefit of the offer to the transaction account or a CM associated with the transaction account.

Offers may be loaded to a transaction account at any time. The offer may be loaded to a transaction account after a qualifying purchase is made, but transaction data from a prior purchase may be evaluated against a subsequent offer. In this way, purchases that are authorized before an offer identifier is broadcast by a CM may be applied to transaction data that was authorized prior to the broadcast. For example, a CM may make a purchase at a first time and broadcast an offer identifier at a second time, where the first time is earlier than the second time. The transaction data associated with the purchase at the first time may be evaluated with the offer associated with the broadcast at the second time to provide the benefit associated with the offer based on the purchase. The benefit will be provided as long as the transaction data associated with the purchase complies with the rules governing the offer (e.g., the timing of the offer, the spend level of the offer, the location of the purchase and/or the like). Similarly, a broadcast comprising an offer identifier which causes an offer to load to a transaction account may occur at a first time and be evaluate against transaction data from a purchase at a second time, where the first time is earlier than the second time.

The offer indicator may be a hashtag that comprises the "#" sign and a symbol or keyword, as is commonly used to characterize or categorize a tweet. The offer indicator may be any other indicator that is predetermined or dynamically determined to by the entity making or distributing the offer. The offer indicator may comprise elements or symbols that are associated with the entity funding or distributing the offer (e.g., a branded offer indicator). For example, an offer sponsored by a merchant and distributed by American Express may comprise elements of the name of the merchant, such as, HD for Home Depot) and elements of American Express, such as, AMEX for American Express). In this example, the offer indicator may be #HDAMEX. It should be understood that the offer indicator may also comprise and text, pictures, video, graphical elements, symbols, sounds and/or the like. The offer indicator may also comprise any predetermined or dynamically determined elements or symbols that describe the offer or are arbitrary (e.g., a branded offer indicator).

Where the hashtag is used and the twitter account used to tweet the hashtag is public, the offering entity or the entity administering the rewards program can identify user who have tweeted the offer indicator by searching for particular hashtag among publicly available tweets. Tweets can also be linked to other social media such as Facebook, Linkedin, or any other publicly accessible website using the Twitter widget. The tweets may be displayed within on a social media or publicly accessible website so that the offering entity or entity administering the offer can identify what CM or non-cardmembers are tweeting to take advantage of the offer.

The offering entity or the entity administering the rewards program may also follow a CM who associates a transaction account for Twitter offers. In this case, the offering entity or entity administering the rewards program will receive every tweet from the CM and will be able to determine with one or more of the CM's tweets included the offer indicator. Once the offering entity or entity administering the offer has identified a tweet that contains the offer indicator, the offer can be loaded to the transaction account associated with the CM.

Rewards may be provided to CM that follow a merchant, manufacturer, distributor, a sponsoring entity and/or the like on Twitter. The reward may be a discount, recurring reward, a one-time reward or other suitable reward based on the "follow" action.

Rewards may also be provided to CMs that re-tweet tweets from a merchant, manufacturer, distributor, a sponsoring entity and/or the like. For example, an amount of Delta Sky Miles could be added to a Sky Miles account holder who re-tweets a tweet from Delta Airlines. The rewards may be funded by a sponsoring entity, such as, Delta in the example above. Smaller merchants may also arrange or sponsor a program to provide rewards with an entity administering a rewards program. For example, a local hardware store may sponsor a program that provides rewards points (e.g., American Express MR Rewards Points) for tweets from customer that use the store.

In various embodiments, a CM may be presented with one or more offers based upon her current location, and those same offers may be generated or provided using the systems and methods incorporated by reference herein. Using the systems and methods described herein, A CM who has registered to receive offers from registered merchants may therefore improve her ability to receive and review offers by permitting rewards system 608 to show her offers from merchants near her current location. In this way, a CM is not restricted to registering for offers by way of a static or immobile computing device (e.g., a personal computer), nor is the CM forced to determine which offers she wishes to be registered to receive while she is stationary and away from the physical location of a registered merchant. Rather, a CM may receive dynamically updated offers based upon her (changing) location. Thus, a CM who resides in a city that is not home to a particular registered merchant may nevertheless receive offers from the particular registered merchant when she travels.

Figure 6:
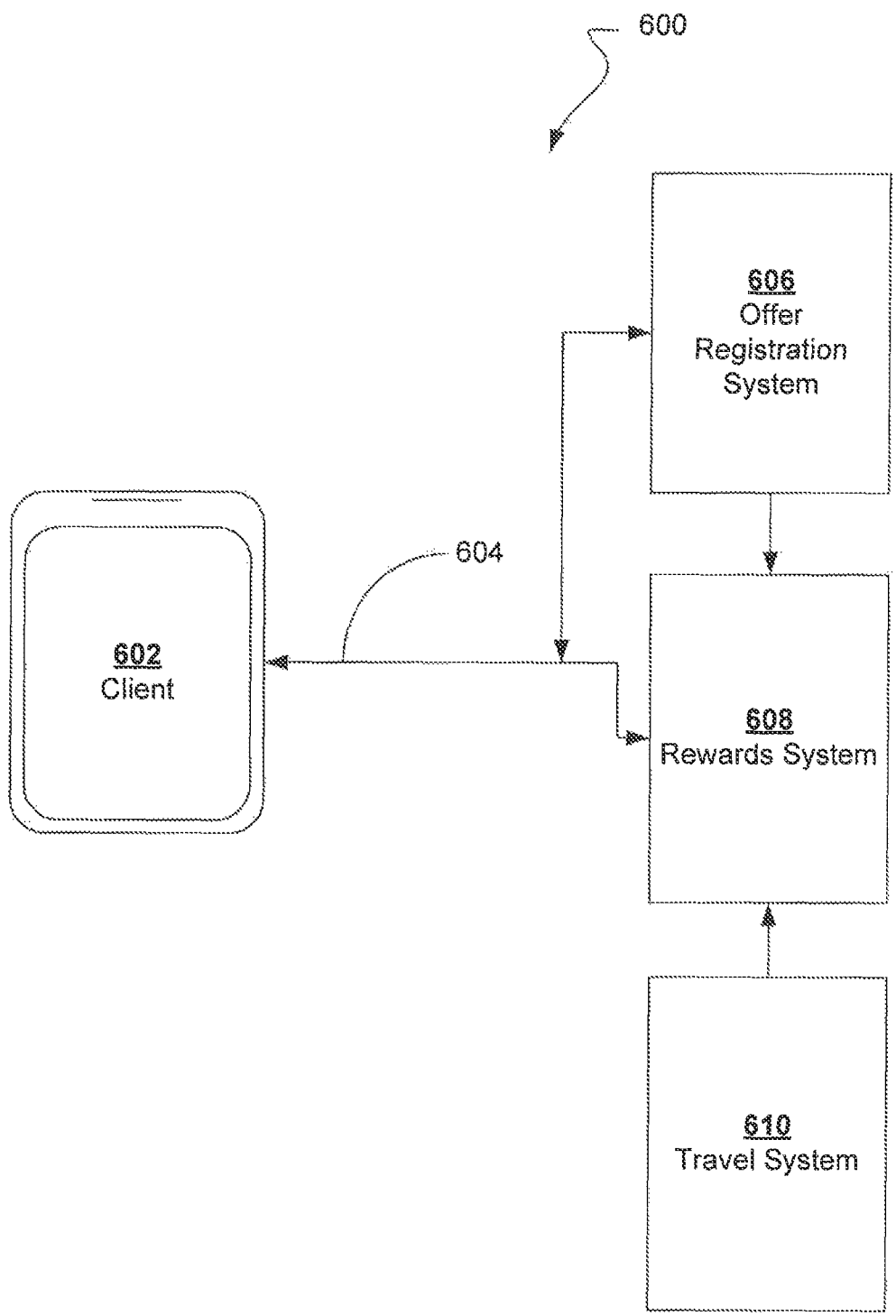
FIG. 6 shows an exemplary system diagram, in accordance with various embodiments.

Referring now to FIG. 6, system 600 implements a method for providing location based offers to registered or participating transaction account holders (i.e., "card members (CMs)," "registered participants" and/or "users"). System 600 may include a client 602, a network 604, an offer registration system 606, a rewards system 608, and a travel system 620. System 600 may include a variety of other components, including, for example, one or more mobile gateway servers (not shown) for securely receiving and transmitting data to and from the client 602, one or more electronic commerce website servers (not shown), and/or one or more payment processor authorization gateway servers (not shown).

Client 602 may comprise any software and/or hardware suitably configured for sending and/or receiving data. Client 602 may comprise a mobile communication device, such as a smart phone (e.g., an iPhone, Blackberry, Droid device, and/or the like) and/or a personal digital assistant (PDA). Client 602 may also include a personal computer such as a desktop or laptop computer, iPad, iMAC, MacBook, or generally any of a wide array of personal computing products. Client 602 may further comprise a kiosk, a terminal, a point of sale (POS) device, a television, a digital sign or banner, or any other device capable of sending and/or receiving data over a network. In various embodiments, client 602 may run Microsoft Internet Explorer, Mozilla Firefox, Google Chrome, Apple Safari, or any other of the myriad software packages available for browsing the internet. Client 602 may further comprise, at least, a display, such as a liquid crystal display (LCD), or a plasma screen display.

Network 604 may comprise software and/or hardware suitably configured or configurable to facilitate the transmission and reception of data. Thus, network 604 may comprise any of a variety of wired and/or wireless network architectures, including, for example, an RF network architecture such as a network associated with a wireless provider (e.g., a 3G or 4G network), a Wi-Fi network architecture (e.g., a home area or local area network), a wired network architecture reliant upon one or more cables and/or trunk lines and/or optical fibre lines, and/or any combination thereof.

Offer registration system 606 may comprise software and/or hardware suitably configured or configurable to receive and/or process data. Thus, offer registration system 606 may comprise a rack mountable server appliance running a suitable server operating system (e.g., IIS) and having database software (e.g., Oracle) installed thereon. Offer registration system 606 may be configured or configurable to register one or more CMs and/or one or more merchants who wish to participate in a rewards program. Thus, in various embodiments, offer registration system 606 may comprise a database of CMs and merchants who have registered or enrolled to participate in a rewards program. In various embodiments, any servers discussed herein may include application servers (e.g. WEB SPHERE, WEB LOGIC, JBOSS). In various embodiments, the server may include web servers (e.g. APACHE, IIS, GWS, SUN JAVA SYSTEM WEB SERVER).

Rewards system 608 may comprise any type of computer server configured or configurable to host a database. In various embodiments, such a server comprises a rack mountable server appliance running a suitable server operating system (e.g., IIS) and having database software (e.g., Oracle) installed thereon. In various embodiments, rewards system 608 may be configured or configurable to match a CM's spending data to one or more rewards or rewards offers. In various embodiments, rewards system 608 may collect or receive location data associated with one or more CMs. For example, rewards system 608 may collect or receive GPS coordinates associated with a CM's client 602, a city and state or other named location associated with a client 602, and the like. Rewards system 608 may receive travel data associated with a CM's travel itinerary; this data may be provided by a travel system 620 (see below). Rewards system 608 may provide one or more rewards or rewards offers to a CM based upon, or in association with, the CM's location (as described more fully below).

Travel system 620 may comprise any type of computer server configured or configurable to host a database. In various embodiments, such a server comprises a rack mountable server appliance running a suitable server operating system (e.g., IIS) and having database software (e.g., Oracle) installed thereon. In various embodiments, travel system 620 may collect or receive location data associated with one or more CMs. For example, travel system 620 may collect or receive GPS coordinates associated with a CM's client 602, a city and state or other named location associated with a client 602, and the like. Further, travel system 620 may collect or receive location data associated with a CM's travel itinerary. In various embodiments, travel system 620 may comprise a database of CMs who have used their transaction accounts to purchase travel tickets. Travel system 620 may comprise a CM's travel itinerary. In various embodiments, travel system 620 may comprise one or more of the systems and/or perform one or more of the methods described in U.S. Published Patent Application No. 2003/0177045, entitled "System and Method for Processing Trip Requests," filed Jan. 17, 2003, which is hereby incorporated by reference.

Client 602 may be coupled to offer registration system 606 and/or rewards system 608 by way of network 604. Likewise, offer registration system 606 may be coupled to rewards system 608 by way of network 604. Thus, client 602 may transmit and receive data to and from rewards system 608 through offer registration system 606; or client 602 may transmit and receive data to and from rewards system 608 directly. Rewards system 608 may be further coupled to travel system 620 by way of network 604.

Referring now to FIGS. 7-9C, the process flows and screenshots depicted are merely embodiments and are not intended to limit the scope of the invention as described herein. For example, the steps recited in any of the method or process descriptions may be executed in any order and are not limited to the order presented. It will be appreciated that the following description makes appropriate references not only to the steps and user interface elements depicted in FIGS. 7-9C, but also to the various system components as described above with reference to FIG. 6.

Figure 7:
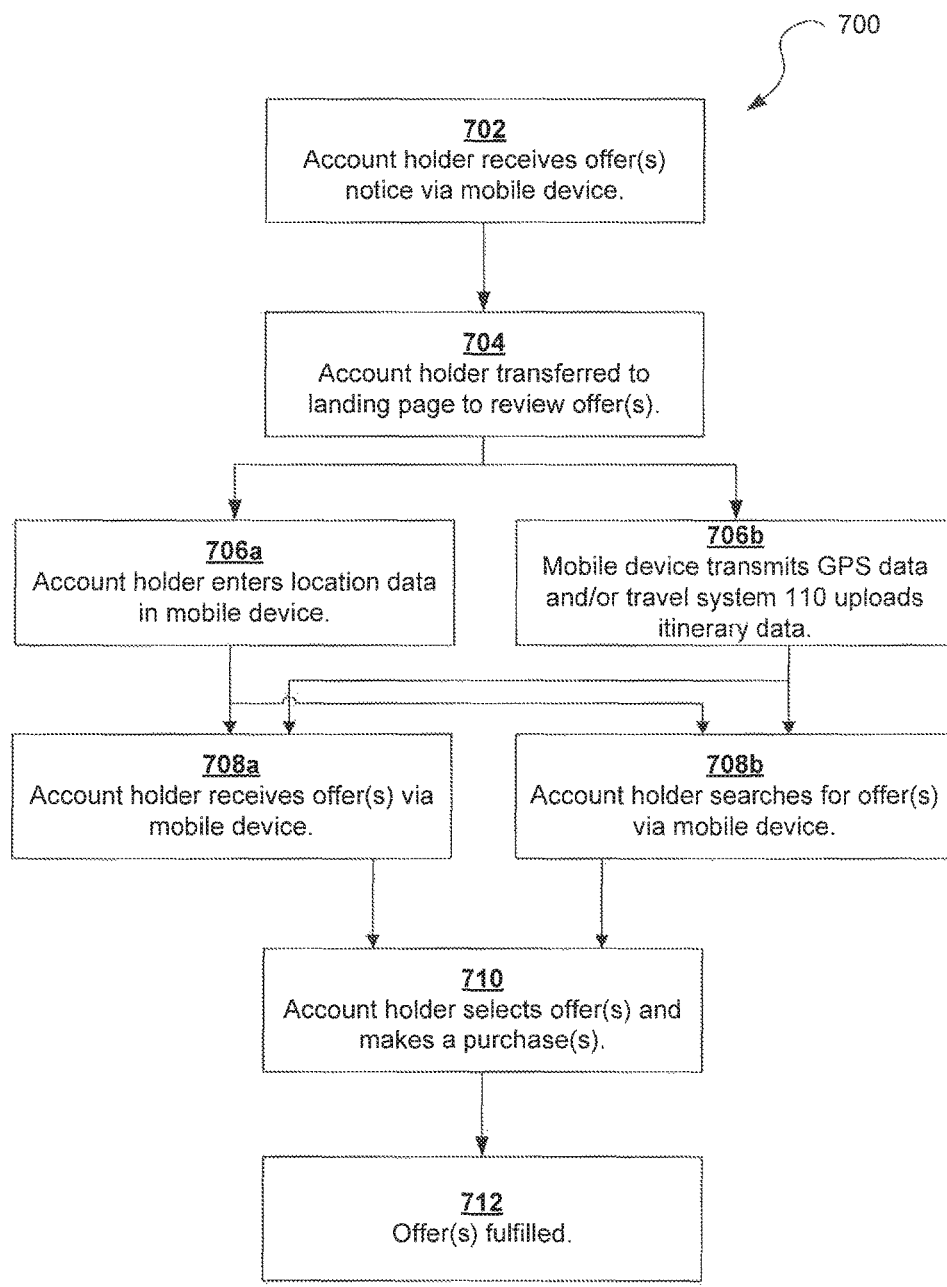
FIG. 7 shows a flowchart depicting an exemplary method for providing location based offers to a registered transaction account holder.

Referring to FIG. 7, a method 700 for providing location based offers to registered CM's is described. A CM may receive, during the course of her travels, one or more offers via her client 602 (e.g., her mobile communication device) based upon her current location, and for example, in accordance with the systems and methods described in U.S. Published Patent Application No. 2008/0021772 or U.S.

patent application Ser. Nos. 12/857,389, 12/857,424, all of which are incorporated by reference above (step 702). Thus, in an exemplary embodiment, a CM may receive an offer associated with a merchant that is registered, like the CM, with the offer registration system 606.

Figure 8:
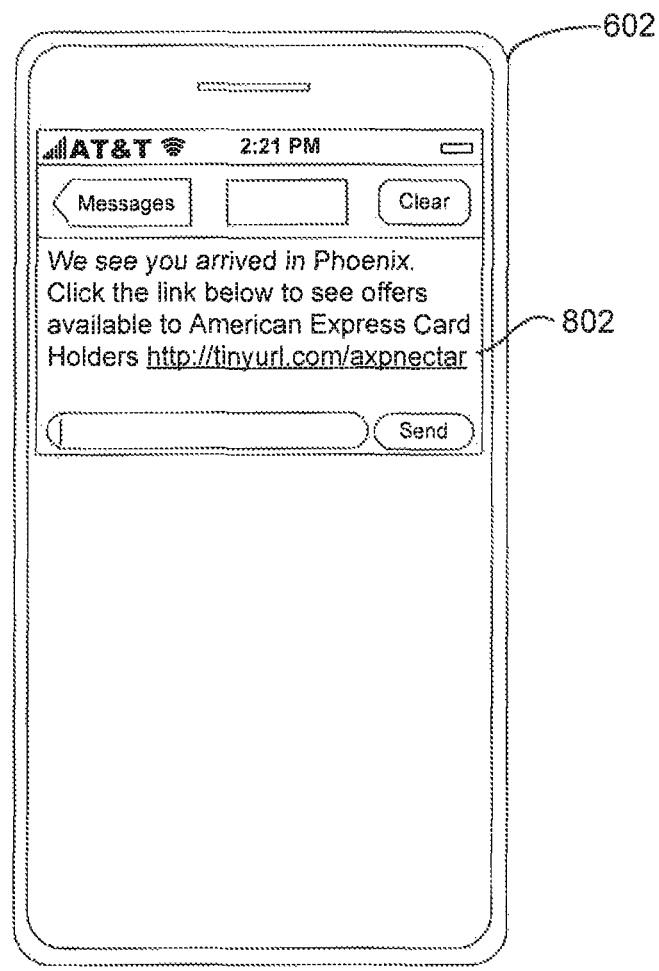
FIG. 8 shows an exemplary screenshot depicting a mobile offer link displayed on a client or mobile device, in accordance with various embodiments.
Figure 9A:
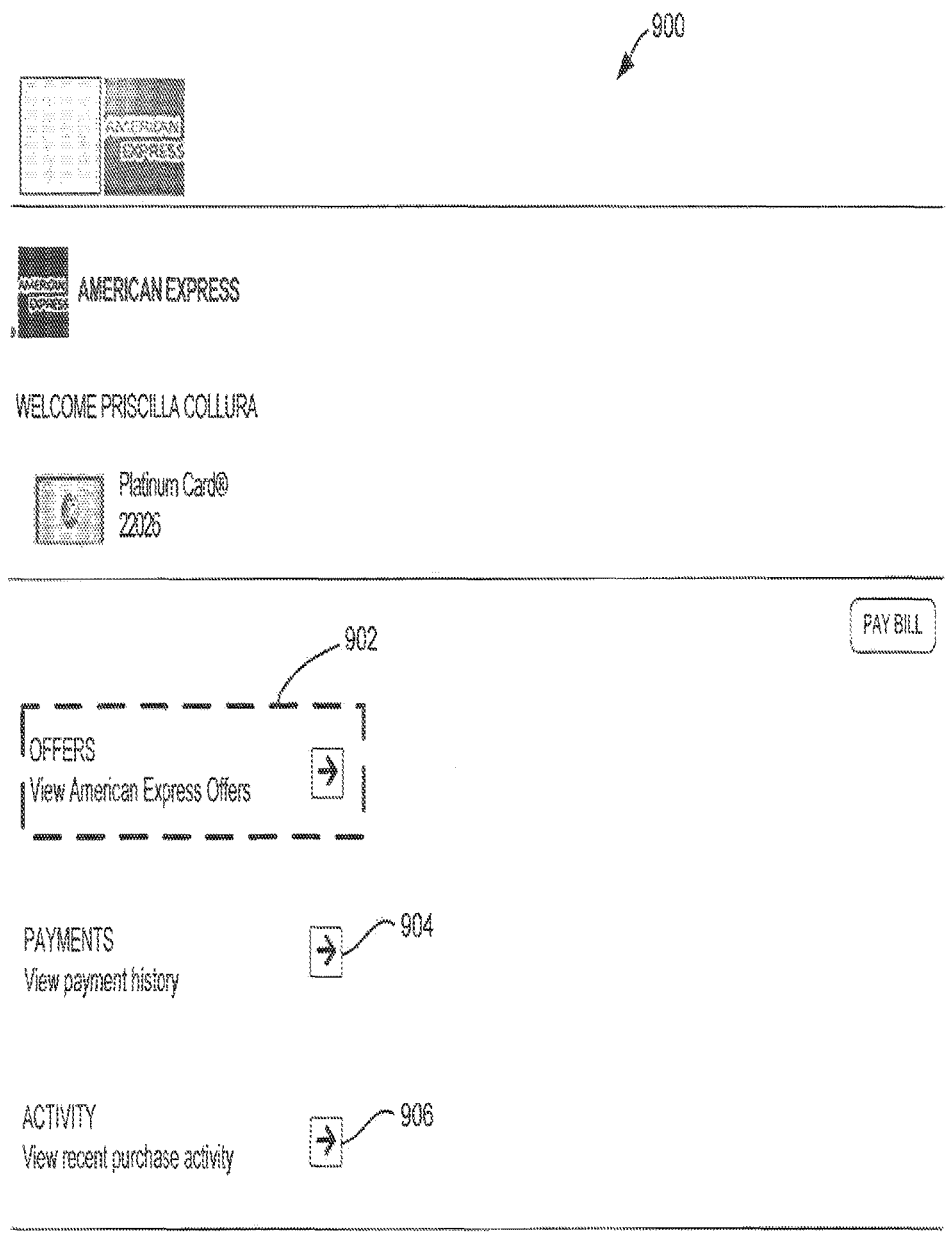
FIG. 9A shows an exemplary screenshot depicting a landing page, in accordance with various embodiments.

In various embodiments, and with reference to FIGS. 8 and 9A, a CM may receive a notification by way of her client 602 indicating that her location has been determined and that one or more offers are or may be available. A link 802 may be provided, which, if selected, may transfer the CM to a website or webpage 900 (e.g., a "landing page") or other mobile interface that displays or is configured to display one or more offers (step 704). The landing page 900 may require that the CM log into her transaction account (e.g., with a username and password) prior to displaying her offers. However, in various embodiments (not shown), it may not be necessary to select a link 802 to view offers; rather, offers may be presented directly to a CM by way of client 602. Thus, for example, client 602 might display a message like: "We see you have arrived in Phoenix. Receive 60% off your stay with the Airport Hotel Marriott." Thus, a CM may accept or further review an offer by selecting the offer (e.g., clicking on the offer) or by selecting a "button" (e.g., a button associated with a mobile interface) to indicate her interest.

Figure 9B:
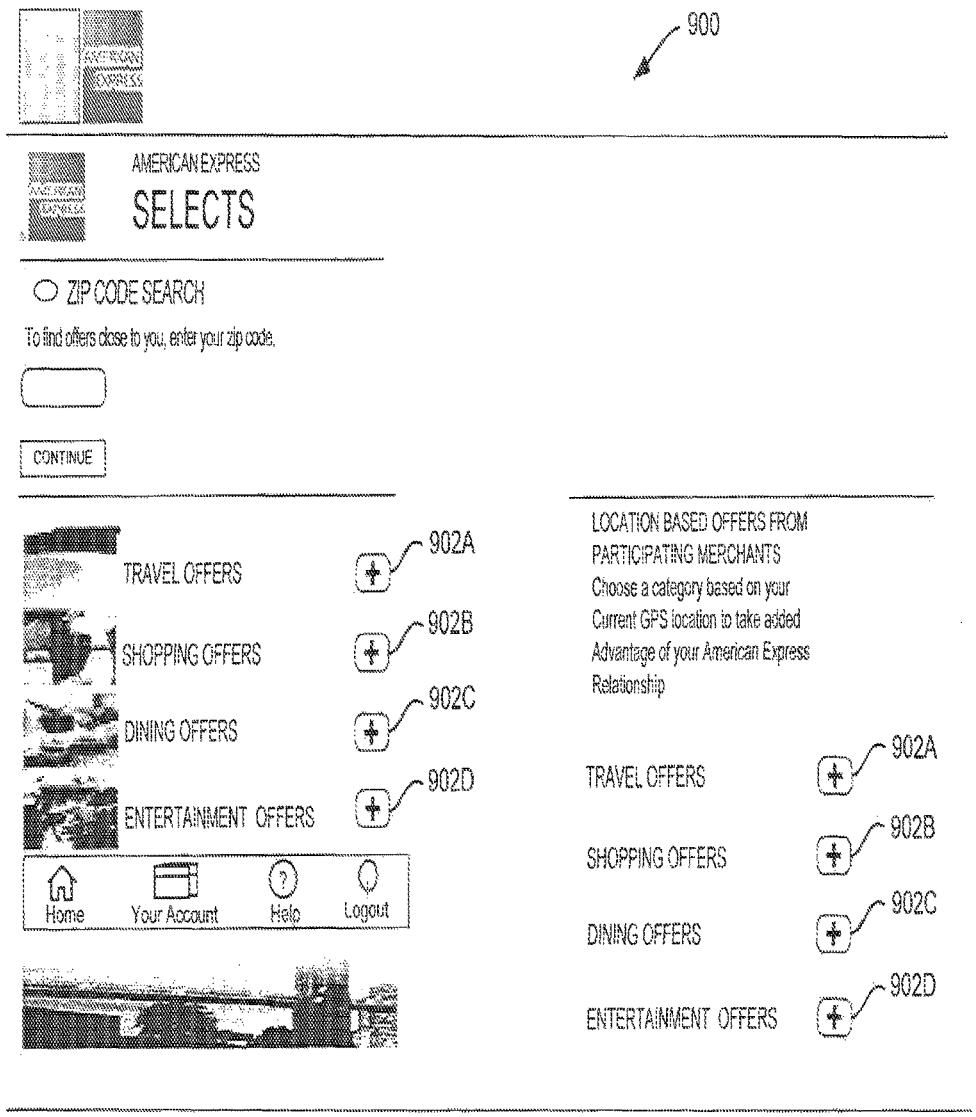
FIG. 9B shows an exemplary screenshot depicting an offer page, in accordance with various embodiments.

In various embodiments, and with continuing attention to FIG. 9A, a CM having indicated her interest in reviewing and/or receiving one or more offers, and having been transferred to a landing page 900, may choose to review her offers via link 902. A CM may also choose to review her payment history via link 904, or she may choose to review her recent purchase activity via link 906. A variety of other options may additionally appear. For instance, a user may choose to view and/or edit her account information.

Where a CM selects an offers link 902 (or otherwise indicates that she is interested in reviewing/receiving offers), the CM may be transferred to an offer page 900, as shown at FIG. 9B. An offer page 900 may comprise a variety of offer categories. For example, an offer page may comprise a travel offers category 902A, a shopping offers category 902B, a dining offers category 902C, an entertainment offers category 902D, and the like. A CM may search for one or more offers in the vicinity of her physical location by entering her zip code in an interface 510 (step 706a). Rewards system 608 may populate offer page 900 with one or more offer categories for the user based upon her zip code (step 708). For instance, rewards system 608 may locate one or more travel offers 902A, one or more shopping offers 902B, one or more dining offers 902C, one or more entertainment offers 902D, and the like, that are in the zip code or within a physical range of the zip code entered by the CM (step 708a). Likewise, a CM may search for one or more travel offers 902A, one or more shopping offers 902B, one or more dining, offers 902C, one or more entertainment offers 902D, and the like, that are in the zip code or within a physical range of the zip code entered by the CM (step 708b). The CM may select any of the offer categories 902A, 902B, 902C, and/or 902D associated with the located offers to view offers related to those offer categories and associated with merchants in the specified zip code (step 210).

In various embodiments, a CM may not be required to enter her zip code in order to receive one or more offers. Rather, the CM's client 602 may upload the CM's GPS location/coordinates to rewards system 608 (step 706b). In various embodiments, the CM's client 602 may upload to rewards system 608 a location of the CM relative to one or more cellular base stations (step 706b). In various embodiments, travel system 620 may upload itinerary data associated with the CM to rewards system 608 (step 706b). Rewards system 608 may utilize the CM's GPS location/coordinates, the CM's location relative to one or more cellular base stations, the CM's itinerary data, and/or any combination thereof to determine a location of the CM. In response to determining the location of the CM, rewards system 608 may populate offer page 900 with one or more offer categories (step 708). For instance, rewards system 608 may locate one or more items (e.g., travel offers 902A, one or more shopping offers 902B, one or more dining offers 902C, one or more entertainment offers 902D, and the like), that are offered by merchants in the vicinity of the CM or within a physical range of the CM's location. The CM may select any of the offer categories 902A, 902B, 902C, and/or 902D associated with the located offers to view offers related to those offer categories (step 210).

Figure 9C:
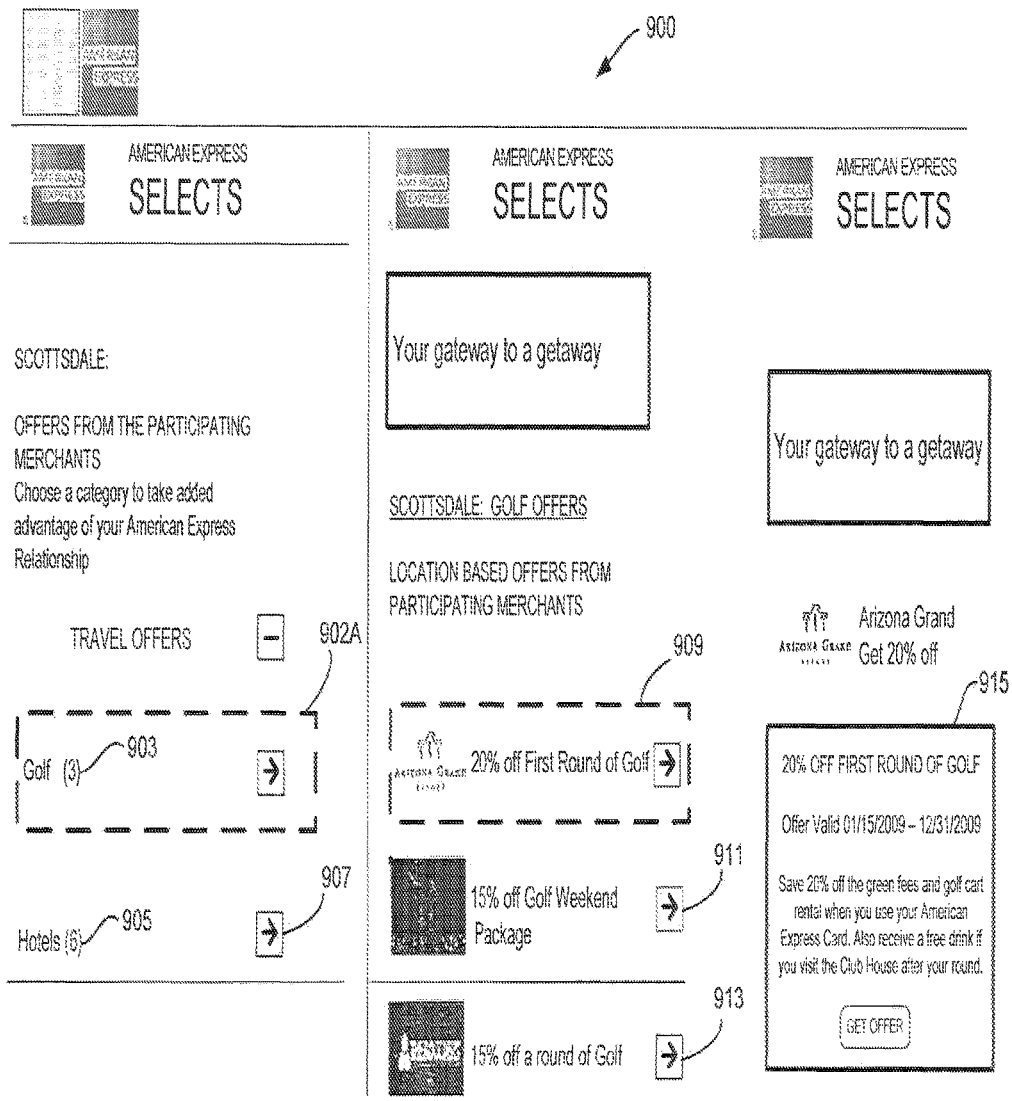
FIG. 9C shows an exemplary screenshot depicting an offer category page, in accordance with various embodiments.

Referring to FIG. 9C, a CM may be transferred to an offer category page 900 in response to a selection by the CM of an offer category—e.g., one of the offer categories 902A, 902B, 902C, and/or 902D. In the example depicted at FIG. 9C, a CM has selected the travel offers category 902A. However, any of the offer categories 902B, 902C, and/or 902D may equally be selected; and the webpage/interface details described below apply in similar fashion (with appropriate modifications for each category type).

As FIG. 9C shows, an offer category (e.g., 902A, 902B, 902C, and/or 902D) may include one or more offer classes. For example, a travel offers category 902A may include one or more travel offer classes. In various embodiments depicted at FIG. 9C, a travel offer category 902A may include a golf travel offer class 902A and a hotels travel offer class 907. Notwithstanding the example depicted at FIG. 9C, a travel offer category 902A may include a wide variety of travel offer classes. That is, a travel offer category 902A is by no means limited to a golf travel offer class 902A and a hotels travel offer class 907. In various embodiments, a number of offers associated with a travel offer class may be displayed adjacent to each travel offer class. For example, in FIG. 9C, the golf travel offers class 902A contains three golf related offers 903. Likewise, the hotels travel offers class 907 contains six hotel related offers 905.

A CM may select an offer class within an offer category based upon her interests. Each offer class may comprise a variety of offers; and a CM may select one or more offers based upon her interests (step 210). Thus, with continuing reference to FIG. 9C, and in an exemplary embodiment, a CM may select the golf travel offer class 902A. Selecting the golf travel offer class 902A may cause client 602 to display one or more of the three golf related offers 903. For example, a first golf related offer 909 may comprise an offer for 70% off a first round of golf at a first golf course. Likewise, a second golf related offer 911 may comprise an offer for 15% off a golf weekend package at a second golf course; and a third golf related offer 913 may comprise an offer for 15% off a round of golf at a third golf course. Although the exemplary embodiment shows three golf related offers 909, 911, and 913, any number of golf related offers are possible; and, of course, each travel offer class 902A,907, etc. may comprise any number of travel class related offers.

In response to a CM selecting an offer, client 602 may display offer details. For example, and with continuing attention to the example of FIG. 9C, where a CM selects golf related offer 909 (20% off a round of golf at a third golf course), a detailed message 915 may be provided explaining certain offer details. A CM may choose to receive an offer by way of a button or other interface item displayed by client 602. For example, in FIG. 9C, a CM may select a "get offer" button.

In response to selection of an offer (i.e., indication by a CM that an offer is desired), and as further described in certain of the materials herein incorporated by reference, offer registration system 606 and/or rewards system 608 may fulfill the offer for the CM (step 210). In various embodiments, offer registration system 606 and/or rewards system 608 may provide a transaction account processor's AP (accounts payable) system with information on merchant debits and credits for processing. Offer registration system 606 and/or rewards system 608 may further provide a transaction account processor's AR (accounts receivable) system with information on card member debits and credits for processing. A merchant's account is debited for a CM's rebated credit, may be further debited a service fee, and is credited a CM's discount reversal amount in the case of an eligible return. A CM's account (or monthly statement) may show a credited amount in accordance with any rebate credit and a debited amount, in accordance with any discount reversal arising from an eligible return.

The offers may be accessible by RCE 138. These offers may be based upon specific parameters which define at least one of a reward, a merchant and/or class of merchants, characteristics of a targeted CM, a predetermined qualification threshold, and the like. RCE 138 may analyze the parameters to identify intended recipients of the offers. RCE 138 may also analyze the parameters to determine characteristics for a CM population. This capability allows the merchant to quickly and inexpensively target the CM with customized marketing and/or offers. This capability also allows the merchant to provide an offer to targeted CMs before a target list is pulled.

In various embodiments, reporting 490 may be configured to deliver offers to CMs with particular behaviors and/or patterns (e.g., spending behaviors, reward usage behaviors, etc). RCE 138 may be configured to define a particular CM population based on merchant targeted marketing efforts, CM spending patterns, CM demographic data and/or the like. For example, RCE 138 may identify a CM population that spends a predetermined amount of money on electronics in a predetermined period of time. Further, RCE 138 may identify a merchant who offers electronics for purchase, but does not capture significant spending from the identified CM population. In other words, the CMs who spend a predetermined amount on electronics are not spending significant amounts on electronics with the identified merchant. RCE 138 may analyze the CM spending to compare the total amount of spending on a particular class of items (e.g., electronics). RCE 138 may also analyze such CM spending based on merchants that receive the CM spend, to determine the proportions of spending at a particular merchant, class of merchants, and/or the like. Such information may be compared to a predetermined threshold spending amount or proportions of spending at particular merchants and/or classes of merchants. The comparison allows, for example, a merchant to target CMs that do not typically spend significant amounts with a particular merchant or class of merchant, but the CMs buy the types of products and/or services offered by the merchant or class of merchants.

CM populations may be initially created based on, for example, historical data. The historical data accessible to a financial processor, such as spend level data, is leveraged using various data clustering and/or data appending techniques. The CM populations may also be created based on, for example, current spending patterns. The current spend patterns available to a financial processor (e.g., current authorized transactions, posted transactions, and the like) may be leveraged using various data clustering and/or data appending techniques. Associations may be established among entities (e.g. CMs), among merchants, and between entities and merchants. In various embodiments, RCE 138 may receive passively collected spend level data for a transaction of a plurality of CMs, aggregate the collected spend level data for a plurality of CMs, and cluster the CMs into subsets of the plurality of CMs, based on the aggregated spend level data.

The collection of the spend level data may be passive. For instance, passively collecting spend level data of a CM includes acquiring the spend level data in response to a transaction by a CM with a merchant. In various embodiments, the spend level data may be integral to information processed in a transaction for goods and/or services with a merchant. For instance, a survey and/or survey responses are not needed to capture spend level data, but such data may be used to supplement the data discussed herein. Collecting the spend level data may include acquiring the spend level data from a merchant. In various embodiments, passively collecting the spend level data of a CM includes collecting the spend level data from a transaction database. In yet another embodiment, passively collecting the spend level data includes reconciling the spend level data, transferring the spend level data to a host, organizing spend level data into a format, saving the spend level data to a memory, gathering the spend level data from the memory, and/or saving the spend level data to a database. For instance, if a CM performs a transaction (such as by using a transaction account), spend level data (such as transaction data and/or consumer account data) related to the transaction may be captured and stored in a memory, database, and/or multiple databases. Spend level data (such as transaction data and/or consumer account data) may be stored locally with the merchant, remotely by the merchant and/or transmitted to a remote host (e.g., financial processor) for storing and processing.

In various embodiments, aggregating the collected spend level data includes combining a selectable range of collected spend level data. The selectable range may be a period of time (e.g., time range) and/or from a particular geographic region. The period may be any suitable period and/or periods such as a minute, an hour, a period of hours, one day, one week, one month, a period of days, a period of months, one year, or more than one year. The periods may be consecutive or non-consecutive. In various embodiments, the selectable range may be a value, such as values of spend exceeding a pre-selected threshold. The selectable range may also include frequency, such as spend level data occurring at a particular frequency.

In various embodiments, the spend level data may be segmented by a gender of the entity (e.g., male or female), such that only data collected from merchants in transactions with men are processed by RCE 138. This data may be aggregated, clustered, assigned a weighed percentile and analyzed in accordance with the previous descriptions. Using this exemplary embodiment of the system, preferences, attributes, and inferences of a selected demographic may be obtained. In various embodiments, spend level data segmented geographically (e.g., zip code) or by other regions can reveal which regions are most compelling to a merchant and/or marketer.

Any demographic included within the characteristic data may be selected for pre-segmenting the spend level data. In various embodiments, the spend level data may be segmented by an attribute (e.g., homeowner designation), and data collected from merchants in transactions with entities that are homeowners may be processed by RCE 138. This data may be aggregated, clustered, assigned a weighed percentile and analyzed in accordance with the previous descriptions. From this procedure, a holistic picture of homeowners segmented into different clusters may be created. More than one demographic or attribute may be selected and the spend level data may be pre-segmented any suitable number of times in any suitable order. Additionally, in various embodiments, a particular demographic may be selected to be removed from the larger set of all available spend level data. For instance, the spend level data of very high income entities may be selected for removal and data collected from merchants in transactions with very high income entities may be excluded from processing by RCE 138. The remaining data may be aggregated, clustered, assigned a weighed percentile and analyzed in accordance with the previous descriptions. Using this embodiment, outliers may be removed from the results. Additional details regarding combining CMs into populations are disclosed in, for example, U.S. application Ser. No. 12/690,669, entitled "System And Method For Clustering a Population Using Spend level Data" and filed on Jan. 20, 2010, which is hereby incorporated by reference in its entirety.

The CM populations may be established based on historical data or on current spending patterns, as discussed above, and in various embodiments are modified based on current spending habits. For example, spend level data may be actively captured and used to modify CM populations. As CM spending habits change, the groups are modified to provide greater accuracy for delivering rewards, merchant offers and the like. For example, a CM may be placed in a population of CMs whose spend level data suggests that they attend public entertainment events (e.g. movies, concerts, and the like). As time passes, the system may analyze a shift in the spend level data which suggests that the CM (possibly due to a having a new baby) attends less public entertainment events and spends more for home entertainment items, such as for example, home electronics equipment. In response to the shift in spend level data, RCE 138 may associate the CM with a new CM population which receives rewards offers for electronics. Further, RCE 138 may also remove a CM from a particular CM population based on current spend level data, wherein the CM was originally placed in a CM population based on historical spend level data, but no longer exhibits spending behavior consistent with the historical spend level data.

In various embodiments, in response to the determination that the CM population is spending on electronics, but not with a particular identified merchant, reporting 490 may send the CM population a reward offer from the identified merchant. The rewards offer may be designed to encourage the CM population to buy electronics from the identified merchant, with whom the CM population had not previously conducted significant business.

The terms of a rewards offer may define a trigger event, such as a threshold spending amount at a particular merchant or class of merchants, or for a class of items. The reward offer may be provided electronically to the CM population based on a trigger event (e.g., in real time). A trigger event may be any action identified by the merchant or the account issuer. The trigger event may be based on spend data, geographic region spend, CM population size, time of year, or any other event. The event may be identified by the merchant, CM and/or account issuer. For example, the trigger event may be based on spend data. In response to a CM population reaching a predetermined spend level on a class of products (e.g. electronics), the rewards offer may be sent to the CM population via e-mail. Similarly, the trigger event may be based on a CM population size. In response to the CM population reaching a predetermined level, a rewards offer is sent to the CM population. In another example, the merchant and a product supplier or manufacturer may create a joint offer, which provides a reward offer if a CM buys a particular item (e.g. a particular model laptop computer) or class of items (e.g. any Sony® television).

In various embodiments, a merchant may wish to market rewards offers to CM populations based on CMs spending at other merchants. For example, a merchant that sells home improvement items (e.g. Home Depot) may wish to market its products and services to a CM population that spends a predetermined amount on electronics. The merchant may formulate a set of criteria to develop a CM population based on spend data for electronics purchases (e.g. televisions) and/or spend data at particular electronics merchants (e.g. Best Buy). Thereafter, rewards offers from the merchant are provided to the CM population in response to a trigger event.

In various embodiments, the identified merchant offer is provided in conjunction with an existing rewards program. For example, the CM may be eligible for a reward based on the CM's pre-existing participation in a rewards program. The reward offer is provided in addition to the existing reward. For example, a CM is provided with a credit based on a particular transaction at a particular merchant. The transaction may also result in the CM becoming a member of a particular CM population that is provided with a rewards offer (e.g. an additional discount with the identified merchant based on the loyal spending behavior). As such, the CM receives the pre-existing reward and the reward offer based on the CM becoming a member of a CM population.

In various embodiments, a CM is automatically enrolled in a program to receive e-mail rewards based on criteria determined by a merchant or account issuer. In various embodiments, a CM may be invited to join a CM population that is eligible to receive rewards offers. The CM may receive a notification which indicates that the CM is eligible to receive rewards offers. The notification may provide for an opt-out period during which the CM can request that the CM is not sent the rewards offers based on the CM's inclusion in a CM population. The notification may also provide that the CM register to receive the rewards offers by taking some affirmative action, such as for example, registering the CM's account via a webpage and/or contacting the account issuer and requesting to be included in the CM population associated with the rewards offers.

RCE 138 may be configured to administer rewards associated with a prepaid transaction account. Such configuration may occur directly or via API's that are included in RCP 130. The prepaid transaction account may comprise embedded rewards, including for example, credits to the prepaid transaction account, merchant specific rewards (e.g. merchant gift cards), discounts, and the like. The rewards may be customized by a merchant. The rewards may be offered in conjunction the pre-paid transaction cards (e.g. American Express Gift Cards, Home Depot Gift Card). Offers may be customized by an individual merchant or a group of merchants. This ability to customize offers allows local and regional merchants to offer rewards to customers that were previously unavailable because of the cost and complexity of administering a rewards program. Further, providing rewards with a prepaid transaction account allows those who are not credit card users to participate in rewards programs traditionally reserved for credit card account holders.

In various embodiments, a prepaid transaction account has an embedded reward which is configured by an offering merchant. For example, a merchant may configure a reward which provides a credit on purchases of certain products and/or services (e.g. dry cleaning services) at the merchant or within a group of cooperating merchants. The reward may also be based on transactions conducted in a geographic or other region. In various embodiments, the reward may be limited or restricted for use in a similar or other geographic region. The rewards may be offered through a prepaid account, such as a prepaid transaction card, available for purchase through the offering merchant. The prepaid transaction account may be used with any merchant who accepts transaction accounts from the account issuer associated with the prepaid transaction card. Further, the prepaid transaction account may be configured with pre-determined reward criteria from the offering merchant. For example, when seventy percent of the total value of the prepaid card is spent with the offering merchant, a reward is issued. The reward may be issued in the form of a credit to the prepaid transaction account, or may be provided in some other fashion (e.g. another gift card from the offering merchant).

In various embodiments, participation in the rewards program associated with the prepaid transaction account may be automatic or may require registration. Registration may be provided by accessing a webpage and providing identifying information. Registration may also be achieved by contacting an account issuer and requesting that a particular prepaid transaction account be associated with a rewards program.

In various embodiments, any prepaid transaction account associated with an account issuer may participate in any rewards program offered by the account issuer. The transaction account may be registered with the account issuer for a particular rewards program selected by a prepaid transaction account owner. Where the activities associated with the transaction account conform to the rules governing the rewards program, a reward is provided to the prepaid transaction account owner.

While many of the example discussed above disclose systems where a merchant sponsors an offer associated with a spend level at the particular merchant, the system is also suitable configured to offer discounts at the product level. A product level discount facilitated by a financial institution, separate from a merchant, is capable of helping move specific inventory. The inventory may be targeted for the discount due to a variety of factors, including approaching a limited shelf-life or making room for a replacement product. Furthermore, the discount may be greater than average if a supplier is able to limit to a specific product and/or merchant. In various embodiments, a supplier and a financial institution may partner to offer a discount for a product at a first retailer but not offer that same discount at a second retailer.

Figure 10:
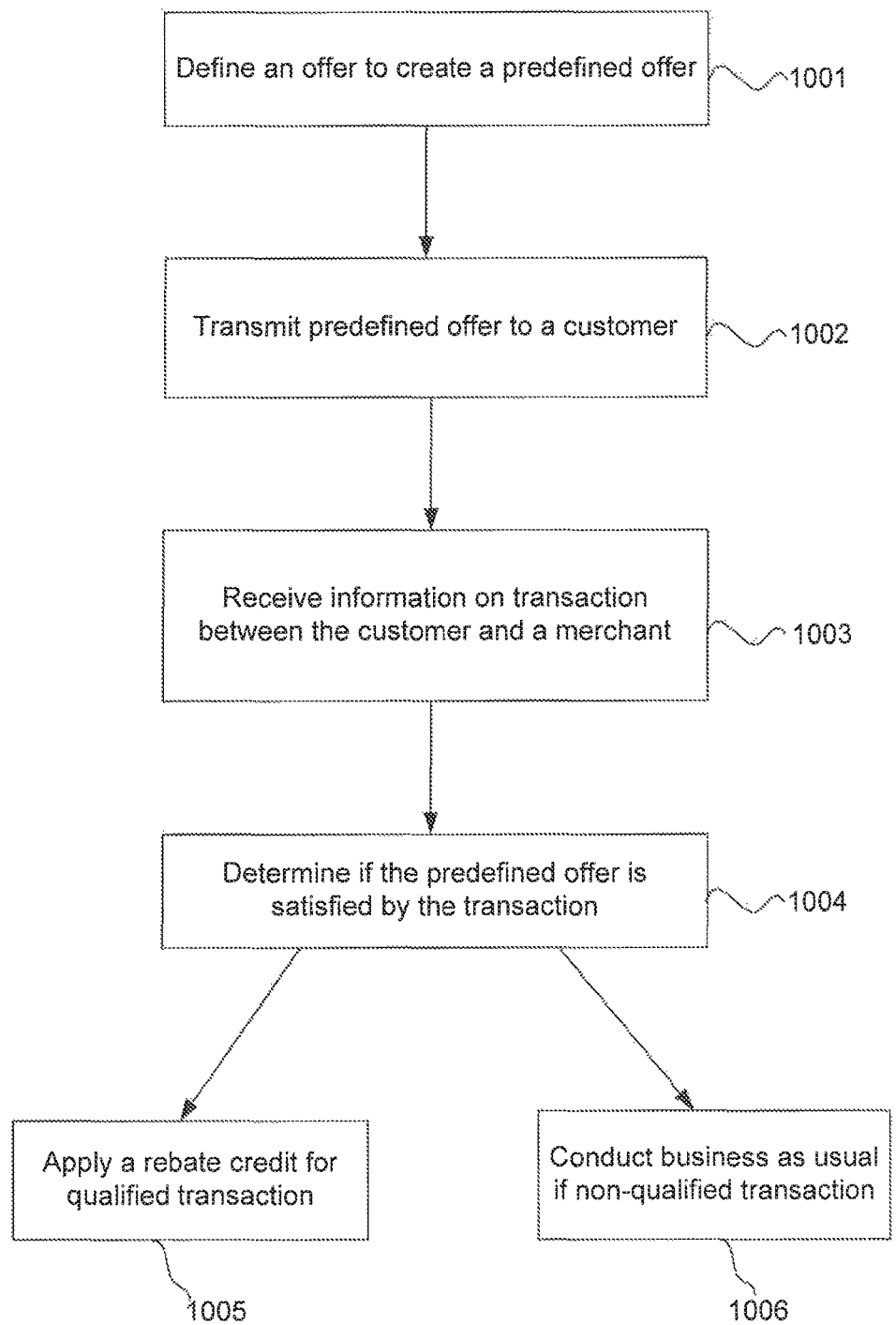
FIG. 10 includes a flow chart illustrating a process of a financial institution for managing a product-level discount, in various embodiments.

In various embodiments and with reference to FIG. 10, a product level discount may be managed (e.g., by a computer based system) during a transaction. The computer based system may be operated by a financial institution or a third party entity. The computer based system may define an offer to create a predefined offer 1001. Furthermore, the predefined offer may be transmitted, by the computer based system, to a customer 1002. In various embodiments, computer based system be configured to receive information about the transaction between the customer and a merchant. The computer based system may receive a transaction identifier associated with a transaction, where the transaction identifier comprises a transaction value, a customer account identifier, a merchant identifier, and/or a product identifier. The product identifier may be assessed 1004, by the computer based system, to determine whether the transaction qualifies for a rebate credit in accordance with a predetermined offer. Furthermore, a value of a rebate credit is determined based on the transaction information and/or the predetermined offer. The rebate credit may be applied to a qualified transaction 1005, or the transaction may proceed under business as usual standards in a non-qualified transaction 1006.

In an exemplary embodiment, the computer based system for managing a product level discount comprises a network interface communicating with a memory, where the memory communicates with a processor for managing a product level discount, and the processor, when executing a computer program, is configured to receive, by the processor, the transaction identifier associated with a transaction, assess the product identifier to determine whether the transaction qualifies for the rebate credit in accordance with the predetermined offer, and determine the value of the rebate credit.

The predefined offer for the rebate credit can be established by various parties. For example, the predefined offer may be established by a transaction account issuer, a loyalty account issuer, a financial institution, a supplier, or a vendor. Furthermore, the predefined offer may be established by agreement of more than one party. The predefined offer may identify a transaction associated with an everyday purchase as an eligible transaction. The predefined offer may be associated with a specialty product or specific event.

Figure 11:
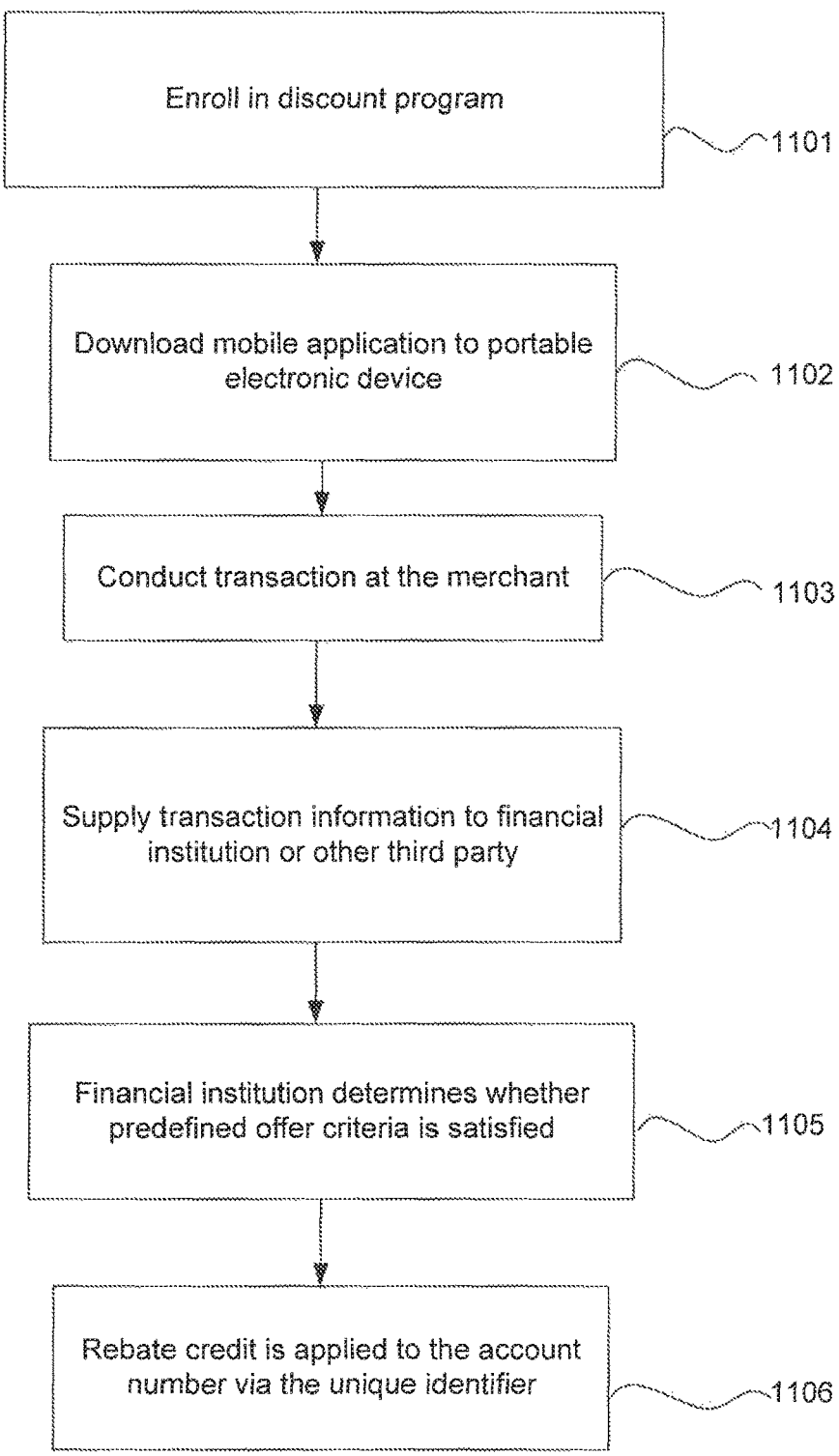
FIG. 11 includes a flow chart illustrating a process of a user in a product-level discount system, in various embodiments.

The predefined offer may be sent to the user associated with the customer account identifier to incentivize completion of the transaction. A user, or customer in this case, can receive the predefined offer in a variety of ways. For example, the customer can receive the predefined offer on a portable electronic device. In various embodiments and with reference to FIG. 11, a user may enroll in a discount program 1101 and provide such information like an account code and a unique identifier. Furthermore, the user may download a mobile application to the portable electronic device 1102. The user could be directly contacted with the predefined offer by one or more of email, a direct mailing, a communication to a phone, such as a text message, or by referral to a website. Moreover, in various embodiments, the customer account identifier may include a unique identifier associated with the portable electronic device. The unique identifier associated with the portable electronic device may be used to match the transaction to the customer account identifier. The unique identifier may be, for example, a phone number associated with the portable electronic device. A user conducts a transaction at a merchant 1103, and then transaction information is transmitted to a financial institution or a third party 1104. As previously described, the financial institution determines whether the predefined offer is satisfied by the transaction 1105. If it is a qualified transaction, the rebate credit may be applied to the account code associated with the unique identifier 1106.

The determination of which people to receive the predefined offer can be based at least in part on the transaction history of the user. Specifically, the qualification for the rebate credit may be based at least in part on an aggregate transaction history of the user associated with the customer account identifier. Also, the qualification for the rebate credit may be based at least in part on the product identifier corresponding to at least one of a particular product or a vendor.

In various embodiments, a product level discount may be facilitated by a point-of-sale (POS) terminal, during a transaction. The POS terminal may receive transaction information from at least one of a merchant and a customer, generate a transaction identifier, wherein the transaction identifier comprises a transaction value, a customer account identifier, a merchant identifier, and a product identifier. The POS terminal transmits the transaction identifier to a computer based system for managing a product level discount, where the computer based system determines whether a transaction qualifies for a rebate credit in accordance with a predefined offer based on at least the product identifier. In an exemplary embodiment, a point-of-sale terminal comprises a network interface communicating with a memory, the memory communicating with a processor for managing a product level discount, and the processor, when executing a computer program, is configured to receive, at the POS terminal, transaction information from at least one of a merchant and a customer, generate a transaction identifier, and transmit the transaction identifier to a computer based system for managing a product level discount, where the computer based system determines whether a transaction qualifies for a rebate credit in accordance with a discount offer based on the product identifier.

Furthermore, in various embodiments, the POS terminal provides the status of the transaction to the computer based system, where the computer based system applies the rebate credit to a customer account associated with the customer identifier after the completion of the transaction. The status of the transaction may be completed, pending, or cancelled. Moreover, in various embodiments, the merchant may not be informed of the application of the rebate credit to the customer account. In various embodiments, the rebate credit may be applied by the POS terminal to the transaction, and a request made by the POS terminal for authorization of the transaction after applying the rebate credit.

The transaction process involves two general aspects; authorization of the transaction and determination of a product discount qualification. The authorization of a transaction is a well known process and will not be discussed in detail. The product discount qualification involves communicating the product identifier, such as a stock-keeping unit (SKU) code from a merchant to a computer based system, where the SKU-level data includes a routing indicator. The routing indicator may be used to separate the merchant communication into at least two data blocks, where the SKU-level data block is transmitted to a SKU database. A SKU code is a product identifier that uniquely identifies a particular product manufactured by a specific vendor. The product identifier may also include a transaction amount, a card member identifier, the SKU code, a SKU indicator, a merchant identifier, and/or country of transaction origin.

The product identifier may be communicated to the computer based system in multiple ways. In a first embodiment, the product identifier is received from a merchant where the transaction originated. The merchant may send the information via a batch file after a period of time, or on an individual transaction basis using the internet or other electronic communication connection. In a second embodiment, the product identifier is received from a customer by way of a transaction receipt. The customer may download a smartphone application capable of scanning the transaction receipt (e.g., a barcode on the receipt or a photo of the receipt) and transmit this information to the computer based system.

As previously mentioned, the product level discount management, in various embodiments, may include determining whether the transaction qualifies for the rebate credit based on at least one of the customer account identifier and the merchant identifier. Furthermore, the product level discount management may also include verifying, by the computer based system, that the transaction has been completed, and applying the rebate credit to a customer account associated with the customer identifier after completion of the transaction. The product identifier could be a stock-keeping unit (SKU) code. The SKU code may be the basis for qualifying for the rebate credit. Furthermore, a merchant associated with the merchant identifier, which is part of the transaction, does not need to be informed of the application of the rebate credit to the customer account. From the viewpoint of a merchant, a product level discount may be applied post-transaction and the merchant may have no knowledge of the applied discount. In various embodiments, the product level discount management may include applying the rebate credit to the transaction at the point of sale, and determining authorization of the transaction after the applying the rebate credit. In this respect, if a customer has a transaction value limit, the transaction may be authorized after application of the rebate credit but not without the rebate credit.

The product level discount, in various embodiments, may include determining whether the transaction qualifies for the rebate credit based on at least one of the customer account identifier and the merchant identifier. Furthermore, the product level discount may also include crediting, at the POS terminal, the rebate credit to the transaction value and completing the transaction.

In various embodiments having the discount applied post-transaction, verification of several factors may occur before the appropriate discount level is applied. In various embodiments, implementation of the product-level discount involves little effort on the part of a merchant. The merchant provides the transaction information, such as via a point-of-sale terminal, where the transaction information includes the transaction identifier as previously defined. The merchant can opt-in to participate in third-party product level discounts and have minimal requirements to facilitate such a program. A software update to the POS terminal will often be the only change needed at the merchant. The software update allows the POS terminal to generate and communicate the transaction identifier. A financial institution, or any third-party establishing the predefined offer, receives the transaction identifier. As stated herein, the transaction identifier includes a customer account identifier. The customer account identifier may be used to retrieve customer information from a database, where the customer information may be part of the discount qualification determination. Such customer information may include geographic location, account history, prior purchase information (both product and merchant-based), account status, prior transaction values, loyalty account information, and the like.

Figure 12A:
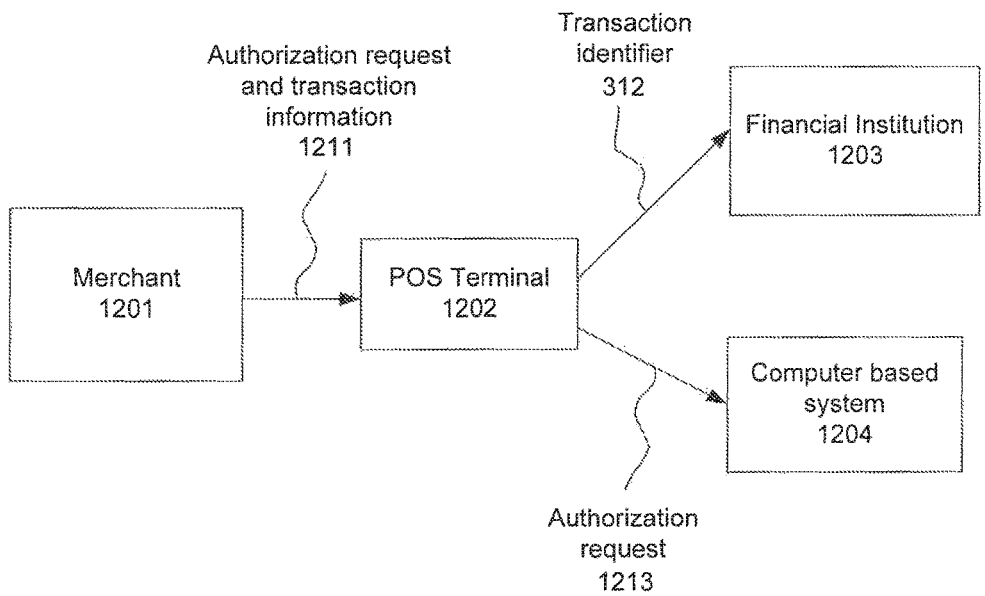
FIG. 12A-12B includes flow charts illustrating an exemplary process for transmitting transaction information in a product-level discount management system, in accordance with various embodiments.
Figure 12B:
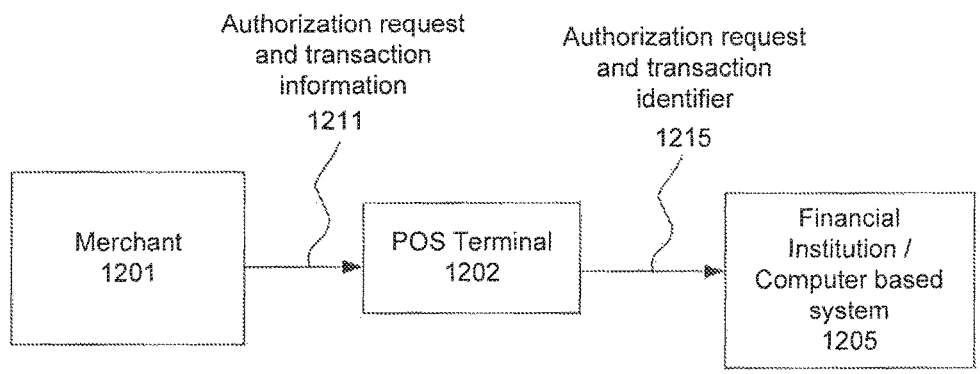

In addition, the POS terminal may also transmit the transaction identifier to a financial institution, where the financial institution is separate from the computer based system. As illustrated in FIG. 12A, a merchant 1201 communicates an authorization request and transaction information 1211 to a POS terminal 1202. The POS terminal 1202 forms a transaction identifier and transmits the transaction identifier 1212 to a financial institution 1203. The financial institution 1203 receives transaction identifier 1212 and separates a product identifier into a product database. A computer based system 1204 receives the authorization request 1213 from POS terminal 1202. In various embodiments and with reference to FIG. 12B, is similar to the prior embodiment, except the computer based system 1205 is the same as the financial institution. The financial institution

1205 is configured, upon receipt of the transaction identifier 1212, to separate a product identifier from the transaction identifier. The financial institution 1205 then authorizes the transaction and determines whether the predefined offer is satisfied by the transaction. The financial institution matches the product information and/or the customer information with the merchant or manufacturer offers.

Furthermore, a SKU matching process comprises receiving SKU data from the merchant (POS terminal) and receiving the predefined offer, which is a compilation of the eligible record of charges. The SKU data and the predefined offer are then compared and matching records extracted to aid in the qualification determination. If a discount qualification is determined, the qualifying transaction notice is communicated to an internal discount process.

A product level discount management for use in a telecommunications network may also interface with the embodiments herein. In particular, such a system includes a mobile communication device configured to communicate over a wireless telecommunication network, a telecommunication service provider configured to facilitate a connection to the wireless telecommunication network, a rewards management system, a financial institution, and a communication network providing communication between the telecommunication service provider, the rewards management system, and the financial institution. The rewards management system includes a loyalty program configured to track activities which generate loyalty benefits, store the loyalty benefits, and determine a monetary value associated with the loyalty benefits and a loyalty program middleware which facilitates communication of the loyalty program with a financial institution such that the loyalty benefit can be used to satisfy obligations associated with a transaction account issued by the financial institution on the connection.

A product level discount management for a peer-to-peer transaction may also interface with the embodiments herein. In particular, such a system includes first and second personal communication devices configured to participate in a peer-to-peer transaction, a rewards management system, and a communication network providing two-way communication between one of said personal communication devices and the rewards management system. The rewards management system includes a loyalty program configured to track activities which generate loyalty benefits, store the loyalty benefits, and determine a monetary value associated with the loyalty benefits and a loyalty program middleware which facilitates communication of the loyalty program with a financial institution such that the loyalty benefit can be used to satisfy obligations associated with a transaction account issued by the financial institution.

Cancellations 440 of registered accounts by enrolled CMs are communicated to loyalty program provider 460 as well as to enrollment 120 so as to maintain enrollee database 134 with up-to-date enrolled CM information. Cancellations 440 may arise, for example, from a CM reporting a lost or stolen card or a CM requesting TAP to deregister one or more of its registered cards from the registered card program. In various embodiments, enrollee database 134 may be provided with timely and consistent updates to reflect lost and stolen cards. Cancellations 440 may also include deregistration of a CM from one or more particular marketing programs administered by TAP or LPP 460.

Further description will now be provided with respect to solicitation 110 and enrollment 120. As noted above with reference to FIG. 2, CM may be solicited to join an incentive program offered by TAP via an email invitation from LPP 460. In this instance, a CM may receive a solicitation email providing a link to a loyalty program's website landing page, whereby the CM may begin an enrollment process. The enrollment may include, for example, the steps of agreeing to the incentive program's terms and conditions, setting up a username and password and selecting marketing preferences, etc. Moreover, such an incentive program website may be hosted by LPP 460 and branded by TAP. As such, the enrollment process may further include providing TAP with the CM's email address, such as when the account holder clicks on the link of the solicitation email to start the enrollment process. TAP may use CM's email address to validate the CM prior to enrollment 120 via validation process 410. Further, the incentive program's website may provide registered CMs with a customized home page where they may be presented with personalized offers (such as those identified based on their selected marketing preferences), as well as being able to engage in online shopping of goods and services offered by merchants participating in the particular marketing program(s) in which the account holder enrolls. If a CM receives an email solicitation but is already enrolled in TAP's registered card program, then by clicking on the link provided in the solicitation email, the already enrolled CM may be prompted to log in to their customized homepage. As noted above, a CM may be solicited indirectly simply by being provided with access to a website link to the enrollment webpage and/or TAP's enrollment webpage for the registered card program. Further, enrollment in TAP's registered card program via a TAP-hosted website link may allow for enrollment in TAP's marketing programs as well as a marketing program offered in collaboration with one or more loyalty program providers.

Solicitation 110 may further include a pre-solicitation process prior to sending a solicitation email to a targeted CM. The pre-solicitation process may involve determining which CMs should be targeted and which offer clusters and particular marketing programs the CM may be eligible to participate in pursuant to the registered card program. Accordingly, TAP may collaborate with LPP 460 to identify appropriate CMs for email solicitation based on TAP's data on a CM's spending preferences and the LPP's clusters of merchant offers. These identified, targeted CMs may then reviewed so as to exclude solicitation of any targeted CMs having opted out of receiving direct marketing materials from TAP or LPP 460. TAP then provides LPP 460 with a marketing list of targeted CMs and associated identifying information (such as salutation, name, gender, and zip code). The marketing list may further be provided to LPP 460 with a given effective period during which solicitation emails may be sent, since the list should be updated periodically to exclude CMs from the list that have since opted out of receiving marketing materials. Upon receipt of the marketing list from TAP, loyalty program provider sends out email invitations to the targeted CMs.

Enrollment 120 may provide an option to the CM to participate in the registered card program as a preferred enrollee. For example, during enrollment an account holder may choose to be eligible for "premium" offers in exchange for paying an enrollment fee. Alternatively, the CM may wish to forego payment of any enrollment fee and be eligible for "everyday" offers. Preferred (i.e., premium) customers may also be eligible for everyday offers. TAP's registered card program may therefore offer tiers of offer packages corresponding to the "premium" and "everyday" tiers of enrolled account holders. Accordingly, RCE 138, during transaction matching, may consider whether an enrolled CM is registered as a premium account holder or an everyday account holder so as to identify CM purchases that qualify for a premium offer and/or an everyday offer.

Figure 13:
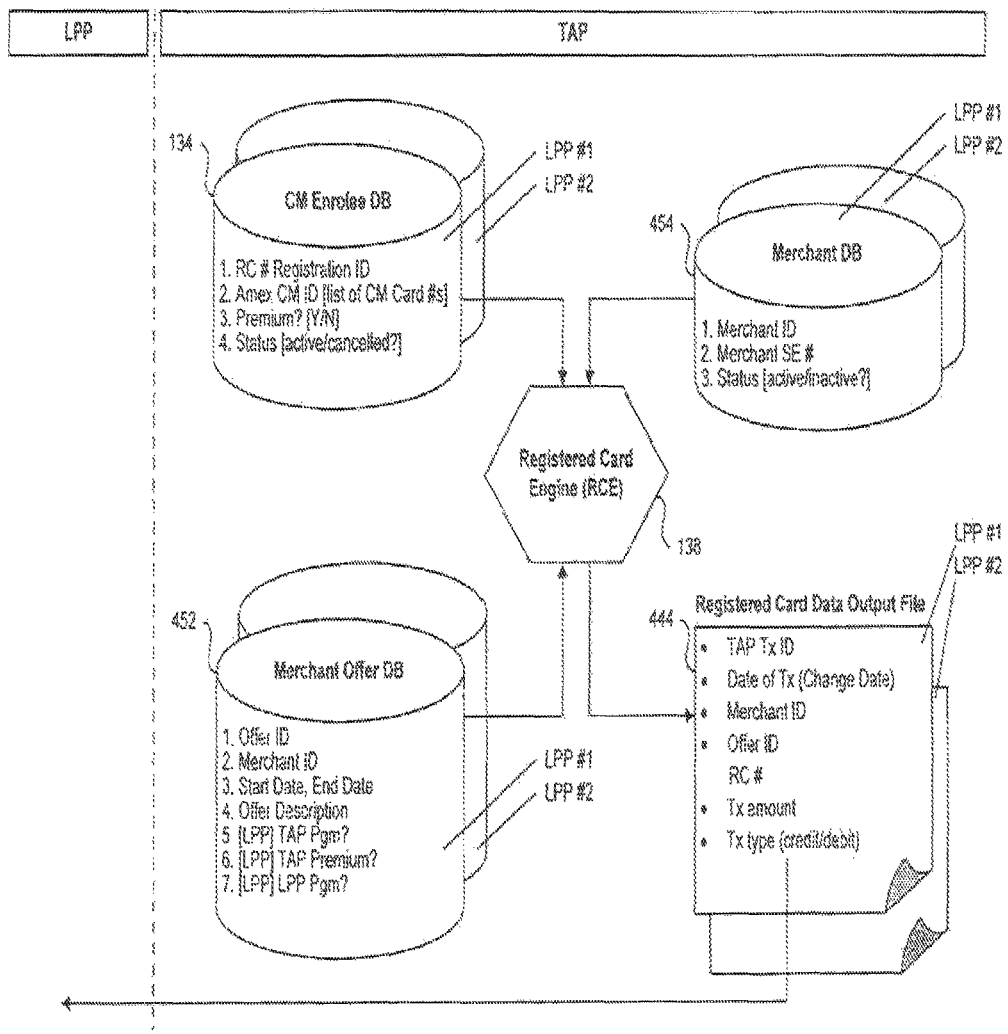
FIG. 13 is a high level flow diagram showing data flow of account holder customer information and participating merchant information for transaction matching, in accordance with various embodiments.

An embodiment, the TAP collaborates with loyalty program provider 460 will now be described in greater detail with reference to FIGS. 13 through 16. FIG. 13 illustrates transaction-based data flow between databases at TAP during transaction matching by RCE 138. As shown, CM enrollee database 134 may include such data as a CM's registration identification (RCnumber ID) for one or more registered transaction cards linked together in accordance with linking step 416, described above; a list of account numbers for these linked cards; indication of whether the CM is a premium account holder; and whether the CM and/or their registered transaction card(s) are active or canceled pursuant to cancellations 440 (shown in FIG. 4). A second enrollee database (i.e., database identified as "LPP-number 2") and other additional enrollee databases may be provided for enrollees of each distinct loyalty program or program provider. Alternatively, a single enrollee database 134 may be provided for all enrollees of the registered card program, with another data field provided which identifies the one or more loyalty program providers the CM is associated with. Likewise, separate merchant database may be provided for each loyalty program or program provider, or a single database may be provided with a data field identifying the merchant with the program(s) or provider(s). Merchant database 454 may include a merchant ID, its SE number, as well as whether the merchant is actively or inactively enrolled in the registered card program.

Merchant offer database 452 may include an offer ID, a corresponding merchant ID, a start and end date for the particular offer, a description, and whether the offer is a premium offer, as described above. Since TAP and LPP may each administer marketing programs, and since there may be multiple loyalty program providers, merchant offer database 452 may also include a field identifying each TAP or LPP marketing program to which the offer belongs. FIG. 13 also shows exemplary data contained in output file 444 provided to the loyalty program provider(s) for discount calculation (or discount reversal calculation, in the case of return), as described above with reference to FIG. 4. In this figure, "Tx" represents the term "transaction." As shown, output file 444 includes: transaction ID, transaction date, merchant ID and offer ID, account holder's registration identification (RCnumber), transaction amount, as well as whether the transaction type is a credit (return) or a debit (purchase).

In this embodiment, output file 444 includes CM's RCnumber as a substitute for the CM's actual transaction account number. Output file 444 is provided to LPP for discount calculation, and the level of security associated with LPP's network may prohibit allowing LPP using the actual account number as a means to identify the transaction for discount calculation. However, it should be understood that for internally calculated discounts 432 (described in FIG. 4) or in instance where secure networks exists with the loyalty program provider(s), then output file may contain the particular transaction account number associated with the transaction. As such, the discount calculated by LPP may be directly matched with the card number and may also be provided on the statement for a secondary card, rather than appearing on the statement of the primary card, which may occur when several linked cards are associated with CM's registration identification (RCnumber).

Figure 15:
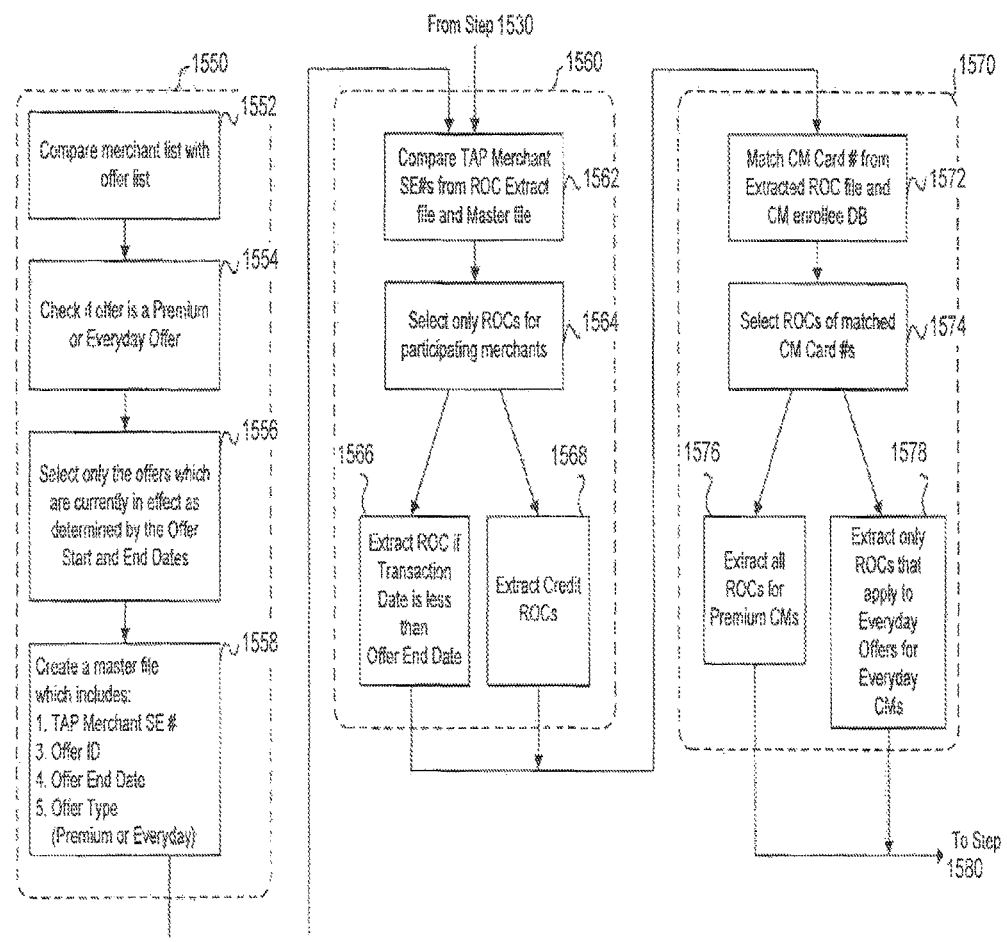
FIG. 15 is a flow diagram illustrating the processes associated with individual steps shown in FIG. 14.
Figure 16:
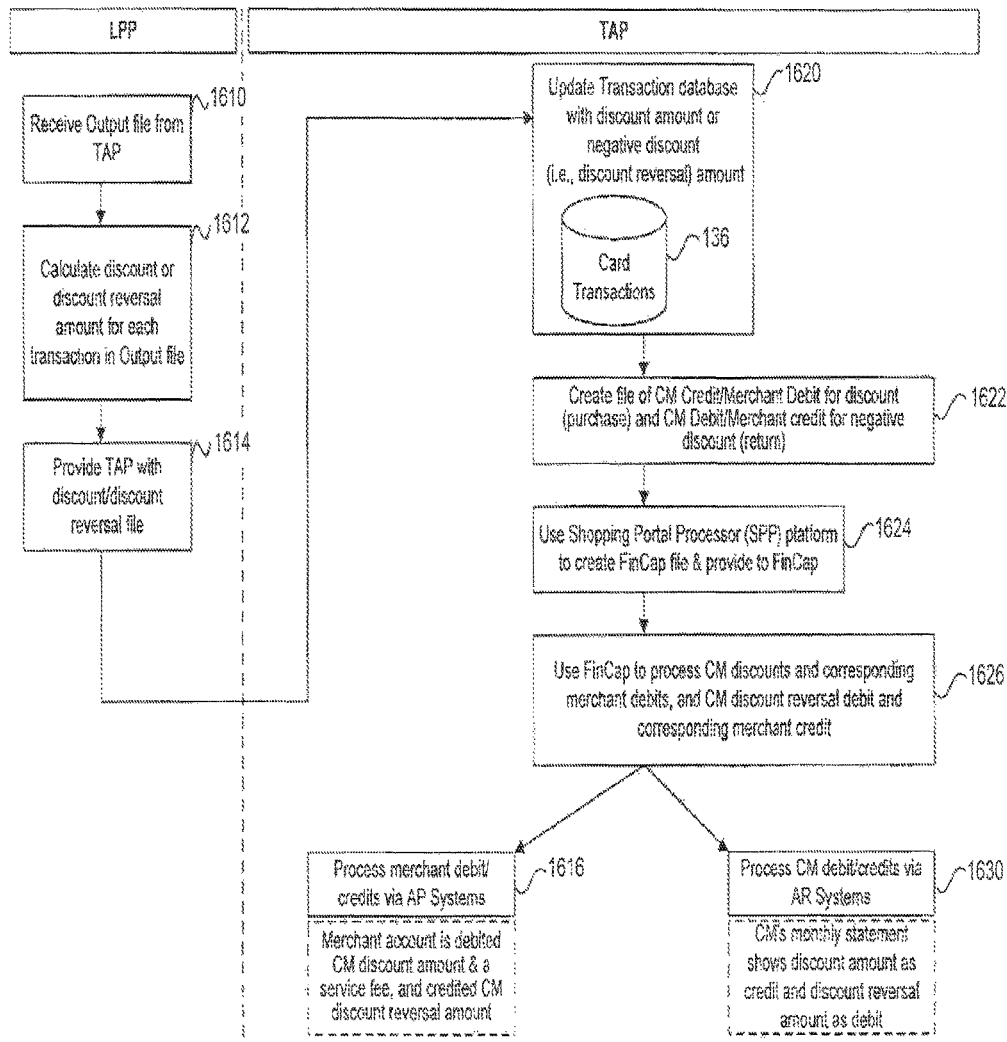
FIG. 16 is a flow diagram of transaction based data flow between a third party loyalty program provider and a transaction account provider, in accordance with various embodiments.

FIGS. 6 and 7 show in greater detail the process of transaction matching by RCE 138 when a registered CM shops at a participating merchant. FIG. 16 shows in detail an embodiment of a process for calculation (via LPP) of CM discount credits and discount reversal debits and their subsequent processing so as to appear on CM and merchant statements. The processes of FIGS. 15 through 16 are shown to incorporate both CM purchases and their returns. Accordingly, the output file provided to LPP and an input file from LPP to TAP (as shown and later described in step 1614 in FIG. 16), as well as creation of a file of merchant credit-debit and account holder credit/debit (as shown in step 1622 of FIG. 16), are described to include information relating to both purchases and returns. It should be understood, however, that individual files at the noted steps may be provided, one for processing of discounts for purchases and another for processing discount reversals for returns. Further description of methodologies for identifying whether a return is on a purchase for which a CM received a discount will be described with reference to FIGS. 19 and 20.

Figure 14:
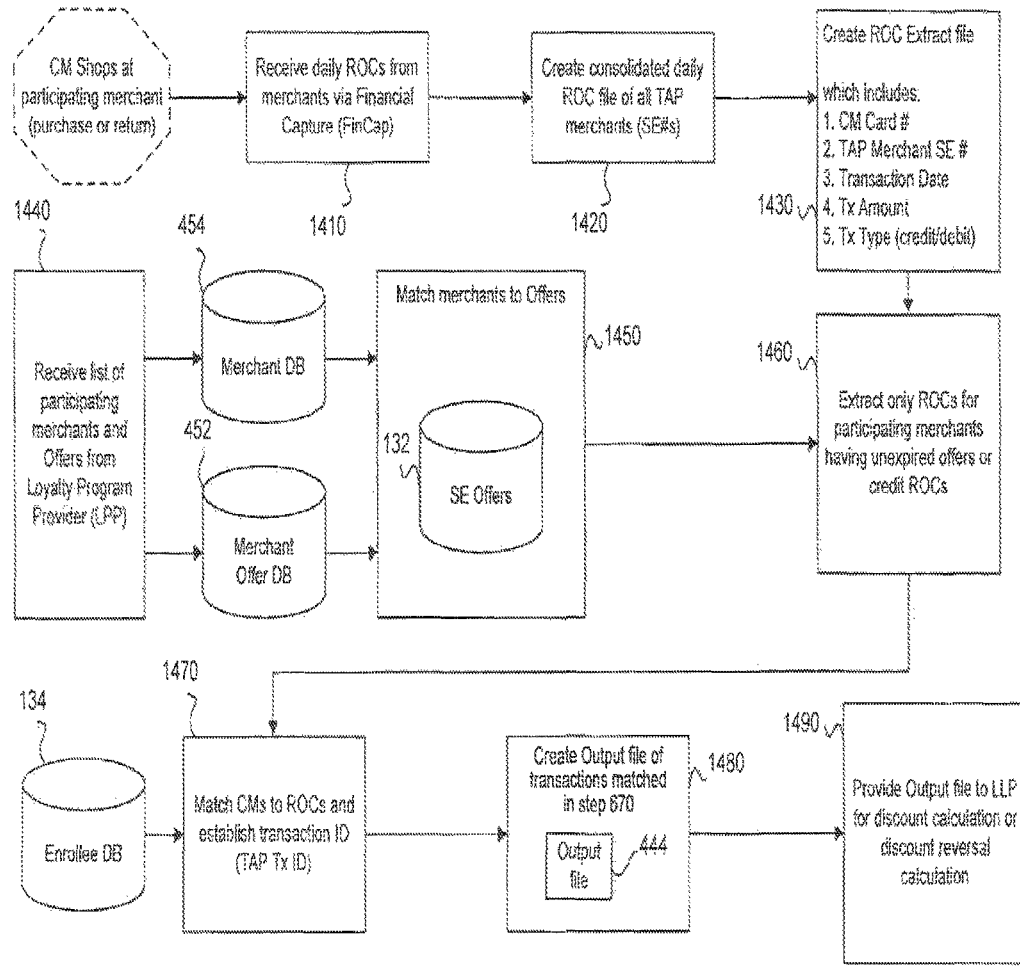
FIG. 14 is a flow diagram of a transaction matching process, in accordance with various embodiments.

FIG. 14 shows steps in a process from the point when the account holder makes a purchase or return at a particular participating merchant to when an output file is provided to an LPP for discount calculation (or discount reversal calculations). In step 1410, TAP receives daily ROCs from merchants via its financial capture system (FinCap). In step 1420, TAP creates a consolidated daily ROC file of all merchants associated with TAP. As part of the consolidation, TAP may monitor ROC submissions for return ROCs, i.e., ROCs having a negative amount for the transaction amount, and/or for which the transaction type is identified as a credit, whereby the transaction may be subject to additional processing to determine whether a negative discount (i.e., discount reversal) is due prior to including the transaction on the output file provided to the LPP for discount reversal calculation. In step 2240, TAP receives the list of participating merchants and offers from LPP. Participating merchants and offers are stored in merchant database 454 and merchant offer database 452, respectively. At step 1450, merchants are matched to offers, and at step 1460, ROCs are extracted for only those participating merchants that have unexpired offers. Also extracted are credit ROCs (i.e., ROCs for returns).

Once TAP identifies credit ROCs from participating merchants, TAP may compare them to transaction debits stored in transaction database 136 (see FIG. 16) over a given time period (e.g., the last 60 days, or the last 90 days) to determine whether there exists a debit ROC with the same merchant as the credit ROC, for the same registered card. If found, TAP further checks to see if the previous transaction was eligible for a rebate credit and the amount of the rebate credit that was provided to the CM. If the previous transaction is eligible for a rebate credit, then a debit corresponding to the amount of the rebate credit in full (corresponding to full returns) or in part (corresponding to partial returns) is charged to the account holder. These debits thereby adjust the net return credit to equal the original purchase price less the rebate credit. The merchant is reimbursed for the amount of the debited rebate credit, and the merchant's reimbursement appears as a credit on the merchant's account. The determination of the discount reversal amount (i.e., amount of the debited rebate credit) is based on the CM's rebated credit on the original purchase rather than the debit received by the merchant, since the merchant's previous debit for the CM's rebate credit may include an associated service fee imposed by TAP and/or LPP. As noted above, in various embodiments, stock keeping units (SKU's) of purchased goods/services are used to match purchases with returns and determine the discount reversal amount. In various embodiments, certain assumptions are made in accordance with a return logic policy to do the matching. Exemplary return logic policy is described below with reference to FIGS. 19 and 20.

At step 1470, CM information in enrollee database 134 is used to match registered CMs with ROCs extracted in step 1460, and each matched transactions is provided with a transaction ID. In step 1480, output file 444 is created of transactions matched in step 1470. At step 1490, output file 444 is provided to loyalty program provider for discount/discount reversal calculation.

FIG. 15 shows in greater detail the matching processes of steps 1450 and 1470 and the process of extraction step 1460 of FIG. 14, in accordance to an embodiment. Step 1450, for the matching of merchants to offers, may include steps 1452, 1454, 1456 and 1458. In step 1452, the list of merchants from merchant database 454 is compared with the list of offers in merchant offer database 452. In step 1454, offers are checked to be either premium or everyday offers. In step 1456, offers are selected for inclusion in a master file in step 1458 if the offers are currently in effect as determined by the offer start and end dates, and in step 1458, a master file is created which includes the merchant SEnumber, the offer ID, the offer end date, and the offer type (premium or everyday). Extraction step 1460 receives the ROC extraction file from step 1430 (see FIG. 14) as well as the master file of step 1458. In this embodiment, extraction step 1460 includes steps 1462, 1464, 1466 and 1468. In step 1462, merchant SEnumbers are compared to the ROC extract file of step 1460 and master file of step 1458, and in step 1454, ROCs for merchants participating in TAP's registered card program are selected. Of the selected ROCs for participating merchants, the ROCs are extracted if (in step 1466) the transaction date is less than the offer end date reflected in the master file, or if (in step 1468) the ROC is a credit ROC. These extracted ROCs are an input to matching step 1470 that includes steps 1472, 1474, 1476 and 1478. In step 1472, CM account/card numbers from the extracted ROC file are matched with the registered accounts stored in enrollee database 134. In step 1474, those ROCs corresponding to the registered accounts of CMs are selected. If the registered CM is a premium CM then at step 1476, all ROCs are extracted for the CM; otherwise, at step 1478 only ROCs that apply to everyday offers are extracted for the CM. These extracted ROCs are provided to step 1480 of FIG. 14 for creation of output file 444.

As shown in FIG. 16, the LPP receives output file 444 from TAP at step 1610. In step 1612, the LPP calculates the discount or negative discount (i.e., discount reversal) amount for each purchase and return transaction, respectively. In step 1614, a file including a discount or discount reversal calculation (such as file 442 provided to RCE 138, described above in FIG. 4) is provided to TAP. TAP uses this file at step 1620 to update its transaction database with discount amounts or negative discount amounts, whereby the original ROC transaction is matched with these discounts or negative discounts. At step 1622, TAP creates a file of CM credits and corresponding merchant debits for discounts associated with a purchase. Further, TAP may include CM debits and merchant credits for negative discounts associated with returns. In step 1624, TAP's SPP (shopping portal processor) platform is used to create a FinCap file which is provided to FinCap, and in step 1626, FinCap processes CM discounts (i.e., rebate credits) and CM discount reversals. In particular, as described above in FIG. 4, RCE 138 provides TAP's AP (accounts payable) system with information on merchant debits and credits for processing at step 1628 and provides TAP's AR (accounts receivable) system with information on account holder debits and credits for processing at step 1630. Pursuant to step 1628, a merchant's account is debited for the CM's rebated credit, may be further debited a service fee, and is credited a CM's discount reversal amount in the case of an eligible return. Pursuant to step 840, a CM's account (or monthly statement) shall show a credited amount in accordance with any rebate credit and a debited amount in accordance with any discount reversal arising from an eligible return.

Methodologies unique to processing of account holder returns by means of a return logic policy in accordance with various embodiments are now described with reference to FIGS. 19 and 20. In these figures "TM tx" represents CM transactions which were eligible for a rebate credit in accordance with the TailorMade$^{SM}$ registered card program described herein. FIG. 19 provides examples of actions taken in response to returns. For example, in line 1 of FIG. 19, a $1,000 return is made on Sep. 1, 2006. In response to this return, TAP will take no action with respect to debiting any rebate credit, because there were no transactions made in the prior 60 days to correspond to the $1,000 return. In line 2, for the same return, it is determined that there was a $1,000 purchase within the prior 60 days along with a $100 statement credit. Therefore, it is assumed that the $100 statement credit was a rebate credit that must be debited. In line 3, a $400 return is made. In this case, a proportional $40 debit is made to correspond to the portion of the rebate credit on the $400 purchase that was returned. Additional examples and assumptions/rationales are provided in FIG. 19.

FIG. 20 provides additional examples of return policy logic in which a CM may be debited for identified rebate credit(s) on TM (TailorMade$^{SM}$) transactions. As shown in FIG. 20, if the CM is debited for identified rebate credit(s), and if the CM disputes the credit and claims that the return is part of a non-TM transaction (i.e., a transaction in which the CM did not receive a rebate credit), then the rebate credit is written off of CM's account. For example, in the line 1 of FIG. 20, a return is made for $1000, and it assumed that the return is associated the first exact transaction in the past 60 days for that is the same amount as the return. In this example, transaction "6" is the first transaction of $1000, and the return is associated with transaction "6." Since transaction "6" was discounted 10%, whereby the CM received a rebate credit of $100, then the CM is debited the $100. If the CM disputes the debit, such as by claiming that the return is in fact part of transaction "4," then the debit is written off, since transaction "4" was not subject to a discount.

If in line 1 there is no exact matched transaction identified with the return, then, in line 2, the first transaction in the past 60 days which is greater than the amount of the return is identified with the return. As shown in line 2, transaction "6" for $5000 is the first matched transaction having an amount greater than the return. Since transaction "6" was not discounted, then no action is taken with regard to debiting CM. If CM claims that the return is part of transaction "5" and "2", then a debit from the CM's account is made in the amount of the rebate credits (15% and 15%) for those transactions. If there is no transaction matched in lines 1 or 2, then in line 3, if the sum of the return is equal or smaller than the sum of all transactions in the past 60 days, then it is assumed that the return refers to TM transactions up to $1000, and a debit to CM's account is provided in accordance with the discounts on TM transactions 2 and 5.

Figure 17:
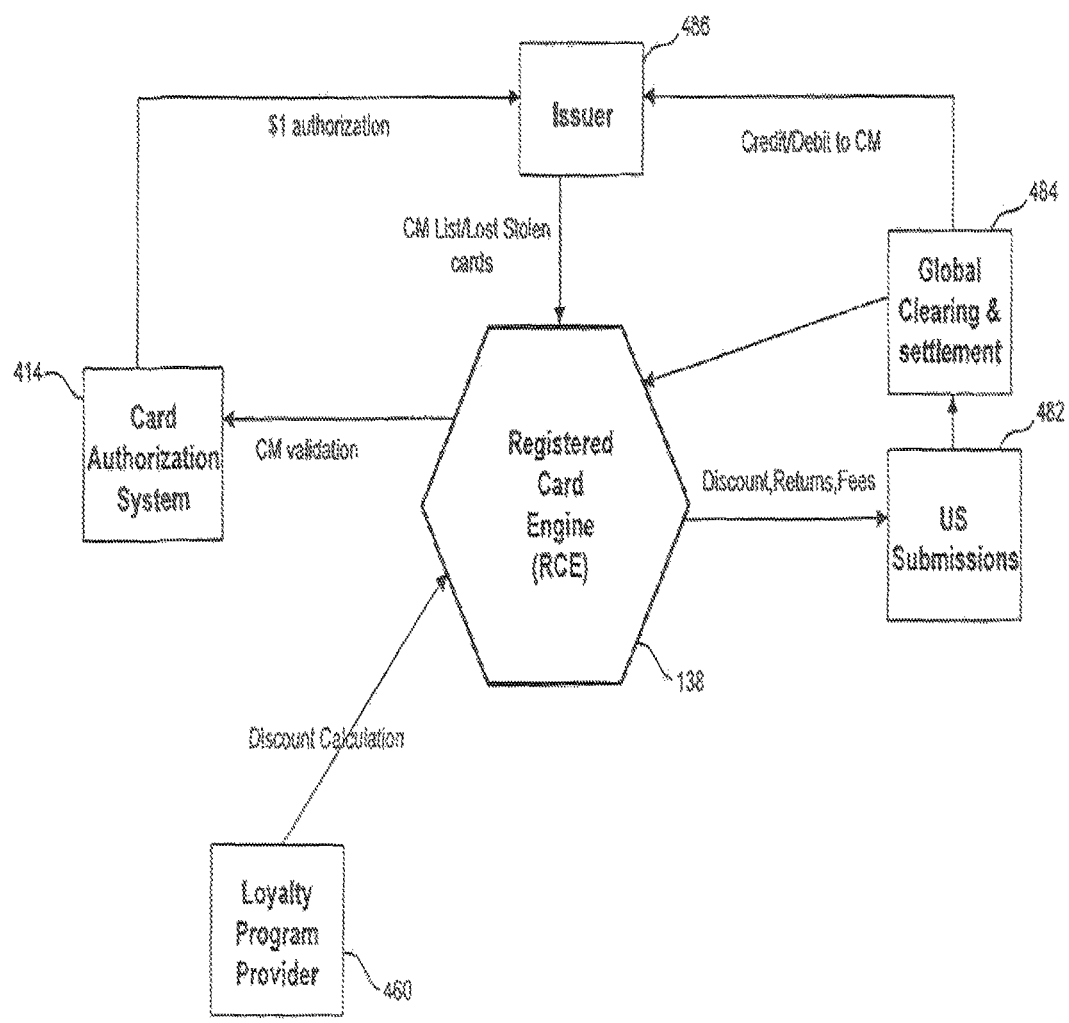
FIG. 17 is a high level flow diagram of a process of providing loyalty incentives to an account holder customer using a transaction card issued by a third party transaction account provider.
Figure 18:
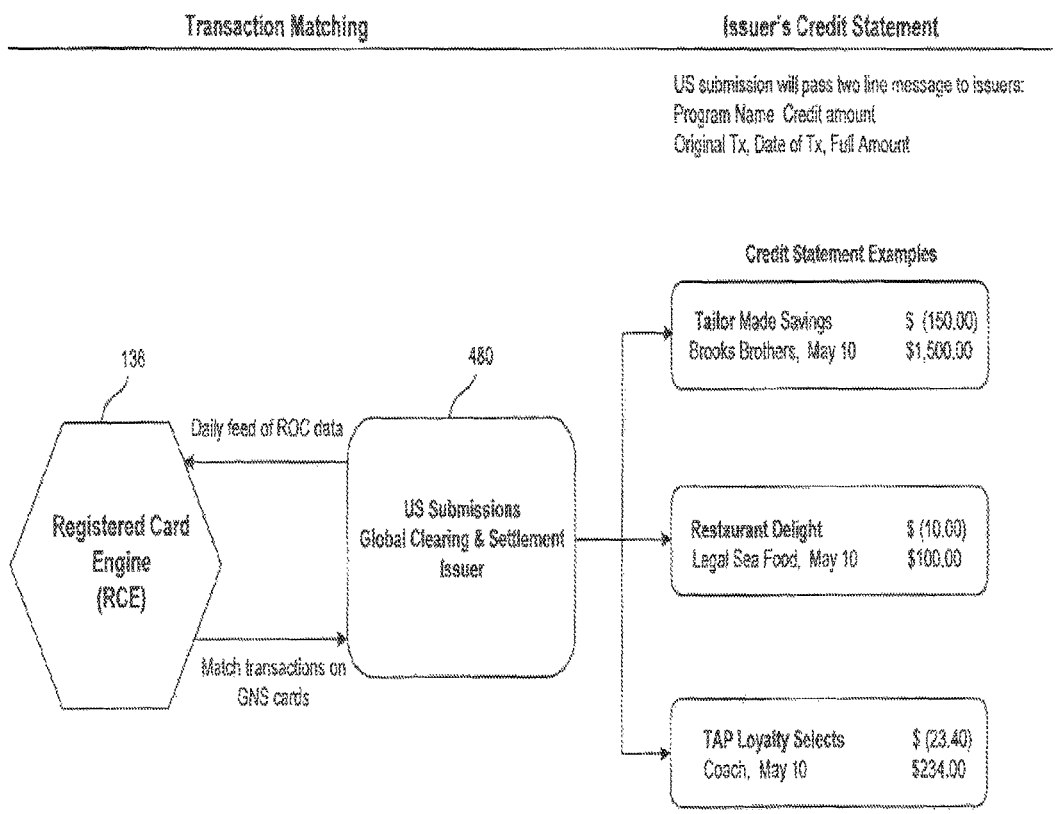
FIG. 18 is another high level flow diagram of the process of FIG. 17, providing an exemplary credit statement of the third party transaction account provider, in accordance with various embodiments.

FIGS. 17 and 18 show high level flow diagrams of a process for transaction matching (via RCE 138) of registered GNS cards. As shown in FIG. 17, transactions deserving of discounts or discount reversals as well as any service fees are provided to U.S. Submissions 482 which is placed at global clearing and settlement 484, which is a repository for collection by GNS issuers 486 for processing of credits and debits on GNS cards held by registered CMs (referred to as "GNS CMs"). Global clearing and settlement 484 is also a repository for daily ROC data that is submitted to RCE 138 for transaction matching. Although not shown here, GNS issuers 486 provide TAP with information on GNS accounts held by registered CMs to permit transaction matching, and also to permit enrollee database 134 to be updated according to cancellations 440 (as described above with reference to FIG. 4). In various embodiments shown in FIG. 17, card authorization system 414 may involve a one dollar authorization by which the CM's card is validated at enrollment. As shown in FIGS. 17 and 18, U.S. submissions 482 receives discount, returns, and service fee information from RCE 138 that is used by GNS issuers 486 to settle with merchants and GNS CMs. U.S. submissions 482 passes a two line message to GNS issuers 486, which appears on the respective issuer's credit statement. A similar two line message may be provided on GNS CM's account statement, thereby providing transparency of the settlement of transactions made pursuant to TAP's registered card program to both GNS CMs and CMs holding cards issued by TAP, such as in the manner described above with reference to FIG. 2.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

Figure 21:
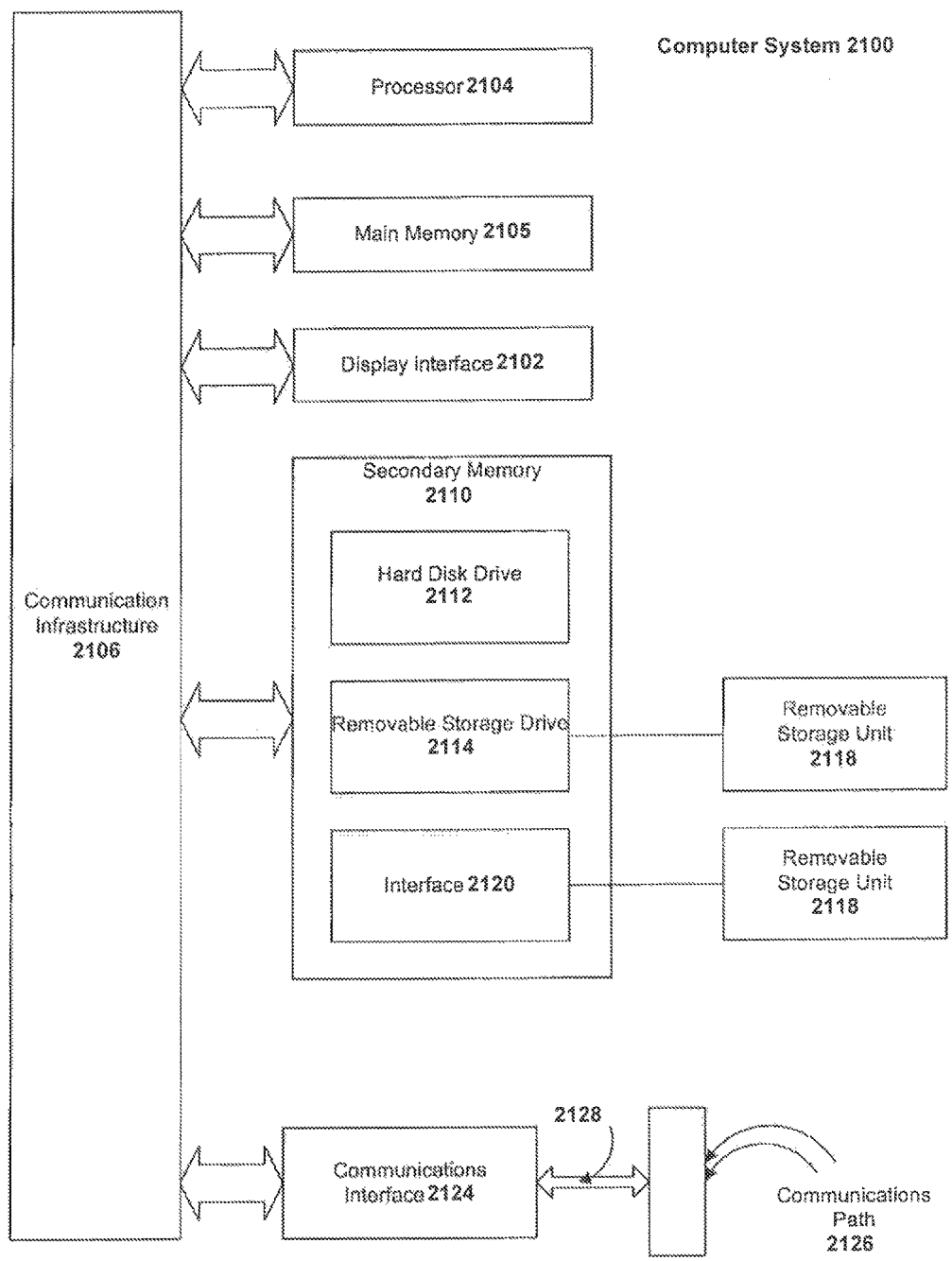
FIG. 21 is a block diagram of an exemplary computer system used for implementing an embodiment.
Figure 22:
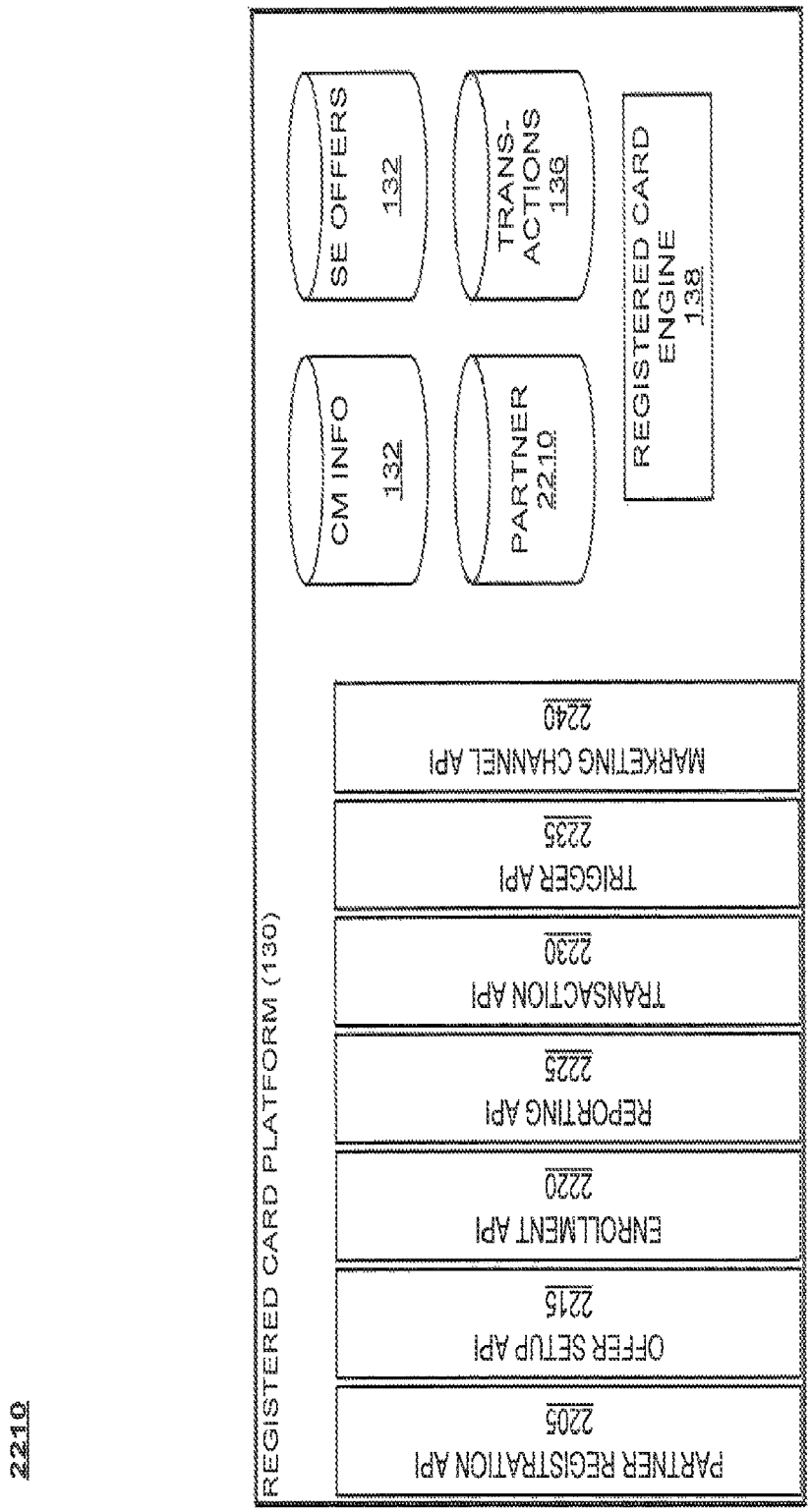
FIG. 22 is a block diagram of an exemplary computer system used for implementing an embodiment.

In fact, in various embodiments, the embodiments are directed toward one or more computer systems capable of carrying out the functionality described herein. An example of a computer system 2100 is shown in FIG. 21.

The computer system 2100 includes one or more processors, such as processor 2104. The processor 2104 is connected to a communication infrastructure 2106 (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures.

Computer system 2100 can include a display interface 2102 that forwards graphics, text, and other data from the communication infrastructure 2106 (or from a frame buffer not shown) for display on the display unit 1330.

Computer system 2100 also includes a main memory 1308, such as for example random access memory (RAM), and may also include a secondary memory 2110. The secondary memory 2110 may include, for example, a hard disk drive 2112 and/or a removable storage drive 2114, representing a floppy disk drive, a magnetic tape drive, an optical disk drive, etc. The removable storage drive 2114 reads from and/or writes to a removable storage unit 2118 in a well known manner. Removable storage unit 2118 represents a floppy disk, magnetic tape, optical disk, etc. which is read by and written to by removable storage drive 2114. As will be appreciated, the removable storage unit 2118 includes a computer usable storage medium having stored therein computer software and/or data.

In alternative embodiments, secondary memory 2110 may include other similar devices for allowing computer programs or other instructions to be loaded into computer system 2100. Such devices may include, for example, a removable storage unit 2118 and an interface 2120. Examples of such may include a program cartridge and cartridge interface (such as that found in video game devices), a removable memory chip (such as an erasable programmable read only memory (EPROM), or programmable read only memory (PROM)) and associated socket, and other removable storage units 2118 and interfaces 2120, which allow software and data to be transferred from the removable storage unit 2118 to computer system 2100.

Computer system 2100 may also include a communications interface 2124. Communications interface 2124 allows software and data to be transferred between computer system 2100 and external devices. Examples of communications interface 2124 may include a modem, a network interface (such as an Ethernet card), a communications port, a Personal Computer Memory Card International Association (PCMCIA) slot and card, etc. Software and data transferred via communications interface 2124 are in the form of signals 2128 which may be electronic, electromagnetic, optical or other signals capable of being received by communications interface 2124. These signals 2128 are provided to communications interface 2124 via a communications path (e.g., channel) 2126. This channel 2126 carries signals 2128 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 2114 and a hard disk installed in hard disk drive 2112. These computer program products provide software to computer system 2100.

Computer programs (also referred to as computer control logic) are stored in main memory 1308 and/or secondary memory 2110. Computer programs may also be received via communications interface 2124. Such computer programs, when executed, enable the computer system 2100 to perform the features as discussed herein. In particular, the computer programs, when executed, enable the processor 2104 to perform the features of various embodiments. Accordingly, such computer programs represent controllers of the computer system 2100.

In various embodiments, software may be stored in a computer program product and loaded into computer system 2100 using removable storage drive 2114, hard drive 2112 or communications interface 2124. The control logic (software), when executed by the processor 2104, causes the processor 2104 to perform the functions of various embodiments as described herein.

In various embodiments, hardware components such as application specific integrated circuits (ASICs). Implementation of the hardware state machine so as to perform the functions described herein will be apparent to persons skilled in the relevant art(s).

One skilled in the art will appreciate that system 2100 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of system 2100, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with system 2100 by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 2100, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in various embodiments, the header or trailer is not stored on the transaction device along with the associated issuer-owned data but instead the appropriate action may be taken by providing to the transaction instrument user at the stand-alone device, the appropriate option for the action to be taken. System 2100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 2100 may consist of any combination thereof at a single location or at multiple locations, wherein each database or system 2100 includes any of various suitable security features, such as firewalls, access codes, encryption, decryption, compression, decompression, and/or the like.

In addition to those described above, the various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present system. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

In various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The disclosure may be described herein in terms of functional block components, screen shots, optional selections and various processing steps. It should be appreciated that such functional blocks may be realized by any number of hardware and/or software components configured to perform the specified functions. For example, system 2100 may employ various integrated circuit components, e.g., memory elements, processing elements, logic elements, lookup tables, and/or the like, which may carry out a variety of functions under the control of one or more microprocessors or other control devices. Similarly, the software elements of system 2100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 2100 may employ any number of conventional techniques for data transmission, signaling, data processing, network control, and/or the like. Still further, system 2100 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

In various embodiments, RCP 130 includes application programming interfaces that enable third parties to create, configure, manage, modify, update, delete, report on, and enhance reward offers and marketing programs. For example, a program provider (e.g., an LPP or TAP) may wish to create a custom application ("partner application") that serves as a front-end or interface to RCP 130. The partner application accesses RCP 130 via various application programming interfaces (APIs). In various embodiments, the APIs may include a partner registration API, an offer set-up API, an enrollment API, a transaction API, a trigger API, a partner registration API, a reporting API and a marketing channel API. RCP 130 is a robust extensible platform that enables, in various embodiments, a variety of APIs for accessing a variety of functions. While some APIs may correspond directly to a function that may be desired by a partner, others may provide access to core functionality such as, for example, APIs for accessing workflow functionality or for accessing database query functionality.

FIG. 14 includes one embodiment of RCP 130 and a plurality of API's. As shown, RCP 130 may be configured to communicate with (or execute computer programs for) an approval portal, a workflow engine and a number of internal and external databases.

Partner registration API 2205 may enable a marketing partner to access RCP 130 in order to register with and configure access to RCP 130. In various embodiments, a developer portal provides an interface to partner users and a registration request is sent via partner registration API 2205 to RCP 130. RCP 130 validates the registration request and executes a workflow to provision a partner user identification code ("user id") and an API access code. RCP 130 saves a partner profile in the partner database 2210. In various embodiments, RCP 130 allocates memory, databases, file structure and/or other system resources to be used by partner users in testing and in production. In various embodiments, based upon a workflow and/or predefined business rules, RCP 130 executes logic to approve the registration request. The process to approve the registration request may be completely automated and/or may comprise steps whereby RCP administrators provide a manual approval. RCP 130 sends the registration information (e.g., user id and access code) to the partner user. A partner user and/or a RCP administrator may also access RCP 130 via partner registration API 2205 in order to update partner details, and terminate the partner if needed.

Offer setup API 2215 may allow a partner to build their own offer set up tool, may provide access to their own internal users, and/or may allow the partner to open up the tool to external users of their application or service (e.g., a user base of merchants or a company representing merchants). In various embodiments, offer setup API 2215 enables receiving a offer setup request; parsing the offer set up request into offer parameters; validating the offer setup request and/or the offer parameters; notifying a first approver of the offer setup request; receiving from the first approver, an approval of the offer set up request; saving an offer comprising the first offer parameters; associating the offer associated with a marketing program; and determining a first population of transaction accounts that comply with first offer criteria.

In various embodiments, the parsing includes applying logical and/or business rules to a request to divide, reorganize, translate and/or augment the data associated with a request. In various embodiments, parsing may be accomplished as part of the data validation process and/or as part of populating the data in a database. Data validation includes applying logical and/or business rules in order to ensure that data is received in, for example, an expected format and/or structure and that the data conforms in content to business rules that govern the data. Business rules used to parse the data may be based upon, for example, a partner, an offer, a product, an industry, a promotion, a program, a transaction processor, an issuer or any combination of these or other factors. Data that fails validation may cause an error to be sent to the system that sent the data and/or may cause RCP 130 administrator staff to examine and or modify the data.

Thus, a RCP 138 user (e.g., a partner) may use offer setup API 2215 to configure marketing programs and offers and to determine a population of transaction accounts that may be eligible for a program. Such data may be useful to a marketing partner in analyzing and targeting a particular promotion. Offer setup API 2215 may also enable a partner to specify criteria (e.g., define qualifying transactions, behaviors, events or thresholds) that qualify for a reward. The offer criteria may include any combination of a customer identifier, a customer demographic, a customer location, spend frequency, a spend threshold, a spend history, an award cap, a tiered reward requirement, a product identifier, a product category, a stock-keeping unit (SKU), a universal product code (UPC), a QR code, a merchant, a merchant type, an industry, a merchant location. Thus, offer set up API 2215 enables a partner to enter, maintain, analyze reward eligibility and configure RCP 130 to execute the offer. These constructs may enable highly targeted marketing promotions tailored to the specific needs of the partner, or the partner's user base. Any or all of these factors may also be used to exclude transaction accounts that may participate in an offer and/or provide criteria for excluding or withholding a reward.

In various embodiments, offer setup API also enables a partner to configure how offer costs are collected from a participating service establishment (e.g., merchant). For example, offer costs can be debited from the merchant account associated with where the qualifying transaction actually occurred (e.g., where a customer transacted), or from a single merchant specified by the partner. Offer setup API also enables a partner to configure the amount, currency and manner in which rewards are distributed. For example, in addition to fulfilling via statement credits, output files can be generated and passed to the partner to enable new types of fulfillment such as social currency. In various embodiments, RCP 130 determines that a qualifying transaction (and or event) has occurred and calculates a reward for a member or transaction account. Distributing the reward may include crediting a first transaction account, crediting a second transaction account, crediting a rewards account associated with the first transaction account, performing a currency conversion, crediting a social networking currency and sending reward data to a third party, where the third party applies the reward based upon the reward data.

Enrollment API 2220 may enable RCP 130 to capture enrollments from programs set up through the offer set up API. It may enable a partner to build their own enrollment functionality and embed the feature into their application. For example, a partner may design a rewards program and wish to solicit participation and enable enrollment in the program using a variety of different methods such as via an email message, a link, a uniform resource locator (URL), a customized web page, a web page hosted by the automated marketing system, a social networking web site, an app, a text message and a mobile application. Thus, the partner may define, via the enrollment API, that a web page be generated and hosted via RCP 130 and used to receive and process enrollments in a program. In various embodiments, the partner may define, via the enrollment API, a custom web page (or URL) by which enrollment may occur and, optionally, may define a access requirements (e.g., user id/password) for enrolling in a program.

The partner may use (e.g., via a custom application or website) enrollment API 2220 to enter and configure enrollment parameters in RCP 130. Enrollment parameters may include defining an enrollment process, instructions for generating a hosted enrollment page, a referral uniform resource locator (URL), a user id, a password, a passcode, an enrollment timeframe, and an enrollment cap, and enrollee (e.g., offer or program participant) tracking data requirements. The enrollee tracking requirements may include a user id, email address, password, product code, and transaction location; thus, the enrollment API is useful in defining how a transaction account or member may enroll in a program and defining data and events by which the partner may track a member's activity. Thus, a partner, program provider or issuer may capture the user ID/e-mail/phone number/password, product category, or other unique identifier(s) (QR code or marketing channel information) and/or may track this information during a program in order to enable additional reporting metrics, specific product opt-ins, and/or the trigger API functionality (discussed below).

Reporting API 2225 may enable real-time, or near real-time, results to an interfacing system (e.g., partner system). Using reporting API 2225, the partner can also define reports and data to be distributed to third parties such as, for example, program participants (merchants and customer), news sites, social media networks, etc. Reporting API may provide the ability to define and/or access a wide range of cumulative and incremental metrics. The metrics may include, for example, number of enrollments, CV, avg. ROC, number discounts, money discounts (or alternate fulfillment method). The partner and the partner's users will also have the ability to opt-in for in-depth pre/post-campaign metrics. Additional fields captured during enrollment can also be appended to reporting data and passed back to the partner.

Transaction API 2230 may enable a partner to define transactions and/or events that trigger data to be shared with a third party. For example, a transaction account issuer may allow their customers (e.g., transaction account owners) to opt-in to triggered data sharing so that when a customer initiates a transaction, data regarding that transaction is posted to a user's social networking account. For example, a customer swipes a transaction account card at a local florist when purchasing flowers, RCP 138 receives transaction details from the transaction account authorization process, and details regarding the transaction (e.g., merchant name, location, transaction amount, product, product type, time of transaction, etc.) are sent via transaction API to the Facebook account of the consumer. Thus, in various embodiments, RCP 138 leverages the transaction account authorization process to provide a new capability which allows customers to share transaction information in real-time.

Transaction API 2230 may enable a real-time service allowing customers to automatically share their spend behavior with social networks, smartphone applications, and other 3rd party destinations. In various embodiments, customers opt-in for this service, and select criteria for their spend information will be shared (e.g. "only share transactions at restaurants, but never share transactions at jewelry stores.")

In various embodiments, RCP 138 receives, via transaction API 2230, a data sharing opt-in associated with the first transaction account, wherein the data sharing opt-in defines data sharing transactions for which the first user authorizes personal data sharing. RCP 138 obtains transaction notification data for a transaction authorization request associated with the first transaction account and determines that the transaction authorization request qualifies as a data sharing transaction. RCP 130 sends data associated with the transaction authorization request to at least one of a web site, a social networking site, a social networking application, a third party, an individual, and a social networking account of a friend.

Trigger API 2235 may enable a partner to define conditions and/or events that trigger a message or data ("alerts") to be sent passed to the partner or other 3rd parties. In various embodiments, trigger API 2235 enables a partner to configure and manage managed alerts, or alerts for its users who are merchants (or representing merchants). The partner may configure trigger alerts based on any data accessible to RCP 138 (e.g., customer, merchant or product specific data), any calculation or business rule associated with the data (e.g., a counter, accumulation or threshold).

In various embodiments, RCP 130 receives, via a trigger API, a triggered event request defining triggered alert parameters for triggered offer alerts, wherein the triggered event parameters define offer alerts based upon at least one of: a number of enrollments for an offer; a number of authorization requests associated with an offer, a number of authorization requests associated with a transaction account, an award cap, an award threshold, a tiered reward requirement, a product identifier, a product category, a stockkeeping unit (SKU), a QR code, a universal product code (UPC), a merchant, a merchant type, an industry, a merchant location, and an marketing program result. In various embodiments, RCP 130 receives, via a trigger API, a triggered event request defining triggered alert parameters for triggered customer alerts, wherein the triggered event parameters define customer alerts based upon at least one of: offer progress, program progress, authorization requests associated with an offer, spend associated with an offer, spend associated with a program, spend associated with a merchant, a cross promotion, a second offer, an offer achievement and a customized message. RCP 138 monitors it's databases and event logs for criteria for which a trigger is defined, formats a trigger alert and distributes the alert according to distribution criteria defined by the particular trigger parameters.

Marketing channel API 2240 may enable a partner to query offer database 452 and/or other data sources. For example, via offer setup API 2215 a restaurant offers for 5% credit for all meals purchased on Sundays and offers 1% of the transaction value to marketing partners that sign up customers. A marketing channel partner (e.g., Groupon) uses marketing channel API 2240 to query the database, find this offer and opt-in to promoting the offer through the marketing channel. The marketing channel partner uses marketing channel API to determine merchant name, offer details (logo, Ts & Cs, dates etc.), offer construct, merchant location (address and longitude/latitude) for use in the promotion.

In various embodiments, RCP 130 receives, from a requestor and via a marketing channel API, a marketing channel request for a list of at least one of marketing channels, offers and programs. RCP 130 sends, via the marketing channel API, the list to the requestor associated with the marketing channel request. The list includes a merchant name, program details, offer details, offer terms and conditions, an advertisement, a logo and/or a merchant location. RCP receives, via the marketing channel API, a marketing channel opt-in request associates the requestor with at least one of a marketing channel, a program and an offer associated with the opt-in request.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, or C' is used in the claims or specification, it is intended that the phrase be interpreted to mean that A alone may be present in various embodiments, B alone may be present in various embodiments, C alone may be present in various embodiments, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

We claim:
1. A method comprising:
  associating, by a computer based system, a transaction account of a user with a reward program, wherein the transaction account is associated with a first monetary currency;
  determining, by the computer based system, a current location of the user based on at least one of spend data associated with a current location of a user device of the user, an activity associated with the transaction account, or an action in a digital channel associating the current location of the user device with a geographic region of an offer;
  determining, by the computer based system, a future location of the user based on at least one of a travel itinerary of the user or the action in the digital channel associating a future location of the user device with the geographic region of the offer;
  identifying, by the computer based system, the offer from the reward program having a plurality of offers with eligibility requirements, wherein the eligibility requirements include the transaction in a second monetary currency and the geographic region of the offer, and wherein the identifying is based on satisfying the eligibility requirements, the current location and the future location;
  notifying, by the computer based system, the user device about the offer;
  associating, by the computer based system and in response to the notifying, the offer with the transaction account;
  receiving, by the computer based system, transaction information comprising transaction account information and purchase information to validate the offer;
  converting, by the computer based system, an amount of the offer from the second monetary currency associated with the future location of the user to the first monetary currency associated with the transaction account;

providing, by the computer based system, a monetary credit associated with the offer to the transaction account in the first monetary currency associated with the transaction account; and providing, by the computer based system, a monetary debit associated with the offer to a sponsoring entity of the offer in the second monetary currency associated with the future location of the user.

2. The method of claim 1, wherein the identifying the offer is further based on a user profile, wherein the user profile is associated with the transaction account.

3. The method of claim 1, further comprising monitoring the travel itinerary within a travel system.

4. The method of claim 1, wherein transactions for the transaction account are billed in the first monetary currency.

5. The method of claim 1, further comprising receiving, by the computer based system, purchase information that includes the offer.

6. The method of claim 1, further comprising analyzing, by the computer based system, the transaction account information and the purchase information to validate fulfillment of the offer.

7. The method of claim 1, wherein the offer provides a discount in the second monetary currency that is different than the first monetary currency.

8. The method of claim 1, wherein the sponsoring entity sponsors the offer and is at least one of a transaction account issuer, a merchant, a product manufacturer, a merchant acquirer, or an affiliate.

9. The method of claim 1, wherein the providing the monetary credit associated with the offer to the transaction account includes providing the monetary credit on a statement associated with the transaction account.

10. The method of claim 1, wherein the computer based system is operated by at least one of a transaction account issuer or a third party.

11. The method of claim 1, further comprising receiving, by the computer based system, a selection of the offer in the second currency of the sponsoring entity.

12. The method of claim 1, further comprising receiving, by the computer based system, transaction information, wherein the transaction information further comprises data from a social media channel within the digital channel, and wherein the transaction account is associated with the social media channel.

13. The method of claim 1, further comprising:
receiving, by the computer based system, transaction information;
parsing, by the computer based system, the transaction information into a merchant portion and a transaction account portion; and
transmitting, by the computer based system, a purchase credit to a merchant associated with the transaction information based on the merchant portion.

14. A computer based system comprising:
a processor; and
a network interface communicating with a tangible, non-transitory memory,
the processor, when executing a computer program, performs operations comprising:
associating, by the processor, a transaction account of a user with a reward program, wherein the transaction account is associated with a first monetary currency;
determining, by the processor, a current location of the user based on at least one of spend data associated with a current location of a user device of the user, an activity associated with the transaction account, or an action in a digital channel associating the current location of the user device with a geographic region of an offer;

determining, by the processor, a future location of the user based on at least one of a travel itinerary of the user or the action in the digital channel associating a future location of the user device with the geographic region of the offer;

identifying, by the processor, the offer from the reward program having a plurality of offers with eligibility requirements, wherein the eligibility requirements include the transaction in a second monetary currency and the geographic region of the offer, and wherein the identifying is based on satisfying the eligibility requirements, the current location and the future location;

notifying, by the processor, the user device about the offer;

associating, by the processor and in response to the notifying, the offer with the transaction account;

receiving, by the processor, transaction information comprising transaction account information and purchase information to validate the offer;

converting, by the processor, an amount of the offer from the second monetary currency associated with the future location of the user to the first monetary currency associated with the transaction account;

providing, by the processor, a monetary credit associated with the offer to the transaction account in the first monetary currency associated with the transaction account; and providing, by the processor, a monetary debit associated with the offer to a sponsoring entity of the offer in the second monetary currency associated with the future location of the user.

15. The system of claim 14, wherein the identifying the offer is further based on a user profile, wherein the user profile is associated with the transaction account.

16. The system of claim 14, further comprising monitoring the travel itinerary within a travel system.

17. The system of claim 14, wherein transactions for the transaction account are billed in the first monetary currency.

18. The system of claim 14, further comprising analyzing, by the processor, the transaction account information and the purchase information to validate fulfillment of the offer.

19. The system of claim 14, wherein the offer provides a discount in the second monetary currency that is different than the first monetary currency.

20. A non-transitory computer-readable storage medium having stored thereon sequences of instructions, the sequences of instructions including instructions which, when executed by a computer based system, cause the computer based system to perform operations comprising:
associating, by the computer based system, a transaction account of a user with a reward program, wherein the transaction account is associated with a first monetary currency;
determining, by the computer based system, a current location of the user based on at least one of spend data associated with a current location of a user device of the user, an activity associated with the transaction account, or an action in a digital channel associating the current location of the user device with a geographic region of an offer;
determining, by the computer based system, a future location of the user based on at least one of a travel itinerary of the user or the action in the digital channel associating a future location of the user device with the geographic region of the offer;

identifying, by the computer based system, the offer from the reward program having a plurality of offers with eligibility requirements, wherein the eligibility requirements include the transaction in a second monetary currency and the geographic region of the offer, and wherein the identifying is based on satisfying the eligibility requirements, the current location and the future location;

notifying, by the computer based system, the user device about the offer;

associating, by the computer based system and in response to the notifying, the offer with the transaction account;

receiving, by the computer based system, transaction information comprising transaction account information and purchase information to validate the offer;

converting, by the computer based system, an amount of the offer from the second monetary currency associated with the future location of the user to the first monetary currency associated with the transaction account;

providing, by the computer based system, a monetary credit associated with the offer to the transaction account in the first monetary currency associated with the transaction account; and providing, by the computer based system, a monetary debit associated with the offer to a sponsoring entity of the offer in the second monetary currency associated with the future location of the user.

* * * * *